(12) United States Patent
Carey et al.

(10) Patent No.: US 11,605,177 B2
(45) Date of Patent: Mar. 14, 2023

(54) SYSTEM AND METHOD FOR REFINING DIMENSIONS OF A GENERALLY CUBOIDAL 3D OBJECT IMAGED BY 3D VISION SYSTEM AND CONTROLS FOR THE SAME

(71) Applicant: Cognex Corporation, Natick, MA (US)

(72) Inventors: Ben R. Carey, Cambridge, MA (US); Nickolas J. Mullan, Ambler, PA (US); Gilbert Chiang, Natick, MA (US); Yukang Liu, Natick, MA (US); Nitin M. Vaidya, Shrewsbury, MA (US); Hongwei Zhu, Natick, MA (US); Daniel Moreno, Northbridge, MA (US); David J. Michael, Wayland, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 16/437,241

(22) Filed: Jun. 11, 2019

(65) Prior Publication Data

US 2020/0394812 A1 Dec. 17, 2020

(51) Int. Cl.
*G06T 7/62* (2017.01)
*G06T 7/64* (2017.01)
(Continued)

(52) U.S. Cl.
CPC .......... *G06T 7/62* (2017.01); *G06F 3/04847* (2013.01); *G06T 7/64* (2017.01); *G06V 20/64* (2022.01);
(Continued)

(58) Field of Classification Search
None
See application file for complete search history.

(56) References Cited

U.S. PATENT DOCUMENTS 5,095,204 A * 3/1992 Novini ............... G01N 21/9045
356/239.5
5,644,386 A 7/1997 Jenkins
(Continued)

FOREIGN PATENT DOCUMENTS

| CN | 104376558 B | 2/2017 |
| CN | 106091976 B | 7/2017 |
| CN | 107063099 A | 8/2017 |

OTHER PUBLICATIONS

NN: "Datalogic DM3610 Two-Head Dimensioning System—Reference Manual", Apr. 30, 2015 (Apr. 30, 2015), XP055780183, Retrieved from the Internet: URL:https://www.datalogic.com/upload/ia/manuals/DM3610%20Two-Head%20Dimensioning%20System%20Reference%20Manual.pdf [retrieved on Feb. 26, 2021].
(Continued)

*Primary Examiner* — Chikaodili E Anyikire
(74) *Attorney, Agent, or Firm* — Loginov & Associates, PLLC; William A. Loginov

(57) ABSTRACT

A system and method for estimating dimensions of an approximately cuboidal object from a 3D image of the object acquired by an image sensor of the vision system processor is provided. An identification module, associated with the vision system processor, automatically identifies a 3D region in the 3D image that contains the cuboidal object. A selection module, associated with the vision system processor, automatically selects 3D image data from the 3D image that corresponds to approximate faces or boundaries of the cuboidal object. An analysis module statistically analyzes, and generates statistics for, the selected 3D image data that correspond to approximate cuboidal object faces or boundaries. A refinement module chooses statistics that correspond to improved cuboidal dimensions from among cuboidal object length, width and height. The improved cuboidal dimensions are provided as dimensions for the
(Continued)

object. A user interface displays a plurality of interface screens for setup and runtime operation.

21 Claims, 39 Drawing Sheets

(51) Int. Cl.
| | |
|---|---|
| G06F 3/04847 | (2022.01) |
| H04N 13/296 | (2018.01) |
| H04N 5/235 | (2006.01) |
| H04N 13/361 | (2018.01) |
| G06V 20/64 | (2022.01) |
| H04N 13/00 | (2018.01) |

(52) U.S. Cl.
CPC ......... *H04N 5/2353* (2013.01); *H04N 13/296* (2018.05); *H04N 13/361* (2018.05); *H04N 2013/0074* (2013.01)

(56) References Cited

U.S. PATENT DOCUMENTS

| | | | |
|---|---|---|---|
| 6,253,806 B1 | 7/2001 | Sperry | |
| 6,867,772 B2 | 3/2005 | Kotcheff | |
| 6,918,541 B2 | 7/2005 | Knowles | |
| 7,153,378 B2* | 12/2006 | Sleiman | B65C 3/00 271/211 |
| 7,636,449 B2* | 12/2009 | Mirtich | G06F 3/0481 382/152 |
| 8,666,142 B2 | 3/2014 | Shkolnik | |
| 8,794,521 B2 | 8/2014 | Joussen | |
| 8,891,864 B2 | 11/2014 | Pettigrew | |
| 9,031,317 B2* | 5/2015 | Yakubovich | G06K 9/6256 382/159 |
| 9,094,588 B2* | 7/2015 | Silver | H04N 5/225 |
| 9,237,331 B2* | 1/2016 | Heinzle | H04N 13/296 |
| 9,589,165 B2 | 3/2017 | Reynolds | |
| 9,595,134 B2 | 3/2017 | Ramalingam | |
| 9,836,635 B2* | 12/2017 | Negro | G06K 7/1413 |
| 10,192,087 B2 | 1/2019 | Davis | |
| 10,507,990 B2* | 12/2019 | Koga | G06T 7/20 |
| 10,520,452 B2* | 12/2019 | Van Dael | G01N 23/18 |
| 10,621,747 B2 | 4/2020 | Malisiewicz | |
| 10,789,569 B1* | 9/2020 | Anor | G07G 1/0036 |
| 11,335,021 B1 | 5/2022 | Vaidya | |
| 2001/0043738 A1 | 11/2001 | Sawhney | |
| 2004/0240754 A1 | 12/2004 | Smith | |
| 2007/0146491 A1* | 6/2007 | Tremblay | G06K 9/6253 348/211.99 |
| 2008/0123945 A1 | 5/2008 | Andrew | |
| 2008/0302633 A1* | 12/2008 | Snow | B65G 15/58 198/339.1 |
| 2009/0080706 A1* | 3/2009 | Tao | G01N 23/12 382/110 |
| 2009/0118864 A1* | 5/2009 | Eldridge | B25J 9/1692 901/29 |
| 2010/0034440 A1 | 2/2010 | Zhan | |
| 2010/0290665 A1* | 11/2010 | Sones | G01B 11/024 348/47 |
| 2011/0103679 A1 | 5/2011 | Campbell | |
| 2012/0236140 A1* | 9/2012 | Hazeyama | B25J 9/1697 348/94 |
| 2012/0313937 A1 | 12/2012 | Beeler | |
| 2013/0027538 A1* | 1/2013 | Ding | H04N 5/232123 348/79 |
| 2013/0329013 A1 | 12/2013 | Metois | |
| 2014/0050387 A1* | 2/2014 | Zadeh | G06T 7/0004 382/141 |
| 2014/0088765 A1* | 3/2014 | Valpola | B25J 9/1697 700/259 |
| 2014/0118558 A1* | 5/2014 | Imoto | H04N 17/00 348/181 |
| 2014/0177979 A1* | 6/2014 | Whitman | G06F 3/0481 382/311 |
| 2014/0351073 A1 | 11/2014 | Murphy | |
| 2015/0316904 A1 | 11/2015 | Govindaraj | |
| 2016/0104021 A1* | 4/2016 | Negro | G06K 7/1417 235/462.08 |
| 2017/0302905 A1 | 10/2017 | Shteinfeld | |
| 2018/0143003 A1 | 5/2018 | Clayton | |
| 2018/0253857 A1 | 9/2018 | Driegen | |
| 2018/0284741 A1 | 10/2018 | Cella | |
| 2019/0011183 A1* | 1/2019 | Baumert | C21C 5/565 |
| 2019/0122073 A1* | 4/2019 | Ozdemir | A61B 6/5217 |
| 2019/0202642 A1* | 7/2019 | Schroader | B65G 43/10 |
| 2019/0256300 A1* | 8/2019 | Shimamura | B25J 9/1692 |
| 2019/0353631 A1 | 11/2019 | Koshnick | |
| 2020/0039676 A1* | 2/2020 | Shamiss | B65C 9/40 |
| 2020/0098122 A1* | 3/2020 | Dal Mutto | G06T 7/593 |
| 2020/0118317 A1 | 4/2020 | Mysore Siddu | |
| 2020/0394812 A1* | 12/2020 | Carey | G07B 17/00467 |

OTHER PUBLICATIONS

Ocak et al., "Image Processing Based Package Volume Detection with Kinect", 2015 23nd Signal Processing and Communications Applications Conference (SIU), IEEE, May 16, 2015 (May 16, 2015), pp. 515-518, XP032787534, DOI: 10.1109/SIU.2015.7129873.

M. Leo, P. Carcagni, C. Distante. "Robust estimation of object dimensions and external defect detection with a low-cost sensor", Journal of Nondestructive Evaluation. Mar. 2017.

"Cubiscan 210-DS." Retrieved from archive.org capture dated Sep. 30, 2018 https://web.archive.org/web/20180930154350/https://cubiscan.com/dimensioning/cubiscan-210-ds/.

"Dimensioning Systems Manufacturers—Parcle Dimensioning Systems." Retrieved from archive.org capture dated Sep. 3, 2018 https://web.archive.org/web/20180903170813/https://www.falconautoonline.com/dimension-weight-scanning-systems/.

N. Pears, P. Wright, & C. Bailey, "Practical Single View Metrology for Cuboids" 2 VISAPP 85-90 (Mar. 2007).

F. Chen, G.M. Brown, & M. Song, "Ovreview of three-dimensional shape measurement using optical methods," 39 Opt. Eng. 10-22 (Jan. 2000).

S.W. Kwon, F. Bosche, C. Kim, C.T. Haas, & K.A. Liapi, "Fitting range data to primitives for rapid local 3D modeling using sparse range point clouds," 13 Automation in Construction 67-81 (2004).

Cui, An; A Machine Manufacturing Online Quality Monitoring Method Based On Visual System, Aug. 18, 2017 (Year: 2017).

\* cited by examiner

FIG. 15

SYSTEM AND METHOD FOR REFINING DIMENSIONS OF A GENERALLY CUBOIDAL 3D OBJECT IMAGED BY 3D VISION SYSTEM AND CONTROLS FOR THE SAME

FIELD OF THE INVENTION

This invention relates to vision systems that generate three-dimensional (3D) dimensions for objects in a scene, and more particularly to 3D vision systems adapted to operate on a moving line of differing-sized, generally rectangular objects.

BACKGROUND OF THE INVENTION

Machine vision systems (also termed herein, "vision systems") that perform measurement, inspection, alignment of objects and/or decoding of symbology (e.g. bar codes—also termed "ID Codes") are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities.

As described above, one or more vision system camera(s) can be arranged acquire two-dimensional (2D) or three-dimensional (3D) images of objects in an imaged scene. 2D images are typically characterized as pixels with an x and y component within an overall NxM image array (often defined by the pixel array of the camera image sensor). Where images are acquired in 3D, there is a height or z-axis component, in addition to the x and y components. 3D image data can be acquired using a variety of mechanisms/techniques, including triangulation of stereoscopic cameras, LiDAR, time-of-flight sensors and (e.g.) laser displacement profiling.

A common use for vision systems is to track and sort objects moving along a line (e.g. a conveyor) in manufacturing and logistics operations. The vision system camera(s) can be positioned over the line at an appropriate viewing angle to acquire any expected IDs on respective objects as they each move through the field of view. The focal distance of the reader with respect to the object can vary, depending on the placement of the reader with respect to the line and the size of the object.

In various logistics tasks, determining the size and relative shape, including the maximum thickness or height, of parcels (e.g. relatively cuboidal/rectangular-sided boxes, jiffy mailers, polybags, envelopes, etc.) on a conveyor is desirable. Such dimensions are used to provide proper handling as they are sent down the conveyor to further processes. However, it is often challenging to obtain accurate measurements where the 3D camera(s) overlying the conveyor experience(s) noise.

SUMMARY OF THE INVENTION

This invention overcomes disadvantages of the prior art by provision a system and method that employs a 3D vision system to accurately measure the length (sometimes termed "depth"), width and height of a typically cuboidal object (e.g. boxes, jiffy mailers, polybags, etc.) in the field of view in the presence of noise. Existing methods, such as a 3D blob tool, allow the detection of which points of an acquired 3D point cloud belong to the object and the calculation of their compact bounding box. Owing to the noisiness, coarse resolution, and other limitations of the imperfect 3D imagers, direct use of the dimensions of this bounding box proves unsuitable for meeting certain users' tight accuracy requirements, which can be in the range of 2.5 mm, or less. The invention consists of methods to compute refined estimates of the length, width, height dimensions of objects of rectangular footprint given the bounding box and the 3D points it contains. The system and method can employ include statistical measures that are applied to the boundary points or faces of the objects. In addition, the system and method can detect whether an object (box) top is relatively flat, and/or how much it swells, thereby providing a useful indication (i.e. box-top bulginess) of which statistics would produce more accurate box dimensions. The system and method further includes an intuitive and straightforward user interface for setting up the 3D vision system camera with respect to a moving conveyor so as to ensure that the field of view is adequately sized and other camera parameters are sufficient to accurately image objects having a range of expected dimensions.

In an illustrative embodiment, a system and method for estimating dimensions of an approximately cuboidal object from a 3D image of the object, acquired by an image sensor of the vision system processor, is provided. An identification module, associated with the vision system processor, automatically identifies a 3D region in the 3D image that contains the cuboidal object. A selection module, associated with the vision system processor, automatically selects 3D image data from the 3D image that corresponds to approximate faces or boundaries of the cuboidal object. An analysis module statistically analyzes, and generates statistics for, the selected 3D image data that correspond to approximate cuboidal object faces or boundaries. A refinement module, responsive to the analysis module, then chooses statistics that correspond to improved cuboidal dimensions from among cuboidal object height, width, and length, width and height, the improved cuboidal dimensions being provided as dimensions for the object. Illustratively, the identification module identifies the 3D region using a 3D connected component analysis and/or the selection module selects the 3D region by testing the 3D image data using the 3D connected component analysis. The 3D connected component analysis can be constructed and arranged to identify groups of voxels of the 3D image that are adjacent to each other and that excludes, from each one of the groups, any voxels whose distance from a respective of the groups exceeds an adjacency threshold. A length dimension and a width dimension of the bounding box can be refined using at least one of a points statistical analysis (PSA) and a boundary statistical analysis (BSA). The refinement module can use a least squares surface fitting process to refine a height dimension of the bounding box. Illustratively, a convexity process measures a degree of a convex shape along at least one surface of the object. The convexity process is constructed and arranged to determine a bulge in height along the at least one surface of the object. Additionally, the refinement process includes a height from bulginess process that refines the height dimension based on a bulginess estimate for the object. The convexity process can be constructed and arranged to (a) fit a plane with respect to boundary edges in the 3D image of the object that correspond to the top surface, (b) obtain a tallest point on the top surface, (c) obtain a tallest point on the boundary edges, and (d) determine a measure of convexity of the top surface using the relative tallest points. The refinement module can be constructed and arranged to adjust the improved cuboidal dimensions based on the determined convexity. Illustratively, the at least one surface is a top surface.

In exemplary embodiments, a user interface is provided, which displays a plurality of interface screens for setup and runtime operation of the system. The object therein moves along a conveyor surface with respect to a field of view of the image sensor. The displays for setup can include an application details display for determining optimal distance between the image sensor and the conveyor surface based upon at least one of parameters of a camera assembly having the image sensor, speed of the conveyor surface and width of the conveyor surface and a range of minimum and maximum size measurements for the object. Illustratively, the displays for setup can include a baseline display that determines a reference measurement based upon acquisition of a 3D image of the conveyor surface by the image sensor. The displays for setup can also include an AutoTune display that operates a process for determining measurements of a plurality of objects moving through the field of view of the image sensor on the conveyor surface and thereby refines estimation of object dimensions by the system.

BRIEF DESCRIPTION OF THE DRAWINGS

The invention description below refers to the accompanying drawings, of which:

FIG. 15 is a diagram of an exemplary display screen of the GUI of FIG. 9, showing a second part of the communications screen of FIG. 14, which provides easily configurable communication protocols including those used for multiple cameras/readers;

DETAILED DESCRIPTION

I. System Overview

Figure 1:
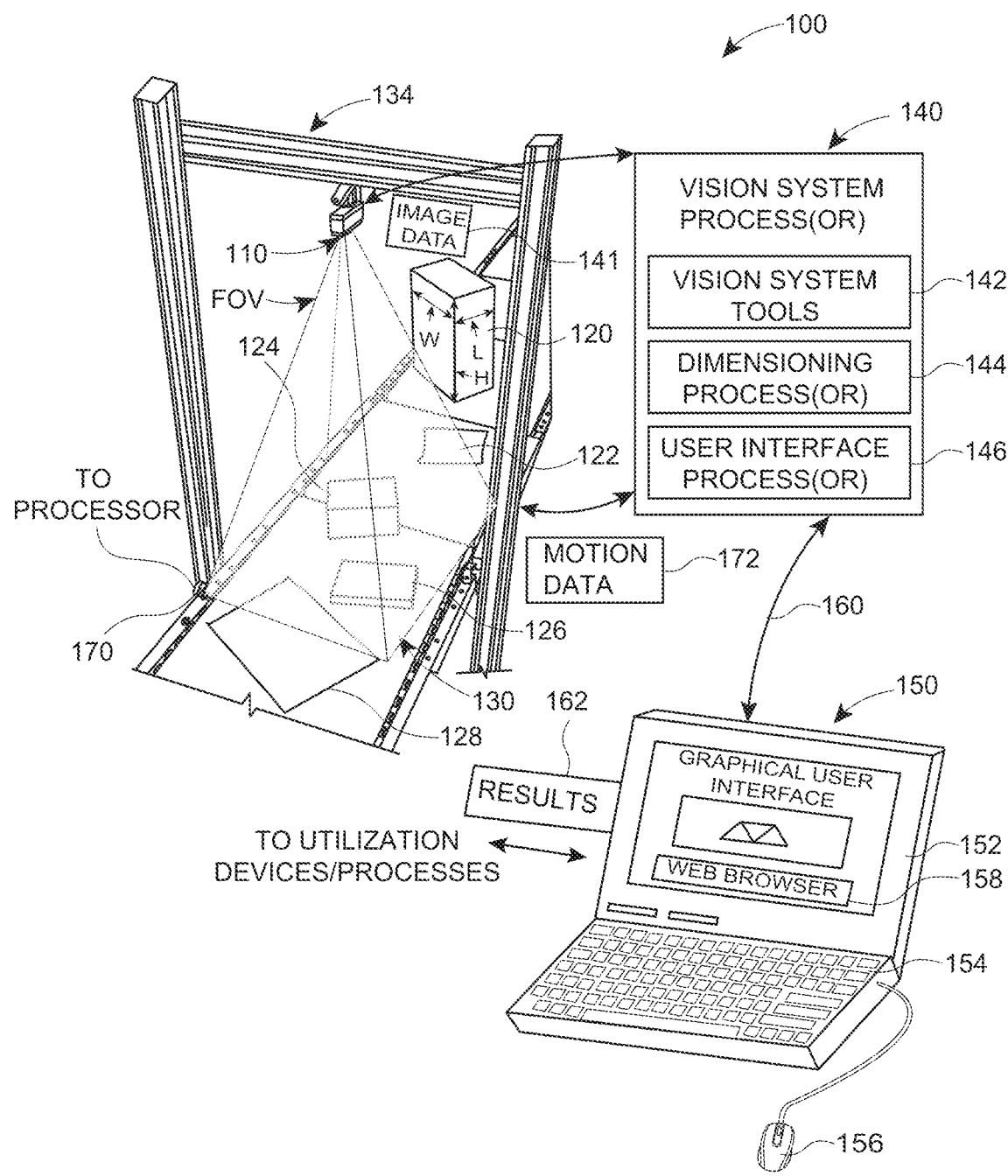
FIG. 1 is a diagram of an exemplary conveyor line with an overlying 3D camera and interconnected vision system and processor for determining the dimensions of cuboidal objects on the conveyor according to an exemplary embodiment.

FIG. 1 shows an overview of an arrangement 100 in which a vision system camera assembly (also termed simply "camera" or "sensor") 110 acquires 3D image data of exemplary, generally cuboidal objects (e.g. packages of various sizes and shapes) 120, 122, 124, 126 and 128 as they pass beneath its field of view (FOV) with respect to a moving conveyor 130. The camera 110 can be any assembly that acquires 3D images of objects including, but not limited to, stereo cameras, time-of-flight cameras, LiDAR, ultrasonic range-finding cameras and laser-displacement sensors. A single camera or array of cameras can be provided and the terms "camera" and/or "camera assembly" can refer to one or more cameras that acquire image(s) in a manner that generates 3D image data for the scene. The depicted camera assembly 110 is shown mounted on a framework 134 overlying the surface 130 of the conveyor 130 in the manner of a checkpoint or inspection station that images the flowing objects (e.g. packages) as they pass by. The objects can remain in motion or stop momentarily for imaging, depending upon the operating speed of the conveyor and acquisition time for camera image sensor and related electronics (depending, in part, upon frame rate and aperture settings) 110.

The camera 110 includes an internal (to its housing) and/or external vision system process(or) that receives image data 141 from the camera 110, and performs various vision system tasks upon the data in accordance with the system and method herein. The process(or) 140 includes underlying processes/processors or functional modules, including a set of vision system tools 142, which can comprise a variety of standard and custom tools that identify and analyze features in image data, including, but not limited to, edge detectors, blob tools, pattern recognition tools, deep learning networks, etc. The vision system process(or) can further include a dimensioning process(or) 144 in accordance with the system and method. This process(or) 144 performs various analysis and measurement tasks on features identified ion the 3D image data so as to determine the side and orientation of objects on the conveyor—as described in detail below. A user interface process(or) 146 is associated with the dimensioning process(or) 144, and can be part of the overall vision system processor, or can be provided on a separate computing device 150, such as a server (e.g. cloud-based or local), PC, laptop, tablet and/or smartphone. The computing device 150 is depicted (by way of non-limiting example) with a conventional display or touchscreen 152, keyboard 154 and mouse 156, which collectively provide a graphical user interface (GUI) functionality. A variety of interface devices and/or form factors can be provided in alternate implementations of the device 150. The GUI can be driven, in part, by a web browser application 158, which resides over a device operating system and displays web pages with control and data information from the process(or) 140 in accordance with an exemplary arrangement herein.

Note that the process(or) 140 can reside fully or partially on-board the housing of the camera assembly 110 and various process modules 142, 144 and 144 can be instantiated entirely or partially in either the on-board process(or) 140 or the remote computing device 150 as appropriate. In an exemplary embodiment, all vision system and interface functions can be instantiated on the on-board process(or) 140, and the computing device 150 can be employed primarily for training, monitoring and related operations with interface web pages (e.g. HTML) generated by the on-board-process(or) 140 and transmitted to the computing device via a wired or wireless network link 160. Alternatively, all or part of the process(or) 140 can reside in the computing device 150. The link 160 can provide vision system results (e.g. object/package dimensions represented by width W, length L and height H) 162 to a downstream utilization device or process. Such device/process can use results 162 to handle objects/packages—for example gating the conveyor 130 to direct objects/packages to differing destinations based on package size.

The conveyor 130 can include various sensors, such as a presence detector 170 to notify the process(or) 140 that an object has passed into the field of view FOV, and thereby trigger image acquisition by the camera assembly 110 with appropriate timing. Additionally, the conveyor 130 can include an encoder or other motion-measurement device that (optionally) transmits general speed and/or motion data/information 172 to the process(or) 140 that can be used to control operations in a manner clear to those of skill.

II. General Operating Procedure

Figure 2:
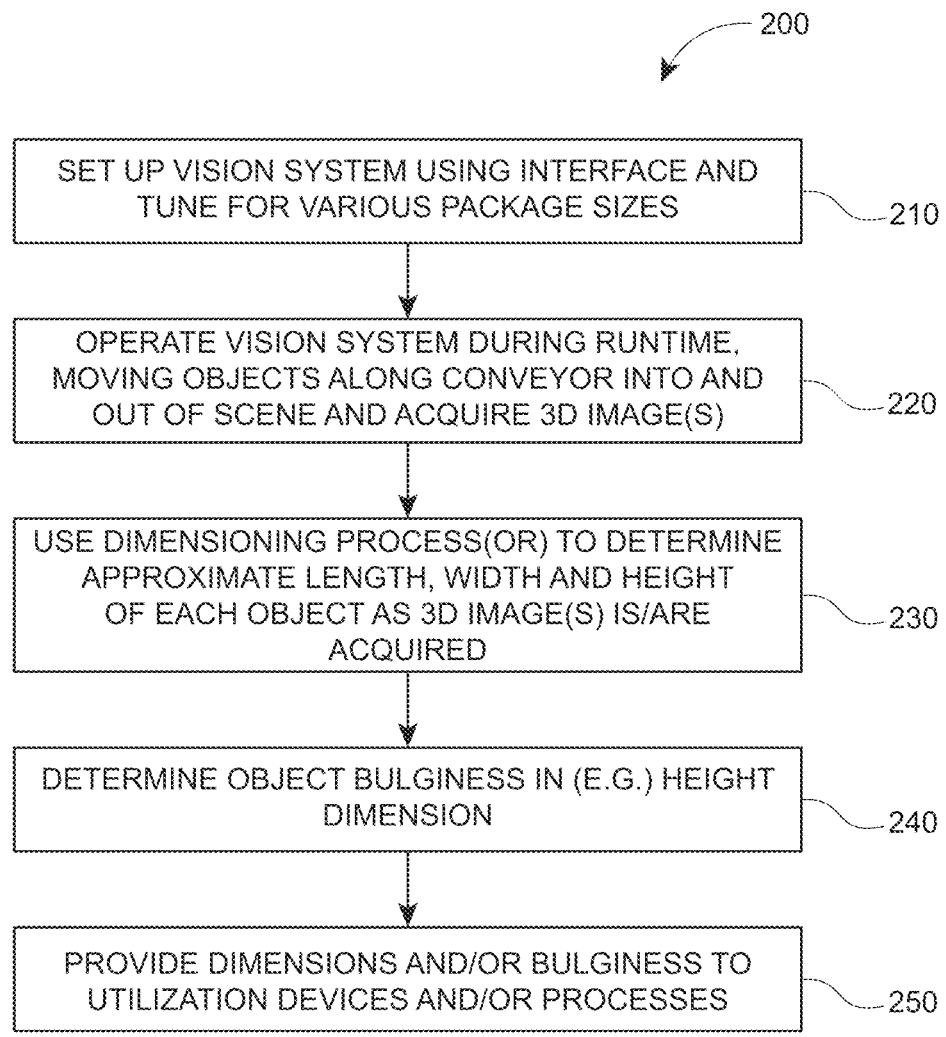
FIG. 2 is a flow diagram showing an overall procedure for setup and runtime operation of the vision system and associated dimension determination procedure of FIG. 1.

The operation of the system and method herein, as implemented by the camera assembly 110, with process(or) 140 and computing device 150 is described with reference to the procedure 200 of FIG. 2. The system is set up and tuned so that it can properly recognize and determine dimensions for objects/packages of various sizes during a pre-runtime, setup (training) in step 210. During this time, example packages are passed through the FOV of the camera assembly 110 and the user selects various settings and parameters. Performance of the setup phase is described in further detail below with reference to the GUI and its various screens (FIGS. 10-16).

Figure 1A:
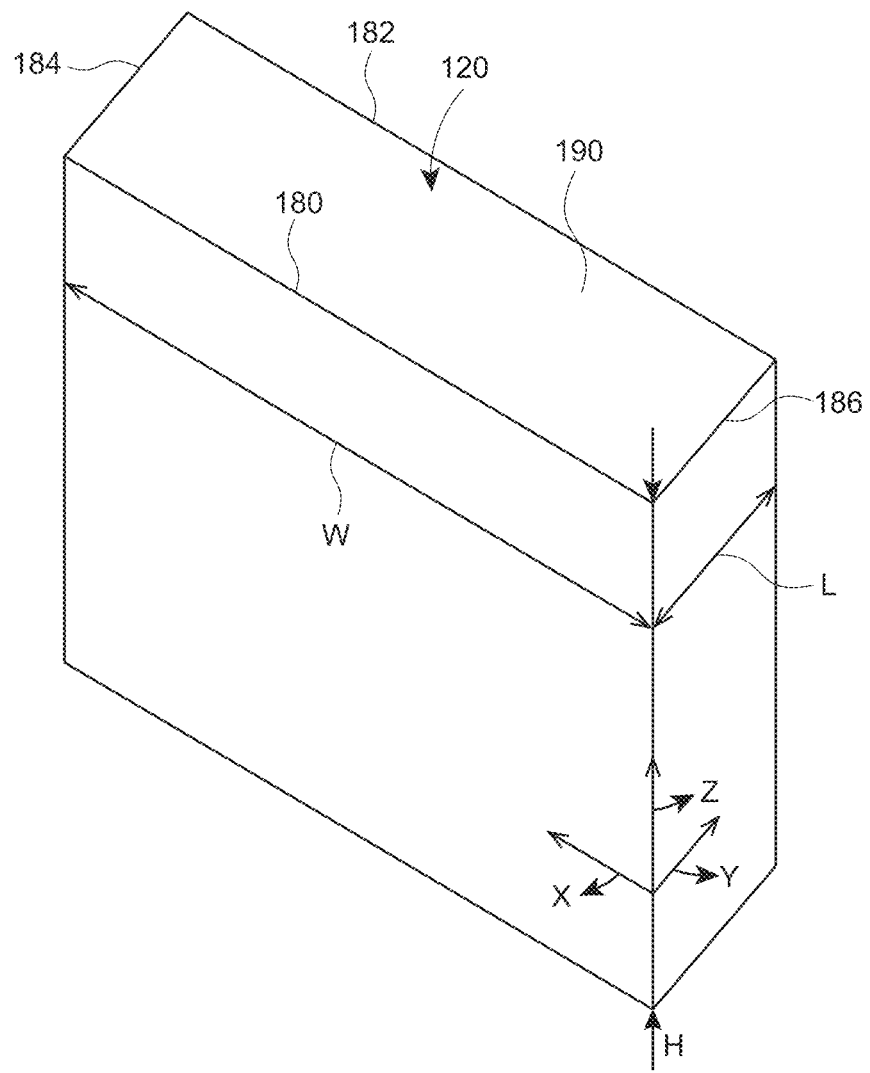
FIG. 1A is a perspective view of an exemplary, cuboidal object/package 120 shown in FIG. 1, depicting local coordinate axes and dimensions.

Once setup is complete, the system can be operated in runtime, in which objects/packages are driven along the conveyor 130 (or other mechanism for presenting a stream of objects to the FOV—for example, moving carriages), and 3D images are acquired by the camera assembly 110 while such objects/packages each reside within the FOV (step 220). In step 230, the dimensioning process(or) 144, in combination with other vision tools 142, is used to determine the approximate length, width and height of the object from one or more acquired 3D images thereof. These dimensions can be characterized in terms of a local X, Y and Z coordinate system with respect to the individual object/package. The axes can follow, the edges/corners of the object's generally cuboidal shape as shown in FIG. 1A for exemplary object 120 (FIG. 1). Edges can be located using conventional vision tools, such as edge detectors. The details of the processes used to perform the dimensioning are described in further detail below. Such processes can further include determination of bulginess of the objects/packages (step 240), so that an accurate maximum height can be established in cases where the outer edges (top edges 180, 182, 184 and 186 in FIG. 1A) and of the object/package are shorter in height H than a central region of the top surface 190. These dimensions can then be transmitted with any other appropriate information (e.g. identification information from a decoded label barcode) to one or more utilization devices or processes (e.g. conveyor control, logistics databases, etc.) in step 250.

III. Dimensioning Procedures

A. Overall Procedure

The dimensioning process(or) employs various statistical procedures to generate dimensions relative to 3D-imaged objects (e.g. packages shown herein) in both training and runtime. The procedures can be used variously in combination, or individually. They include (a) Points Statistical Analysis (PSA), (b) Boundary Statistical Analysis (BSA), (c) Height from Least Squares Surface Fitting and (d) Height from Bulginess. The first two procedures PSA (a) and BSA (b) are independent alternatives for refining the length and width dimensions of a bounding box for the object. The third procedure (c) is for refining the height dimension, and can be applied after applying either PSA or BSA. The fourth procedure (d) also refines the height dimension based on a bulginess estimate for the object. Notably, each of these procedures can be performed exclusively using acquired 3D point clouds, and free of any 2D images, of the object. The elements of the procedures (a)-(d) include (i) projections, (ii) statistics, (iii) histogram analysis, (iv) probability density estimation, and (v) regularized least squares fitting of planes.

Figure 3:
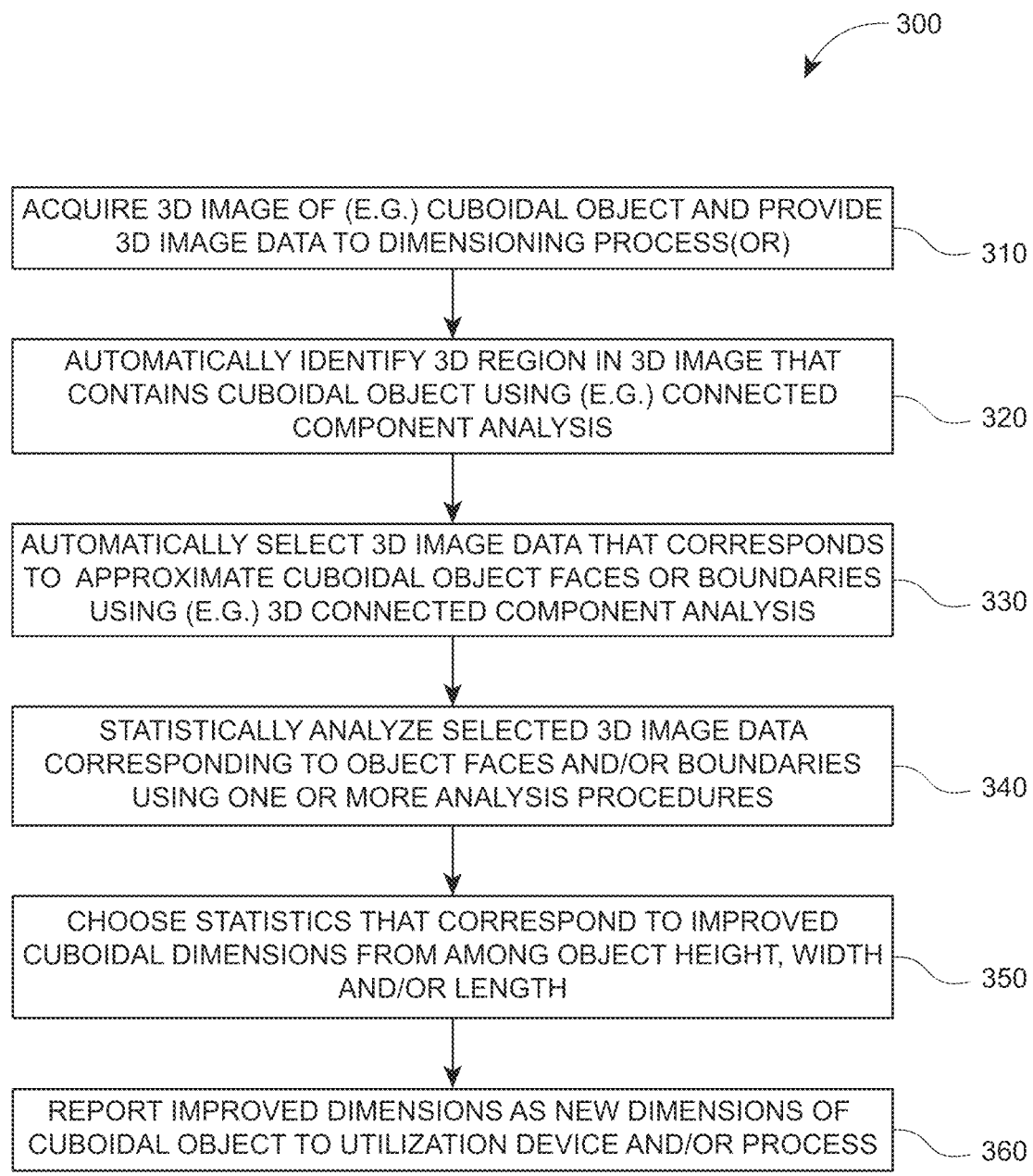
FIG. 3 is a flow diagram of a procedure for runtime dimensioning of a cuboidal object in accordance with FIGS. 1 and 2.

With reference to the procedure 300 of FIG. 3, as 3D images (e.g. point clouds) of cuboidal objects are acquired by the camera assembly, such data is provided to the dimensioning process(or) 144 (step 310). In step 320, the dimensioning processor automatically identifies a 3D region in the overall 3D image data that contains the object. This can be accomplished using, e.g. connected component analysis. In general connected component analysis operates by identifying groups of voxels (3D points) of the 3D image that are adjacent to each other and that excluding the groups of voxels that are characterized by less than a threshold number of adjacencies. That threshold can be fixed or varied based upon user input via the GUI. In step 330, the process(or) automatically selects 3D image data that corresponds to approximate cuboidal object faces (i.e. a set of orthogonal planes bounded by approximately rectilinear edges) or boundaries/edges using the connected component analysis. Then, in step 340, selected 3D image data corresponding to the object faces and/or boundaries are statistically analyzed using one or more of the statistical analysis procedures (a)-(d) described above. In step 350, the process(or) choses statistics (i.e. using one or more of procedures (a)-(d) above), which correspond to improved cuboidal dimensions from among object height, width and/or length. Then, in step 360, the dimensioning process(or) reports the improved dimensions as a set of new/updated dimensions for the 3D-imaged cuboidal object to a downstream device and/or process for its use and operations.

Figure 4:
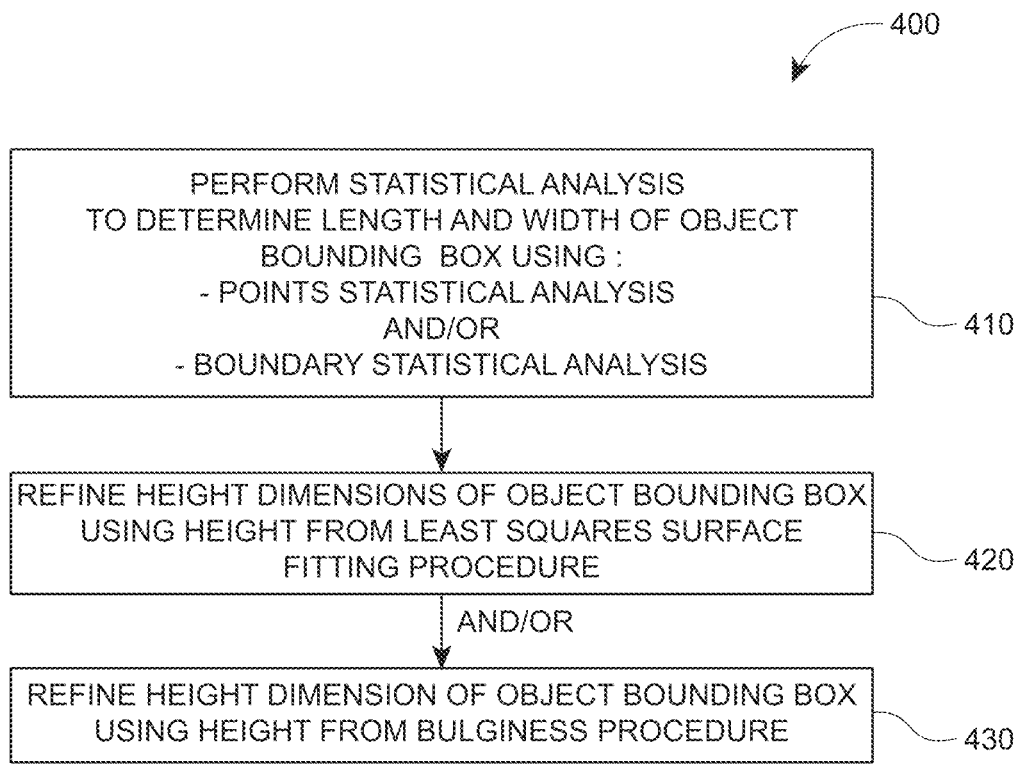
FIG. 4 is a more generalized runtime procedure for applying statistical analysis to determine the length and width of objects, and refining procedures to determine height of objects, including bulkiness, according to the procedure of FIG. 3.
Figure 5:
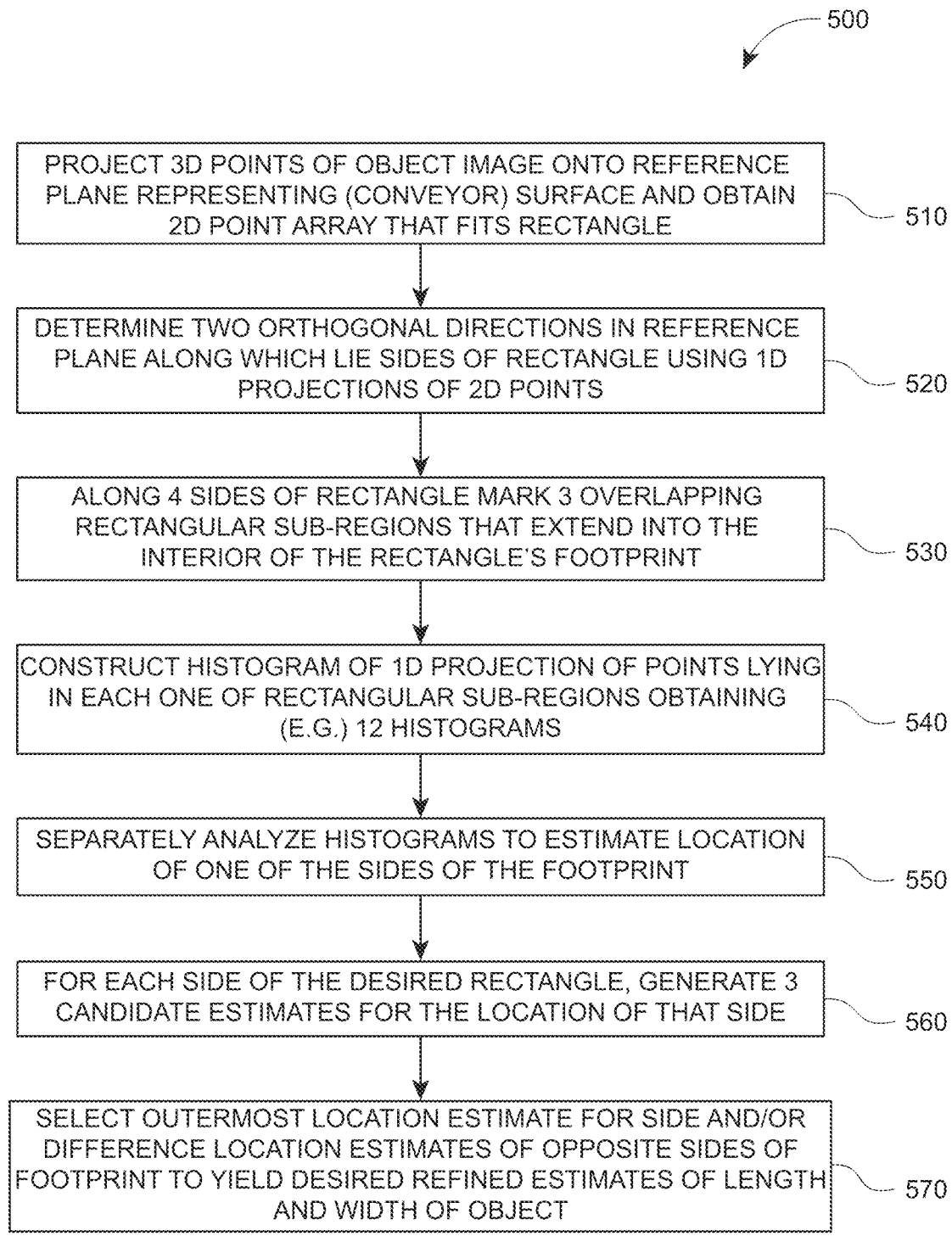
FIG. 5 is a point statistical analysis procedure for determining length and width dimensions of objects, in accordance with the procedure of FIG. 4.

In FIG. 4, a procedure 400 for applying statistical analysis techniques ((a)-(d) above) is shown and described. The procedure 400 initially determines the length and width of the cuboidal object and/or an associated bounding box within the image data using one or both of PSA and BSA in step 410. Then, the procedure 400 applies one or both of steps 420 and 430 to, respectively, refine the height dimension of the cuboidal object/bounding box using the height derived from a least squares fitting procedure (420) and/or (b) refine the height dimension of the cuboidal object/ bounding box using the height derived from the bulginess procedure (430, and see procedure 800 in FIG. 8 below). Note that other height-determining procedures, which should be known to those of skill can be employed in further examples.

B. Statistical Analysis

The above described statistical analysis procedures (a)-(d) employed by the dimensioning process(or) in accordance with the overall procedures 300 and 400 are described further below, with reference to corresponding FIGS. 5-8.

1. Points Statistical Analysis (PSA)

In a noisy point cloud, the 3D points relating to an object are often spread over a region larger than the true extent of the object. PSA constructs histograms of values based on the locations of the points and, by their analysis, estimates the likely true extent of the object. Its steps are shown and described in the procedure 500 of FIG. 5.

In step 510, the acquired 3D points of the object are projected onto a reference plane representing the surface on which the object rests (e.g. the conveyor), thereby obtaining an array of 2D points. The dimensions of the rectangle that best fits these 2D points are desired. Then in step 520, the two orthogonal directions in the reference plane along which will lie the sides of the desired rectangle are determined. This can be performed more particularly as follows: (a) starting with an orthogonal pair of directions along which lie sides of the input initial bounding box, consider a set of orthogonal pairs of directions by applying to the starting pair a sequence of small rotations in the reference plane; (b) along the directions in all these pairs, compute the 1D projections of the 2D points; and (c) identify the best orthogonal pair as the one in which the sum of the spans of its 1D projections is minimum.

In step 530, the procedure 500 marks three overlapping rectangular sub-regions that extend some distance into the interior of the footprint along each of the four sides of the initial bounding rectangle that bounds the footprint. In step 540, the procedure then constructs a histogram of the values of one of the 1D projections of the points lying in each one of these rectangular sub-regions. This step obtains a total of twelve histograms.

In step 550 of the PSA procedure 500, the histograms are each separately analyzed to estimate the location of one of the sides of the footprint. The analysis includes: (a) calculating thresholds based on the frequencies of histogram bins; (b) locating a local maximum in the histogram that also exceeds a threshold; (c) locating the bin whose frequency is half-down from that of the local maximum; (d) calculating the slope of the histogram at the bin of half-down frequency; (e) localizing, to sub-bin precision, the point where the frequency crosses the half-down point, and (f) declaring this cross-over point to mark the transition from inside the object to outside, thus obtaining a candidate estimate of the location of one of the sides of footprint of the object.

In step 560, for each side of the desired rectangle, the above-described analysis steps (a)-(f) yield three (3) candidate estimates for the location of that side. From those three, the outermost candidate estimate is selected so as to mitigate the possible effect of unwarranted erosion of portions of footprint sides due to imperfections in 3D imaging. Differencing the location estimates of opposite sides of the footprint yields the desired refined estimates of length and width dimensions of the object (step 570). This result is then delivered to the dimensioning process(or) 144.

2. Boundary Statistical Analysis (BSA)

Figure 6:
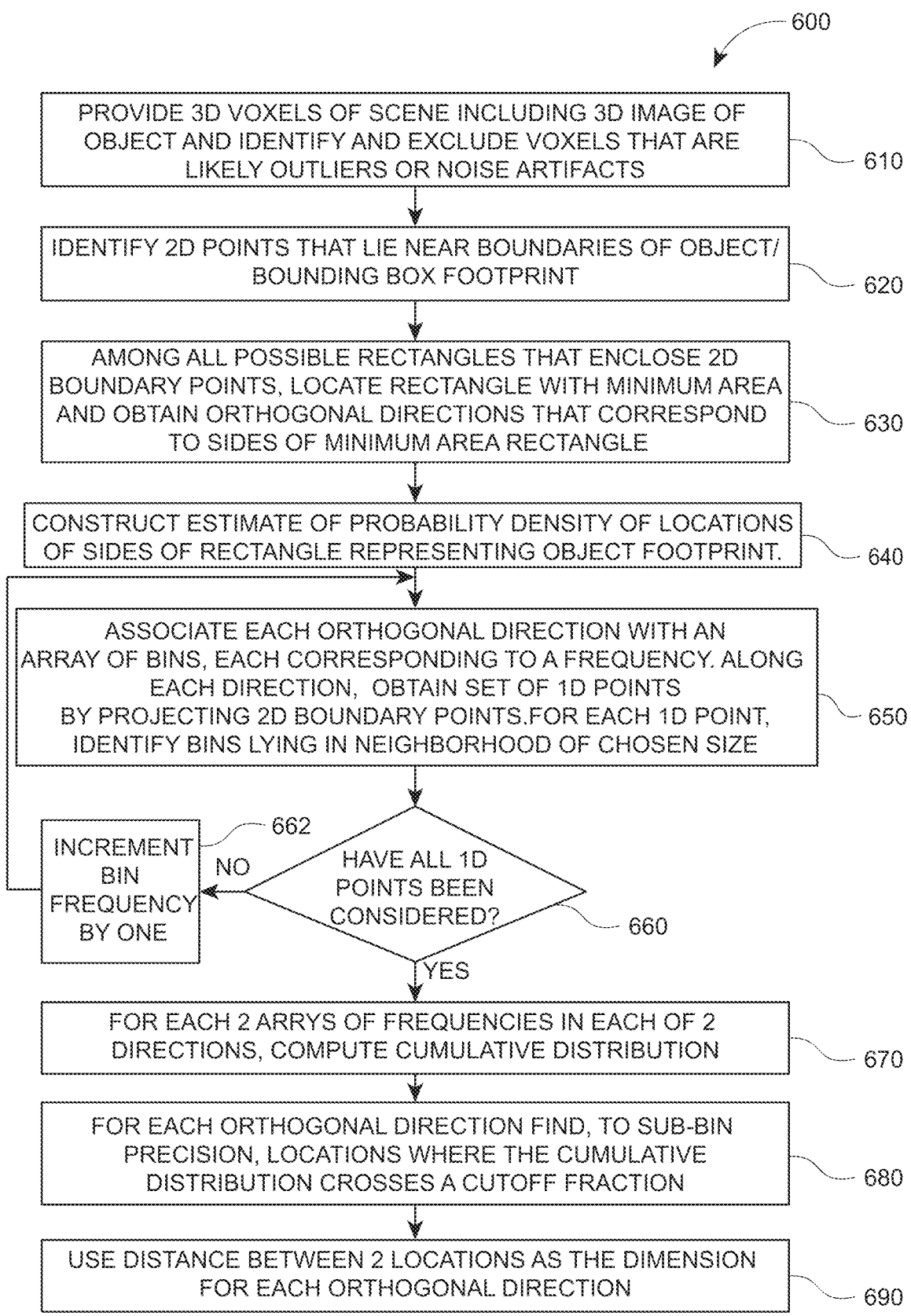
FIG. 6 is a boundary statistical analysis procedure for determining length and width dimensions of objects that can be used in conjunction with, or as an alternative to, the point statistical analysis procedure of FIG. 5, in accordance with the procedure of FIG. 4.

With reference to the procedure 600 of FIG. 6, BSA estimates the length and width dimensions of the object by constructing and analyzing estimates of the probability densities of the locations of the sides of the rectangular footprint. The density estimates are formed using the Parzen window technique of statistics. The inputs of BSA include the set of voxels that a 3D blob tool (from vision tools 142) has declared as belonging to the object. The BSA procedure 600 begins in step 610 in which, of the voxels belonging to the object, those voxels that are likely to be outliers or noise artifacts are excluded. This exclusion can be performed using (e.g.) connected component analysis so as to group voxels in patches and discard the ones in sufficiently small patches. Then, instep 620, 2D points that lie near the boundaries of the footprint of the object are identified. This identification can be performed by the following steps: (a) project the voxels of the objects onto the reference plane to obtain a 2D mask region; (b) find the pixels on the outer boundary of this mask region; and (c) of the set of 2D points that are the projections of the 3D points of the object onto the reference plane, identify the subset that lie on the outer boundary pixels.

In step 630, the procedure 600 finds the rectangle with the minimum area among all possible rectangles that enclose the 2D boundary points. It then obtains the pair of orthogonal directions that correspond to sides of the minimum area rectangle. The procedure 600 constructs an estimate of the probability density of the locations of the sides of the rectangle representing the object's footprint (step 640). It regards the orthogonal directions identified above as being divided into bins, each with an associated frequency that is initially zero. Along each orthogonal direction, a set of 1D points is obtained by projecting the 2D boundary points. Then, for each 1D point, the bins lying within a neighborhood of a chosen size are identified (step 650). A determination is made whether each 1D point makes a contribution (decision step 660) to each neighboring bin. If yes, the bin frequency value for that 1D point is incremented by one (1) in step 662, and step 650 is repeated. After all 1D point have been considered (decision step 660), then the frequency of any bin is now proportional to an estimate of the probability that the boundary of the footprint falls in that bin.

When the incrementing of values yields a result in which all 1D points have contributed, then for each of the two arrays of frequencies, one per direction, the procedure 600 computes the associated cumulative distribution (step 670). This computation can proceed as follows: (a) find the locations closest to the first and last occupied bins where the frequency is a local maximum; (b) form two sequences of partial sums of frequencies from the first and last bins up to their respective nearest local maximum; and (c) normalize these two sequences by the final sum value of each sequence, obtaining values monotonically increasing from 0 to 1 as one moves in from either end of the array of bins.

Separately, according to step 680, for each orthogonal direction, the procedure finds, to sub-bin precision, the two locations where its cumulative distribution crosses a user-specified cutoff fraction—one near the first bin occupied and the other near the last. The distance between these two locations yields the desired estimate of one of the dimensions of the object. The cutoff points along the other direction thereby yield the other dimension (step 690) in the other orthogonal direction. Thus, both length and width estimates are obtained, and this result is provided to the dimensioning process(or) 144.

3. Height from Least Squares Surface Fitting

Figure 7:
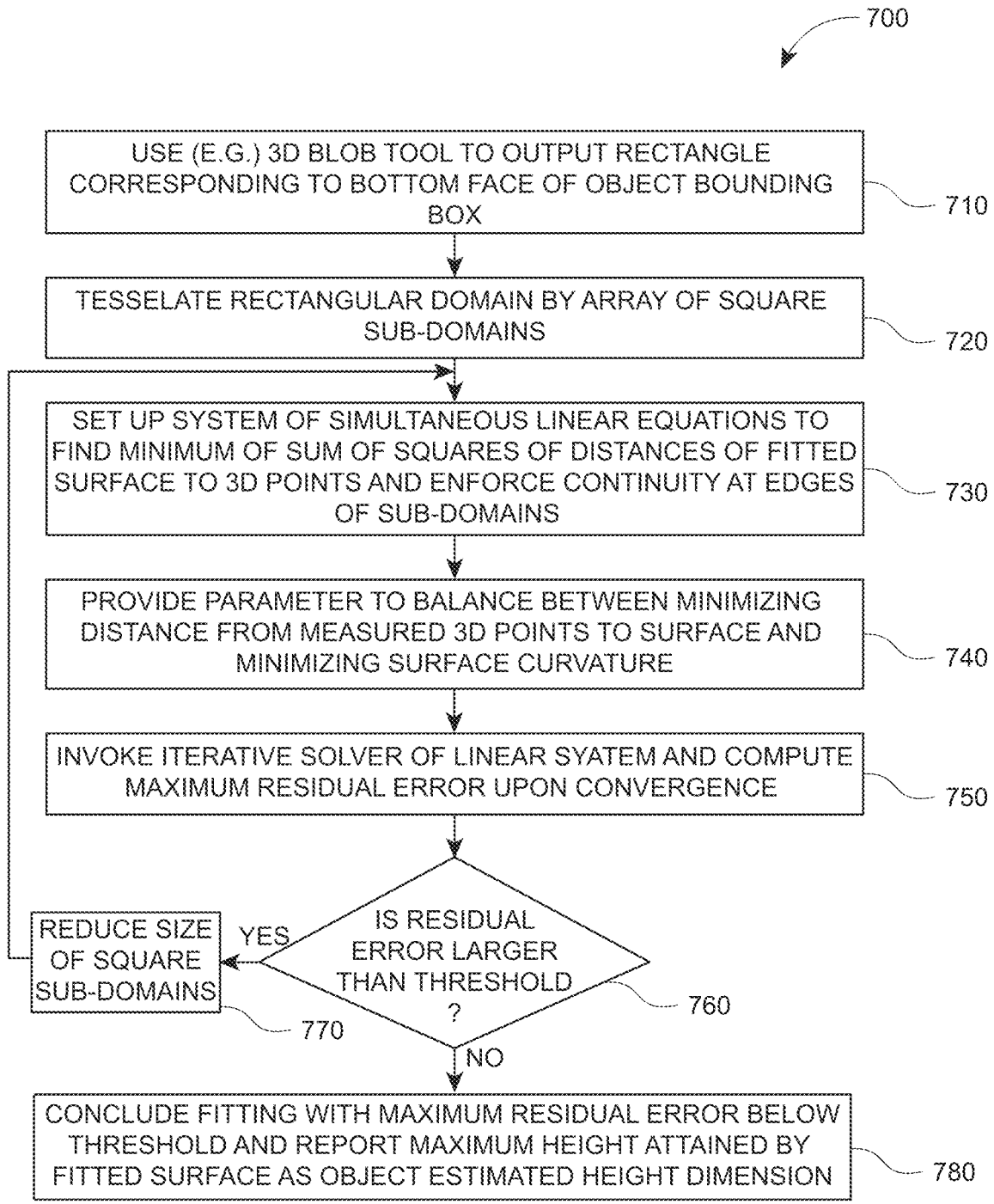
FIG. 7 is a height from least squares surface fitting procedure for determining heights of objects, in accordance with the procedure of FIG. 4.

After determining length and width dimensions using PSA and/or BSA, described above, the relative height of the object/bounding box is determined. One exemplary procedure 700, described in FIG. 7, is height from least squares surface fitting, which estimates the height dimension of 3D objects/bounding boxes in acquired 3D image data. This procedure is particularly desirable with objects defining a generally non-planar (e.g. curved or bulging top surface, such as jiffy-mailers and/or polybags. The procedure 700 performs a regularized least-squares fit of the 3D points of the object's top surface, striking a balance between fidelity to the object's true surface and smoothing-out of associated noise in the image data at this region. In an exemplary implementation, the procedure estimates piecewise planar surfaces, but other implementations are contemplated. The maximum height attained by the fitted surface is output as the estimated height of the object.

The procedure 700 begins in step 710, using (e.g.) a 3D blob tool to output a rectangle corresponding to the bottom face of the object's bounding box. In step 720 this rectangular domain is tessellated by an array of square sub-domains. With the intent of fitting a function to the 2D domain, and with the form of the function being planar in each sub-domain, the procedure sets up a system of simultaneous linear equations in step 730. The equations seek the minimum of the sum of the squares of the distances of the fitted surface to the 3D points and enforce continuity at the edges of the sub-domains. Then, a parameter is provided in step 740 to balance between minimizing the distance from the measured 3D points to the surface, and minimizing the surface curvature. The procedure 700 then invokes an iterative solver of the linear system in step 750. Upon convergence, the maximum residual error of the surface fit is computed in this step.

If the residual error is larger than a specified (fixed or user-input) threshold (decision step 760), the procedure 700 indicating an object whose top surface has high curvature, and reduces the size of the square sub-domains (step 770). The procedure then repeats steps 730-760. Once the maximum residual error falls beneath the threshold (decision step 760), the fitting concludes (step 780) and the procedure reports maximum height attained by the fitted surface as the object's height dimension estimate to the dimensioning process(or) 144.

4. Measuring Box Top Bulginess

Figure 8:
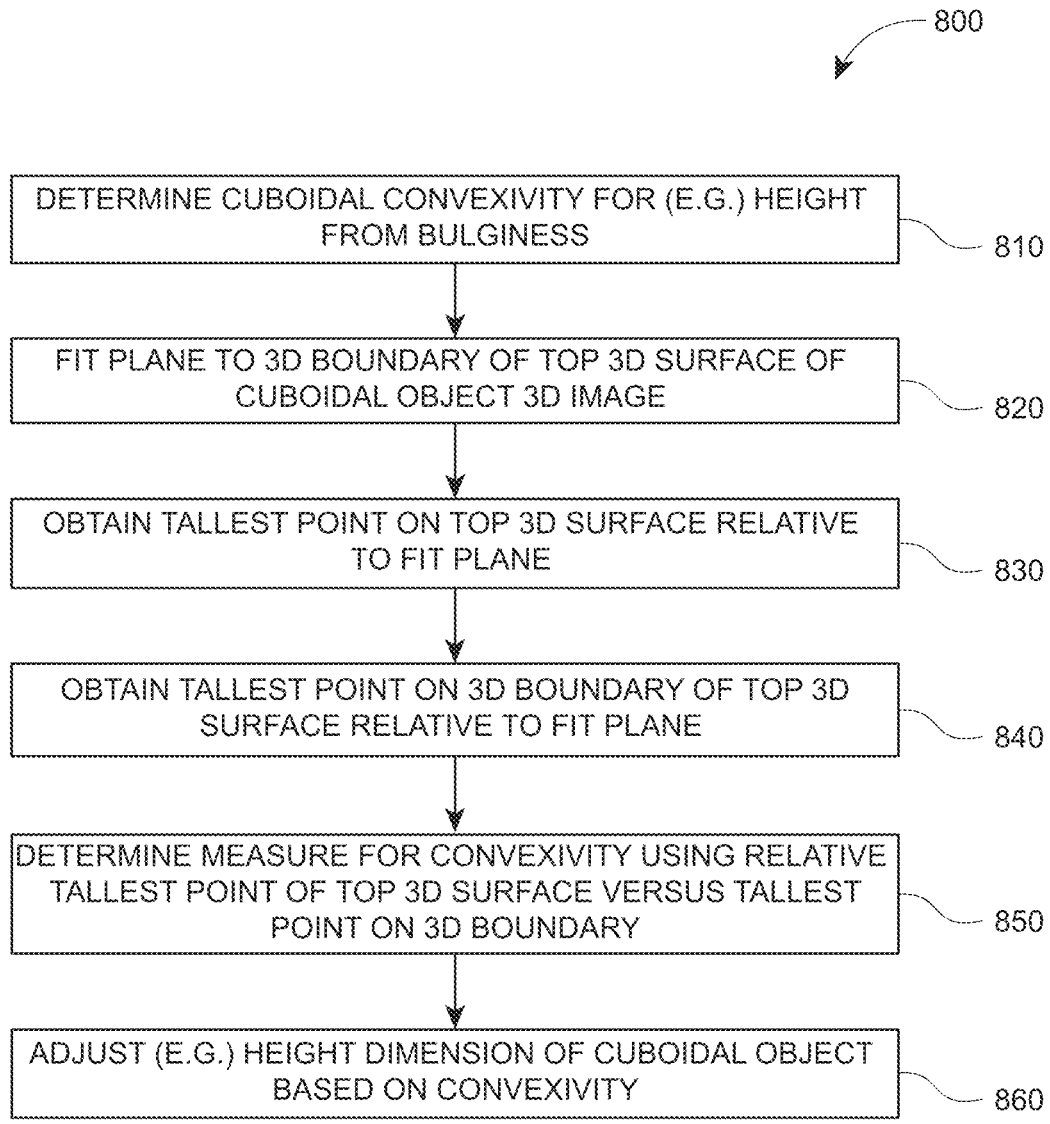
FIG. 8 is a measuring object convexivity/bulginess for use with the procedure of FIG. 2.

FIG. 8 shows and describes a procedure 800 for measuring the bulginess of a cuboidal object. As described herein, the X, Y and Z directions are taken with respect to the object's local coordinate system (see FIG. 1A), as such, the Z-axis is generally perpendicular to the top surface plane of the object. More particularly, the procedure 800 computes the bulginess to indicate to what degree the top of the object differs from an expected plane (block 810). The procedure first fits a plane (termed a boundary plane) using the collected 3D boundary points from the 3D image with the (e.g.) Ransac method (step 820). The procedure 800 then identifies the voxel peak Z (tallest point) of the top surface that has the largest Z value (step 830). In step 840, the procedure 800 also walks along the boundary of the object to compute run-average Z values of the 3D boundary points and records the largest/tallest point (termed boundary peak Z).

The procedure then determines the measurement of convexivity by using the voxel peak Z (tallest point) on the top surface versus the boundary peak Z in step 850. This procedure includes the following steps: (a) compute the distance (termed dis1) from the voxel peak to the boundary plane; (b) compute the Z distance (termed dis2) from the voxel peak's Z to the boundary peak Z; (c) compute the bulginess value using (e.g.) a fuzzy inference system (FIS) with some fuzzy rules, which can be characterized as:

(i) if dis1 is Small and dis2 is Small then box top's bulge is Small;

(ii) if dis1 is Large and dis2 is Large then box top's bulge is Large; and (iii) if dis1 is Large and dis2 is Small then box top's bulge is Large;

(d) for each input variable (dis1 and dis2), define two fuzzy sets Small and Large with membership functions respectively formulated by Z-shaped and S-shaped functions. For the output variable bulge, define two fuzzy sets Small and Large with linear membership functions. The maxima-based defuzzification result of the FIS gives the value of bulginess in the range from 0 to 1. This value is used to adjust the overall height dimension (step 860), which is reported as results by the dimensioning process(or) 144.

5. Adapted Bounding Box Height Computation

In an exemplary implementation, an adapted bounding box height computation can be employed to compute height of the object/bounding box. The following sub-steps can be employed: (a) compute the first object/box top surface Z value as follows:

(i) compute the histogram of Z values of the surface voxels;

(ii) search from the high end of the histogram to locate the first segment consisting of non-empty consecutive bins and including sufficient number of voxels; and (iii) identify the maximum peak inside this segment and use the peak's corresponding location as the first Z value of the object/box top surface;

(b) Compute the second object/box top surface candidate Z as follows:

(i) perform patch segmentation on surface voxels.

(ii) identify the largest-size patch and locate its peak voxel that has the largest Z value; and (iii) collect the (e.g.) 15×15 nearest neighbors of the peak voxel and compute their majority Z value using histogram analysis;

(c) compute the combined object/box top surface Z by a weighted average with the following equation:

$$Z = \text{first candidate } Z*(1-\text{bulginess})+\text{second candidate } Z*\text{bulginess};$$

and, (d) determine the object/box height using the Z distance from the combined Z to the box base which is aligned with workspace's X-Y plane.

IV. User Interface

Setup and operation of the vision system herein can be accomplished using the user interface process(or) 146 and linked computing device 150, with its various display and interface components 152, 154 and 156. At setup, the display 152 provides the user with various GUI screens that provide information and prompt the user for inputs. Notably, the GUI delivers interactive data to the user in relatively straightforward terminology that is adapted to the user (e.g. a logistics manager), rather than a vision system expert. The GUI presents a graphical representation that attempts to mimic the user's environment in which the vision system is employed. The GUI, thereby, assists and guides the user in the setup of the vision system, in part, by showing the limitations of the actual environment (conveyor width, camera parameters, camera distance, etc.) and directing the user where to locate and mount system components, such as the camera(s) and triggering device(s) (e.g. photodetectors).

Figure 9:
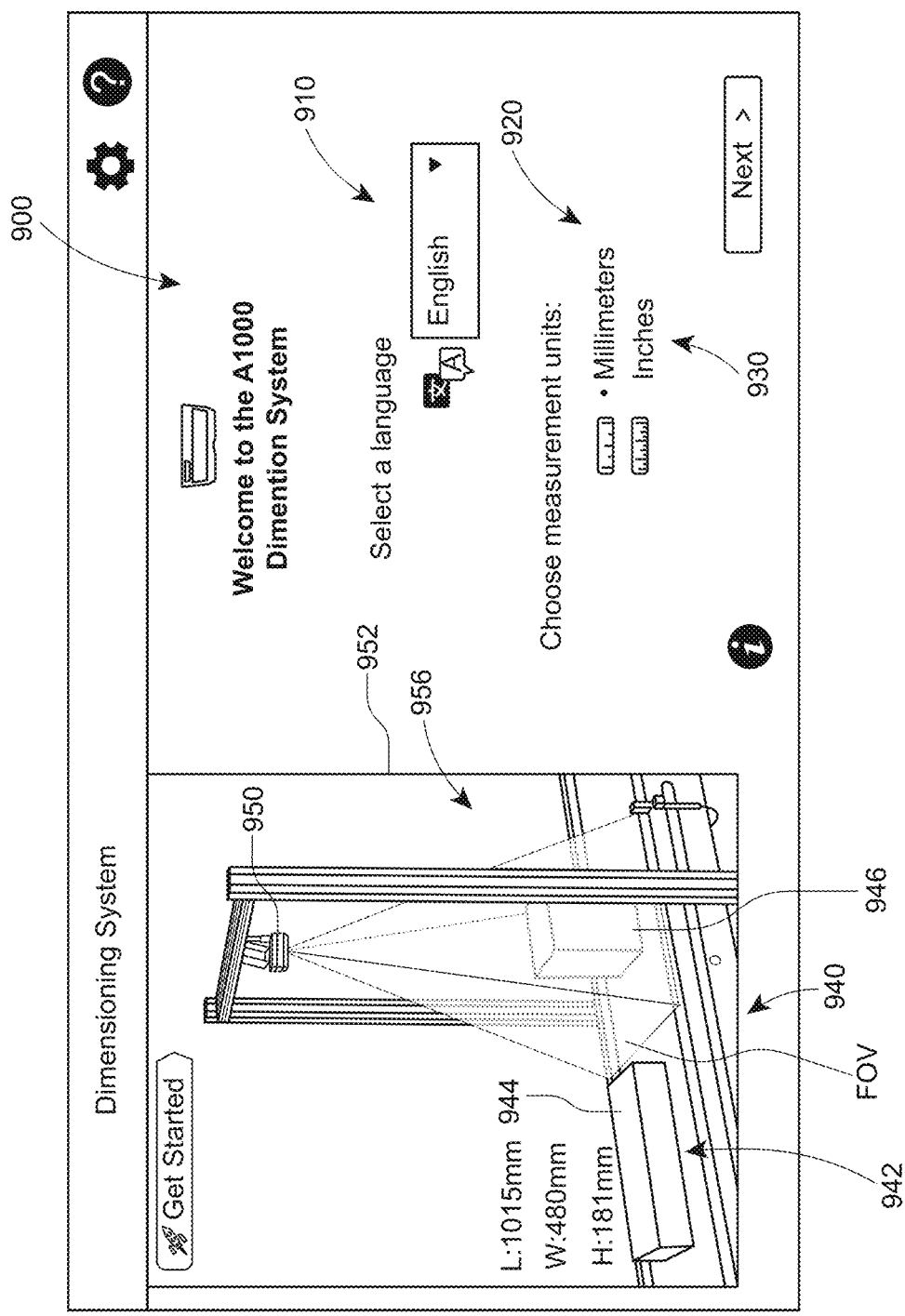
FIG. 9 is a diagram of an exemplary screen display of a graphical user interface (GUI) for use in setup/training and runtime operation of the vision system of FIG. 1, showing a plurality of languages and units of measure for selection by the user.

FIG. 9 depicts a GUI display screen 900 that is provided to a user upon system startup/setup. The exemplary screen 900 provides options for language 910 and measurement units 920 (e.g. millimeters or inches) on the right hand panel. The left hand panel 940 includes a graphical representation of a typical physical setup with a conveyor 942, objects/packages 944 and 946, and the camera assembly 950, mounted on an overhead framework 952. As shown the camera assembly images a pyramidal volume space 956 with a field of view FOV highlighted on the surface of the conveyor 942. A Next button, allows the user to move to the next setup display screen 1000, shown in FIG. 10.

The Application Details display 1000 (FIG. 10) provides settings for mechanical setup of the system. The right hand window 1010 provides conveyor parameters (information) 1012 and object parameters (package information) 1014. The conveyor information 1012 can allow setting of belt width 1020, minimum gap between objects 1022, maximum line speed (in m/sec) 1024 and trigger type (e.g. using detectors, software, hardware, etc.) 1026. The set parameters allow the system to compute and display the working distance 1030 and trigger distance based upon known parameters of the camera assembly and their limitations for proper image acquisition/processing. These camera parameters are used by the vision system and camera to determine optimal focus, exposure, field of view, and other 3D imaging parameters, which should be clear to those of skill. More particularly, the system contains knowledge of the general parameters of the camera and its associated optics/image sensor. The setup procedure correlates the user-input settings with the performance parameters of the camera and determines optimal mounting position, etc. This is described further below. The object information window 1014 provides minimum (1060) and maximum (1070) object dimensions (length, width and height) as shown. This information is also used to determine the working distance 1030 and trigger distance 1032. A left-side graphic 1080 shows the current action or setting to assist the user in setting parameters. It essentially provides a 3D map model of the user's environment that can assist in performing the setup. This graphic 1080 can vary as the user changes the settings so as to represent the actual effect a setting change has upon the system.

Figure 10:
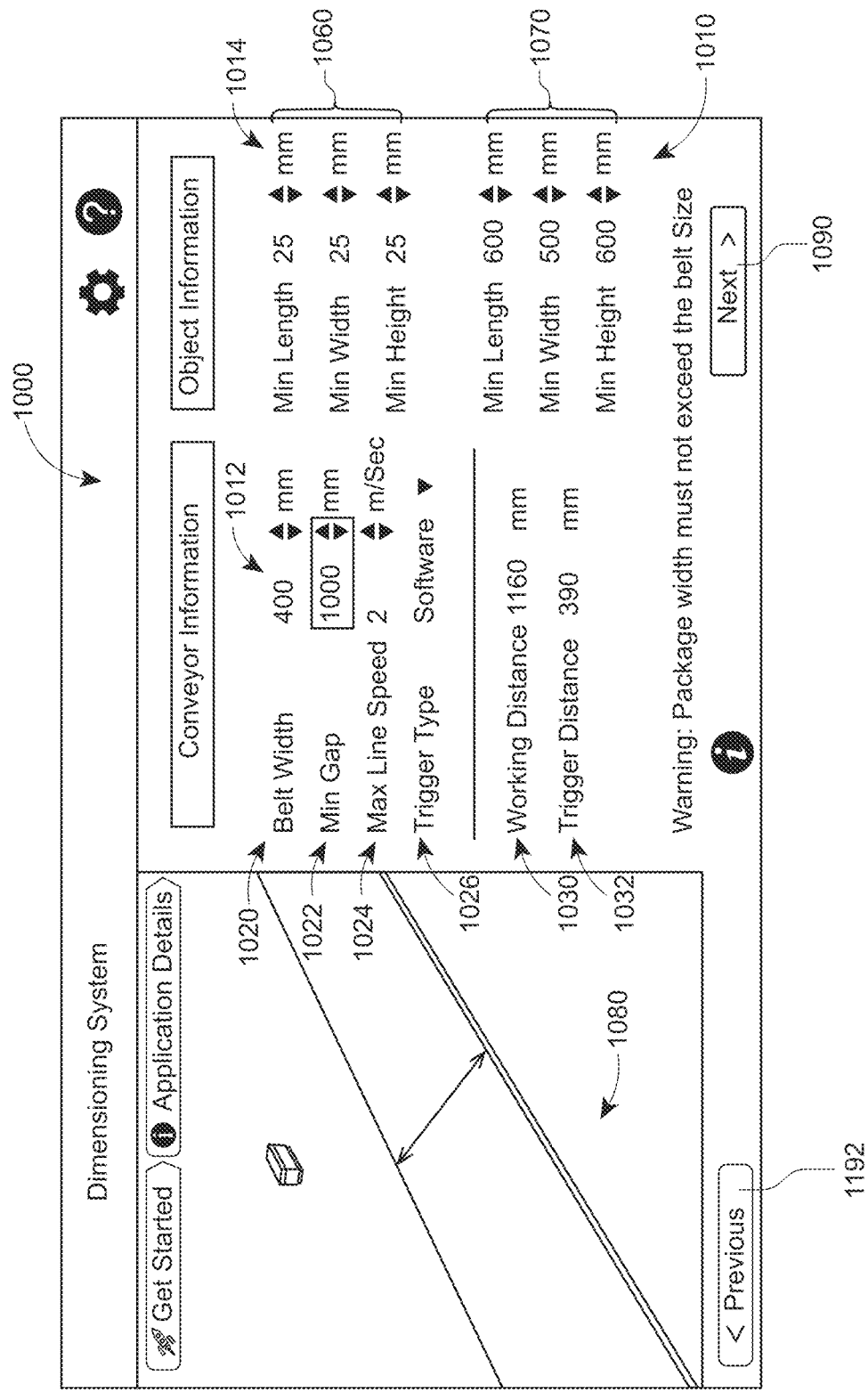
FIG. 10 is a diagram of an exemplary display screen of the GUI of FIG. 9, showing an application details parameter setup screen, including calculated results to be used for mechanical setup of the system, such as working distance and trigger position.
Figure 10A:
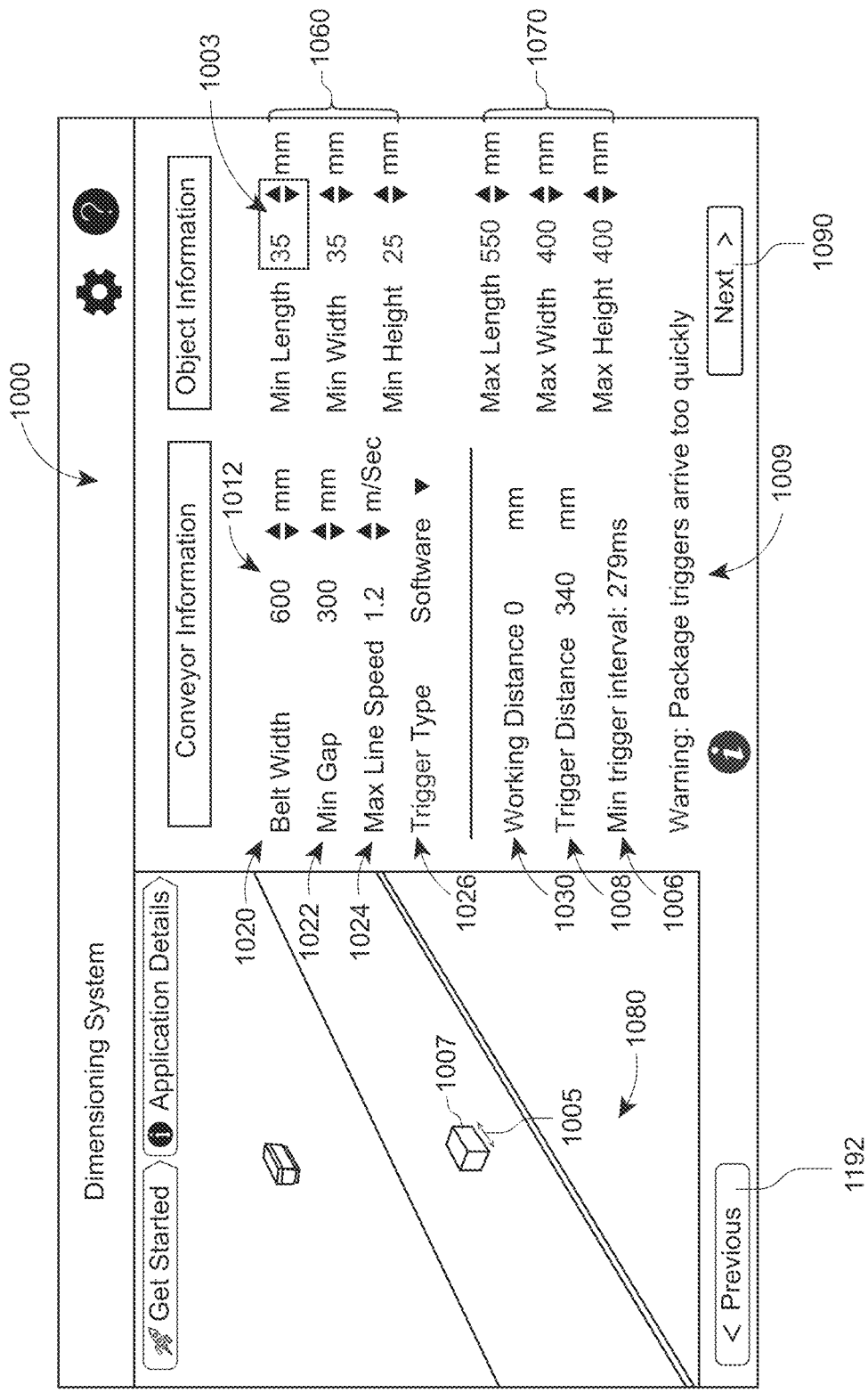
FIG. 10A is an exemplary display screen of the GUI of FIG. 9, showing the application details parameter setup screen in which a minimum object size parameter (e.g. length) is set, by way of example.

With reference to the exemplary display 1001 of FIG. 10A (with similar elements to display 1000 being similarly numbered throughout this description), the user can visualize the relative size of a minimally sized object 1007 as the dimension being adjusted (double-arrow 1005) is highlighted in the minimum dimension block 1060. As described below, the current state of image acquisition trigger timing is shown in the dialog 1009 (along with minimum time interval (1006), and the current trigger distance setting is provided in box 1008.

Figure 10B:
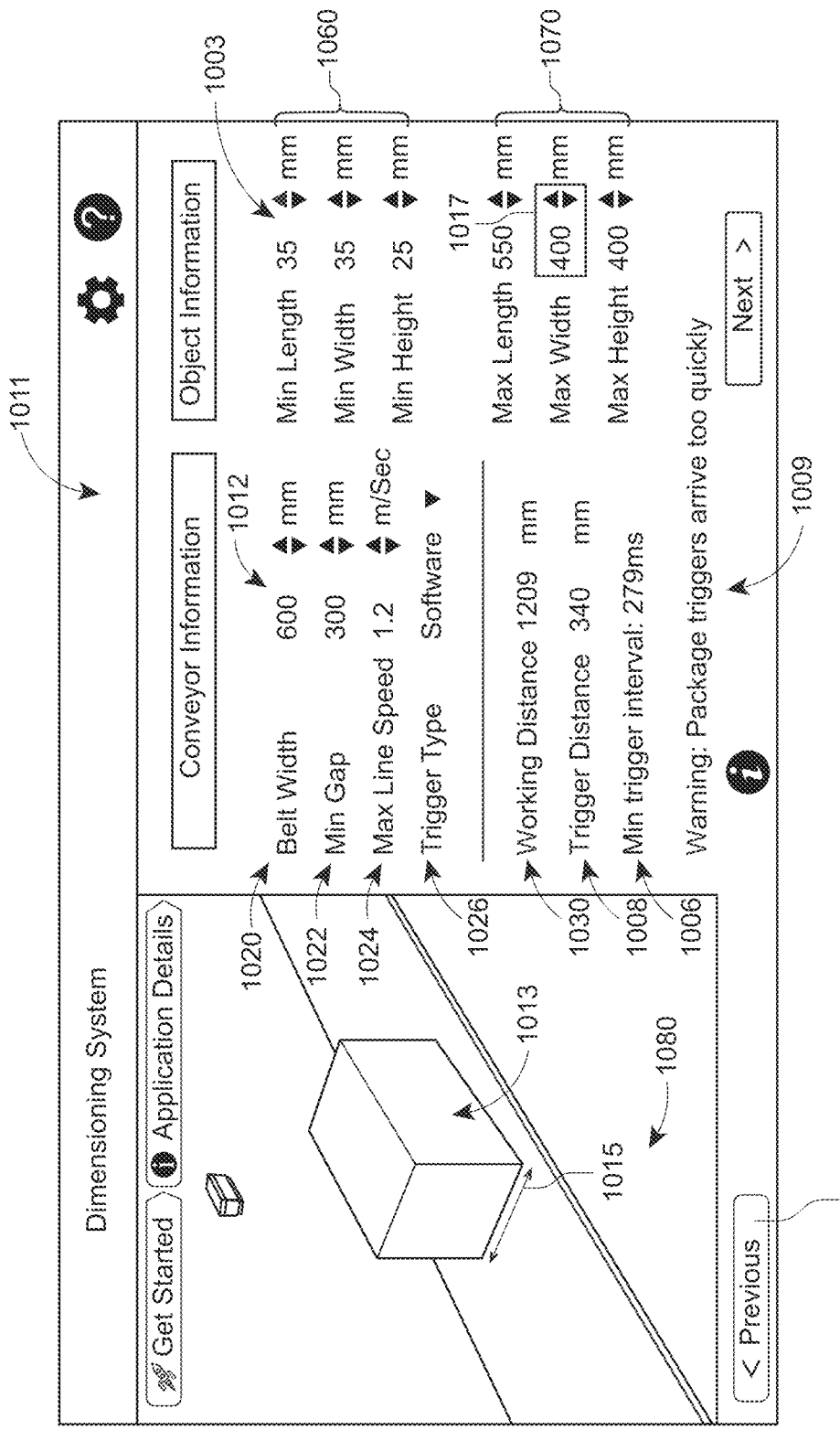
FIG. 10B is an exemplary display screen of the GUI of FIG. 9, showing the application details parameter setup screen in which a maximum object size parameter (e.g. width) is set, by way of example

With reference to the exemplary display 1011 of FIG. 10B, the user sets the maximum object size, which is visualized as depicted object 1013. The exemplary maximum width (denoted by double-arrow 1015) is highlighted in box 1017 of maximum dimension block 1017. In general, the combination of setting windows and visualization of the results of changing settings (via the left window 1080), provides an intuitive and straightforward experience for the user throughout the setup process described below.

Figure 11:
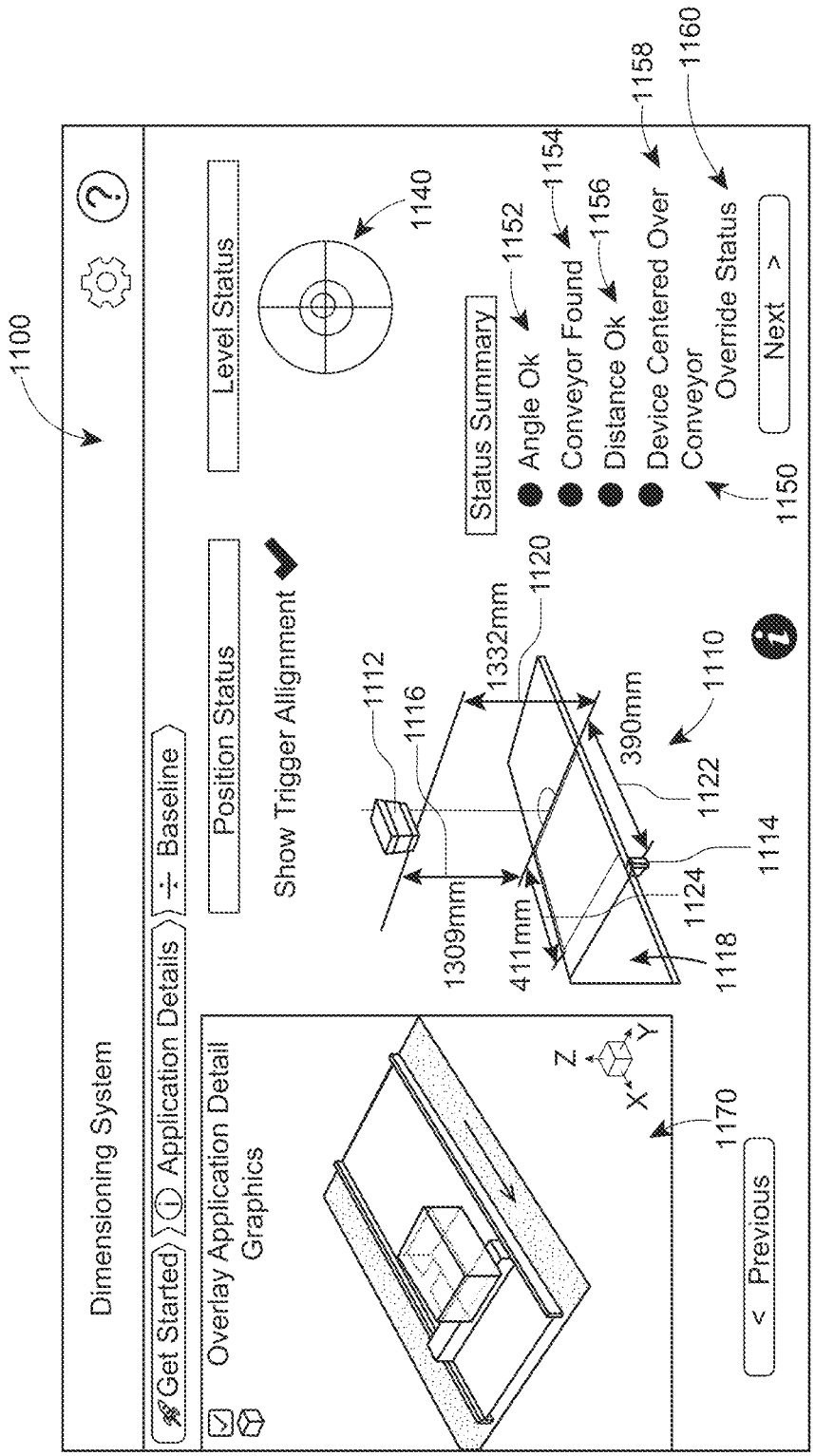
FIG. 11 is a diagram of an exemplary display screen of the GUI of FIG. 9, showing a baseline settings screen for active alignment of the system components to the user's environment and the acquisition of a baseline image of the scene, thereby providing user feedback for (e.g.) camera distance and angle to the conveyor (mounting) surface.

Once all parameters are set, the user clicks the Next button 1090 to advance to the next step, the baseline procedure, which is shown in display 1100 of FIG. 11. Note that the user can return to a previous display screen by clicking the previous screen button 1192, a version of which is provided in each subsequent screen described below.

An exemplary version of a baseline screen 1100 (FIG. 11) is shown in overview in FIG. 11. This screen 1100 allows the user to perform active alignment of the camera assembly to the system environment. That is, the screen is interfaced with the camera, which is actively acquiring 3D imagery of the scene. The display thereby providers a base scene to provide the user feedback desired to make adjustments—including, but into limited to, distance and relative angle to the mounting surface. As shown, the display screen 1100 of an exemplary implementation can include a central, position status window 1110. This window graphically depicts the camera assembly 1112 and an object detector 1114 on the conveyor used to trigger image acquisition of objects by the camera 1112. It depicts the optimal distance 1116 to the conveyor 1118, as well as the actual read distance 1120 from the camera 1112 when capturing an image of the actual conveyor surface. These can be compared and physical adjustments made by the user as appropriate. Additionally, the graphic 1110 shows the optimal trigger position 1122 versus actual trigger position 1124. The camera axis 1130 is shown, and this is used to represent the current level (and alignment/centering) status of the components in window 1140. A bubble-style graphic is shown in this example, but any acceptable representation can be used. Where level is acceptable, the item is colored (e.g.) green. Where level is not acceptable, the display 1140 can depict (e.g.) a different color (e.g. red). Color coding can be used in other status screens herein. A general status summary screen 1150 is shown below the level status 1140. The depicted example reports status of relative angle 1152, conveyor surface found by camera 1154, distance to conveyor surface 1156, and centering of camera over conveyor 1158. In the example, these settings are all in parameter, so the status indicator for each is colored green. If a status were unacceptable (out-of-parameter), the red or another alert color could be displayed. An override box 1160 allows the user to ignore an unacceptable status and continue setup. The left-hand window 1170 shows a point cloud depiction of the imaged scene with current parameters, thereby representing a simulated 3D environment of the system.

Figure 12:
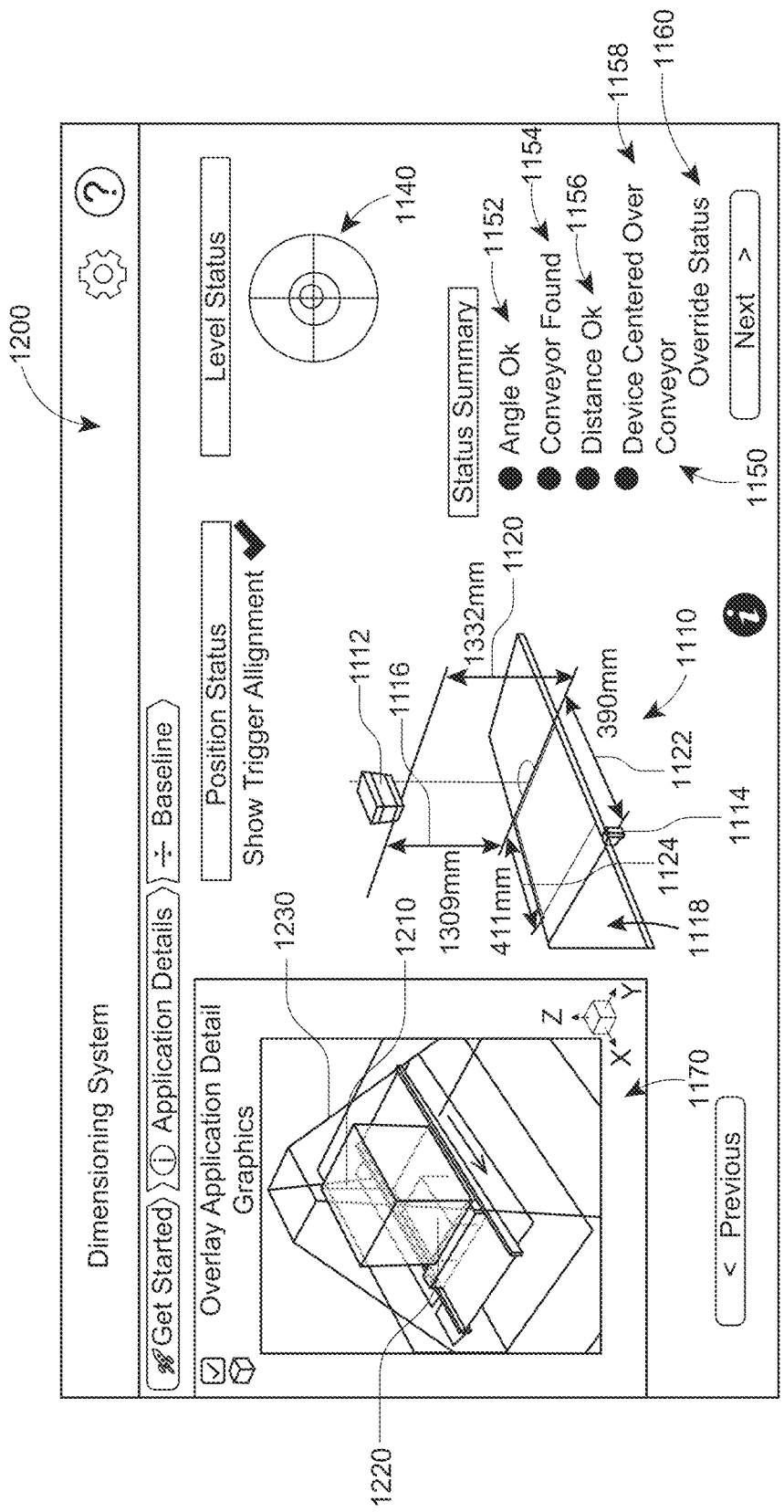
FIG. 12 is a diagram of an exemplary display screen of the GUI of FIG. 9, showing a another depiction of the baseline settings screen for active alignment of FIG. 11, detailing a simulated 3D environment comprised of the largest and smallest objects that the user has input, along with a depiction of the conveyor body, and fields of view.

FIG. 12 is a further depiction 1200 of the baseline screen 1100 from FIG. 11. Like elements are therefore numbered similarly. The left-hand window 1170 shows a representation of the largest object 1220 and smallest object specified by the user in the previous screen 1000 (settings in window 1014, FIG. 10). The imaged volume space 1230 is also shown. In this example, the largest object 1210 remains within the volume space during the trigger interval, and so the depiction can be color-coded green. If the largest object 1210 did not remain within the imaged volume space 1230, the color can be changed (e.g. red) to indicate a potential fault.

Figure 12A:
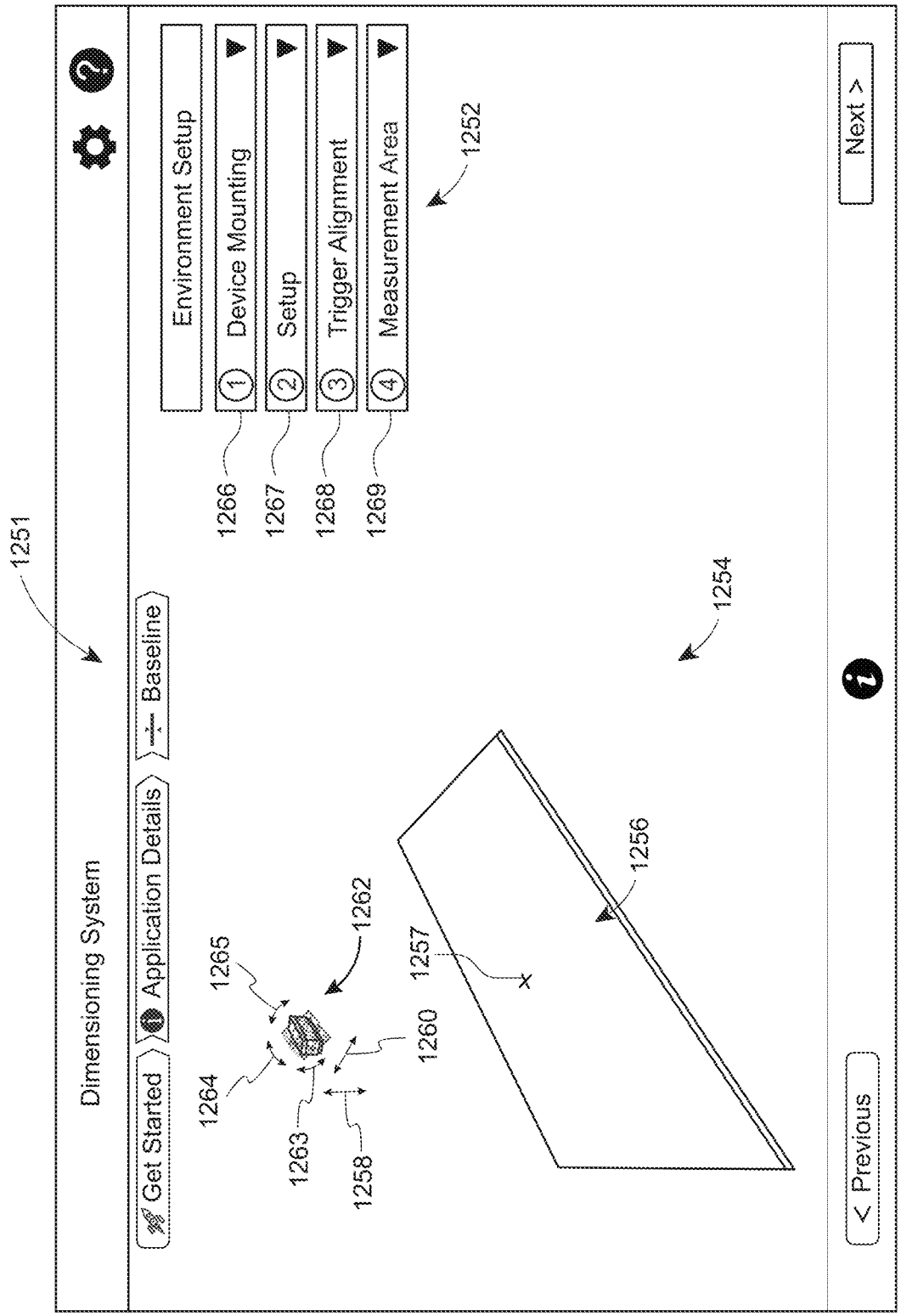
FIG. 12A is a diagram of an exemplary display screen of the GUI of FIG. 9, showing a another depiction of the baseline settings screen, detailing a simulated 3D environment with the movement of the camera with respect to its mounting within the environment, and the relative center position of the conveyor.

With reference to FIG. 12A, another implementation/version of the baseline screen 1250 is provided to further illustrate the various setup steps and parameters herein. This version of the baseline display 1250 depicts a visualization window 1254 on the (e.g.) left side and a settings overview window 1252 that controls the environmental settings of the system. As shown, the visualization window 1254 provides a representation of the conveyor surface 1256 around the imaged scene. The center of the scene is depicted by a cross 1257—this is a reference for camera alignment and other image-acquisition settings, such as trigger position (described below). The present spatial location (height and transverse/widthwise position) and angular orientation of the camera is depicted, with the camera assembly 1262 shown hovering above the conveyor. As the user physically moves the actual camera around on its mount, the graphical representation of the camera 1262 appears to move up/down (double arrow 1258) and side-to-side (double-arrow 1260). Likewise, the angle of the camera in multiple degrees of freedom can be represented as it is changed (curved double-arrows 1263, 1264 and 1265). The environmental settings in window 1152 are performed by the user in a sequence, starting with device mounting 1266, then setup 1267, then trigger alignment 1268, and finally, the measurement area 1269.

Figure 12B:
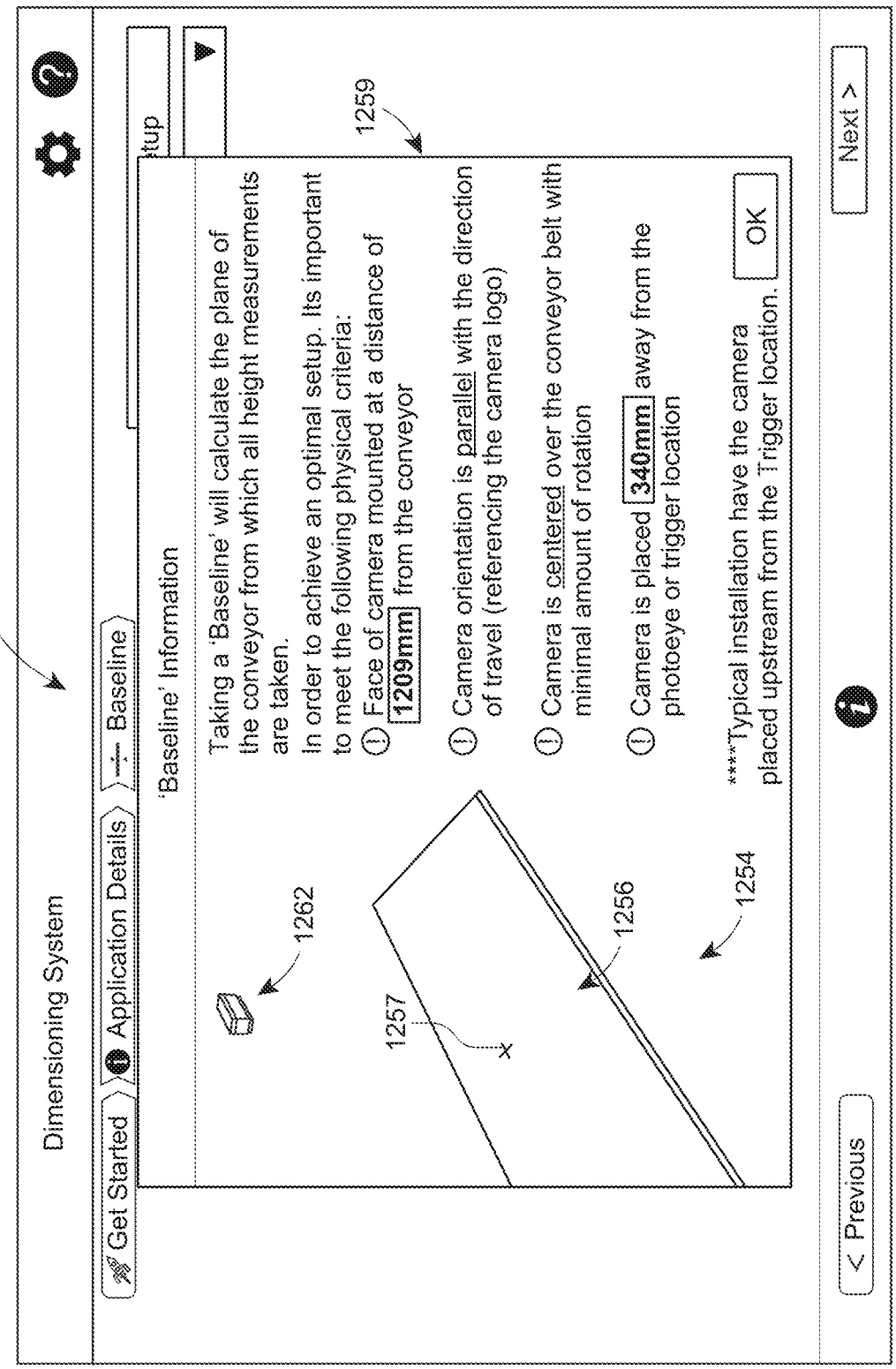
FIG. 12B is a diagram of an exemplary display screen of the GUI of FIG. 9, showing the baseline settings screen of FIG. 12A, and depicting a baseline information screen that describes current settings information and desired actions by the user to perform setup.

Referring briefly to the display 1261 of FIG. 12B, starting the baseline settings procedure can call up the advisory window 1259, which provides current data on the setup criteria based upon of the previously entered application details and known camera parameters. For example, the advisory window 1259 reports (a) the distance of the camera face from the conveyor 1256, (b) the set orientation of the camera 1262 with respect to the conveyor travel direction, (c) the need to center the camera 1262 with minimal angular rotation (i.e. aligned perpendicularly with the cross 1257), and (d) the location of the trigger detector (e.g. a photoeye) from the camera 1262 (and associated cross 1257).

Figure 12C:
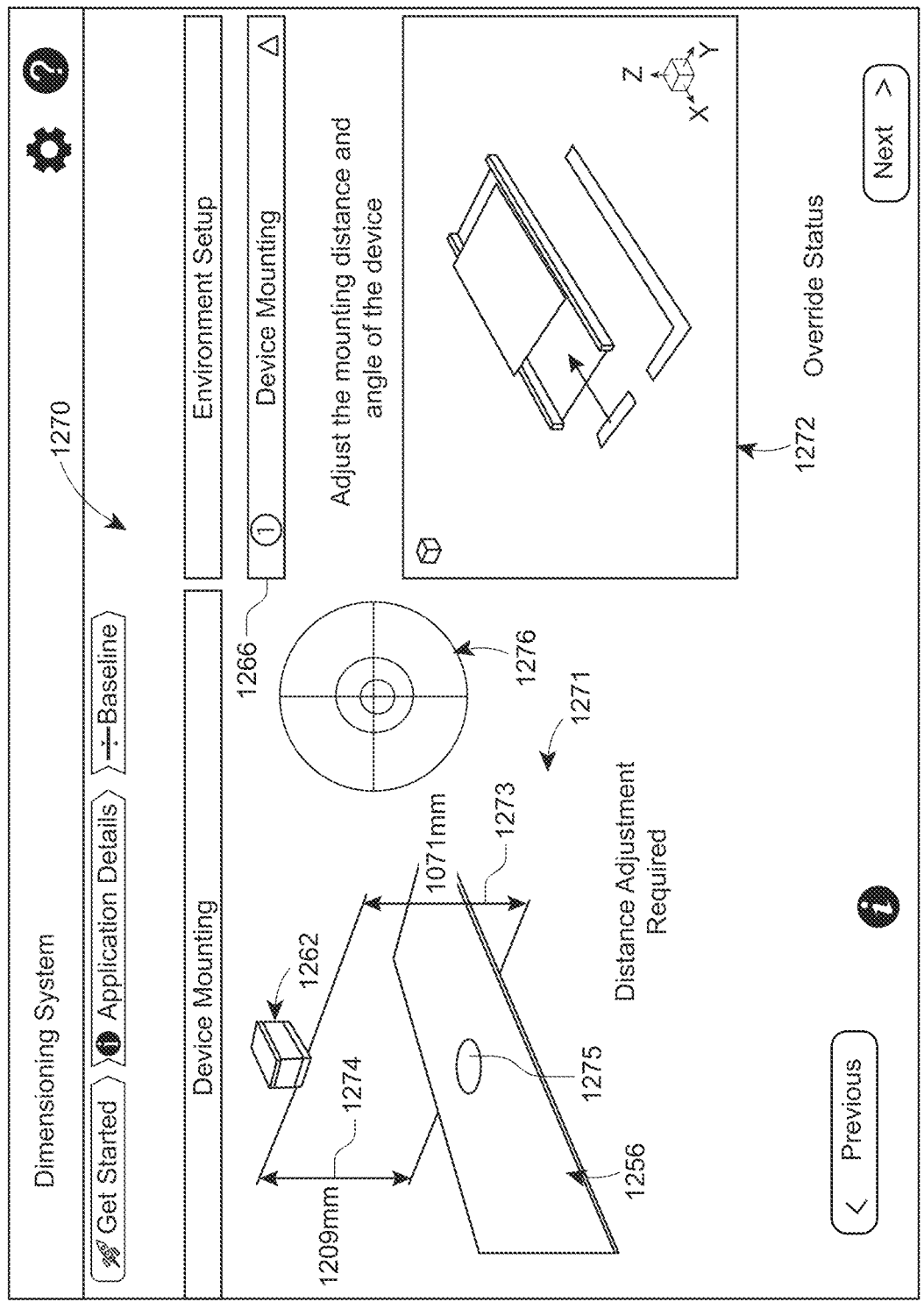
FIG. 12C is a diagram of an exemplary display screen of the GUI of FIG. 9, showing the baseline settings screen of FIG. 12A, with movement of the camera within the environment by the user providing feedback so as to optimize mounting distance and relative angle with respect to the conveyor surface.

With the understanding of these criteria (display 1261), the user enters display 1270 of FIG. 12C, which shows the device mounting procedure. The left window 1271 provides the graphic representation 1262 of the actual camera, as the user moves it within the scene, while the right hand window 1272 provides a 2D projection of the acquired 3D point cloud of the camera. The left window 1271 provides the required height (distance between camera face and conveyor 1256) 1273 and the current height 1274. In this example, the camera 1262 exceeds the required height and, thus an appropriate indicia (e.g. green color code or absence of a red alert) is provided. Likewise, the camera angular orientation has been moved around do that it is in line with the center 1275 of the scene. This is also indicated in the bubble level depiction 1276 described above in the alternate implementation of FIG. 12.

Figure 12D:
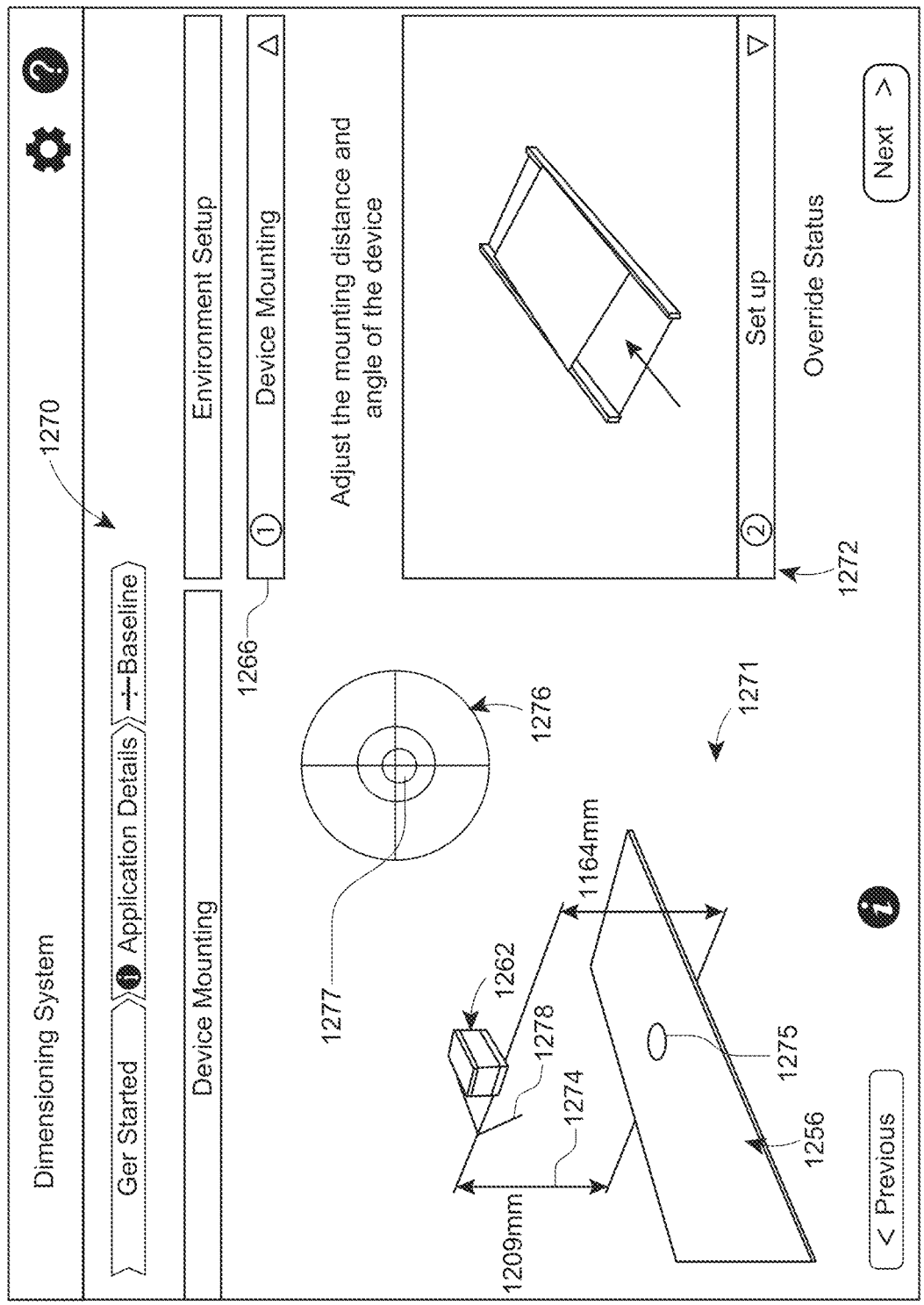
FIG. 12D is a diagram of an exemplary display screen of the GUI of FIG. 9, showing the baseline settings screen of FIG. 12A, with further movement of the camera within the environment by the user to provide feedback so as to optimize mounting distance and relative angle with respect to the conveyor surface.

In FIG. 12D, the display 1276 shows further manipulation of the camera during mounting, in which the camera assembly 1262 is moved in a transverse direction (interface-generated arrow 1277) whereby the center 1275 may change color or another indicia of misalignment can occur. This can be represented within the central circle 1277 within the bubble level representation 1276.

The setup procedure follows the device mounting procedure, and is shown in the display 1278. The right hand window 1279 provides operational (e.g. toggle switch) settings that the user can specify based upon the desired physical setup of the system, which can include, but are not limited to, (a) the direction of conveyor travel 1279a, (b) the device orientation 1279b, (c) trigger position 1279c, (d) camera front or back trigger 1279d and (e) object leading or trailing edge trigger. Additional settings (not shown) can be used to direct the destination for image data or results. Each toggle affects a representation in the left hand window 1280. For example, the depicted position of toggle 1279a causes the object 1281 to move down the conveyor 1256, as represented by dashed line 1282. Switching the toggle switch 1279a causes the object movement to be depicted in the opposite direction. This ensures that the system expects an object to enter the scene from a given direction, and affects when triggers will cause acquisition to occur. Likewise, the toggle 1279 changes the orientation of the camera. This generally affects whether an image is acquired upright or inverted in the field of view, but can affect other aspects of image acquisition and analysis by the vision system process(or). As shown, the representative wire leads 1283 are on the right side of the camera 1284. In FIG. 12F, the device orientation toggle 1279b have been switched from the position depicted in FIG. 12E. Hence, the orientation of the camera 1284 is reversed, as symbolized by the left-handed position of the wire leads and (optionally) other indicia, such as presence or absence of a logo on the camera depiction.

Figure 12E:
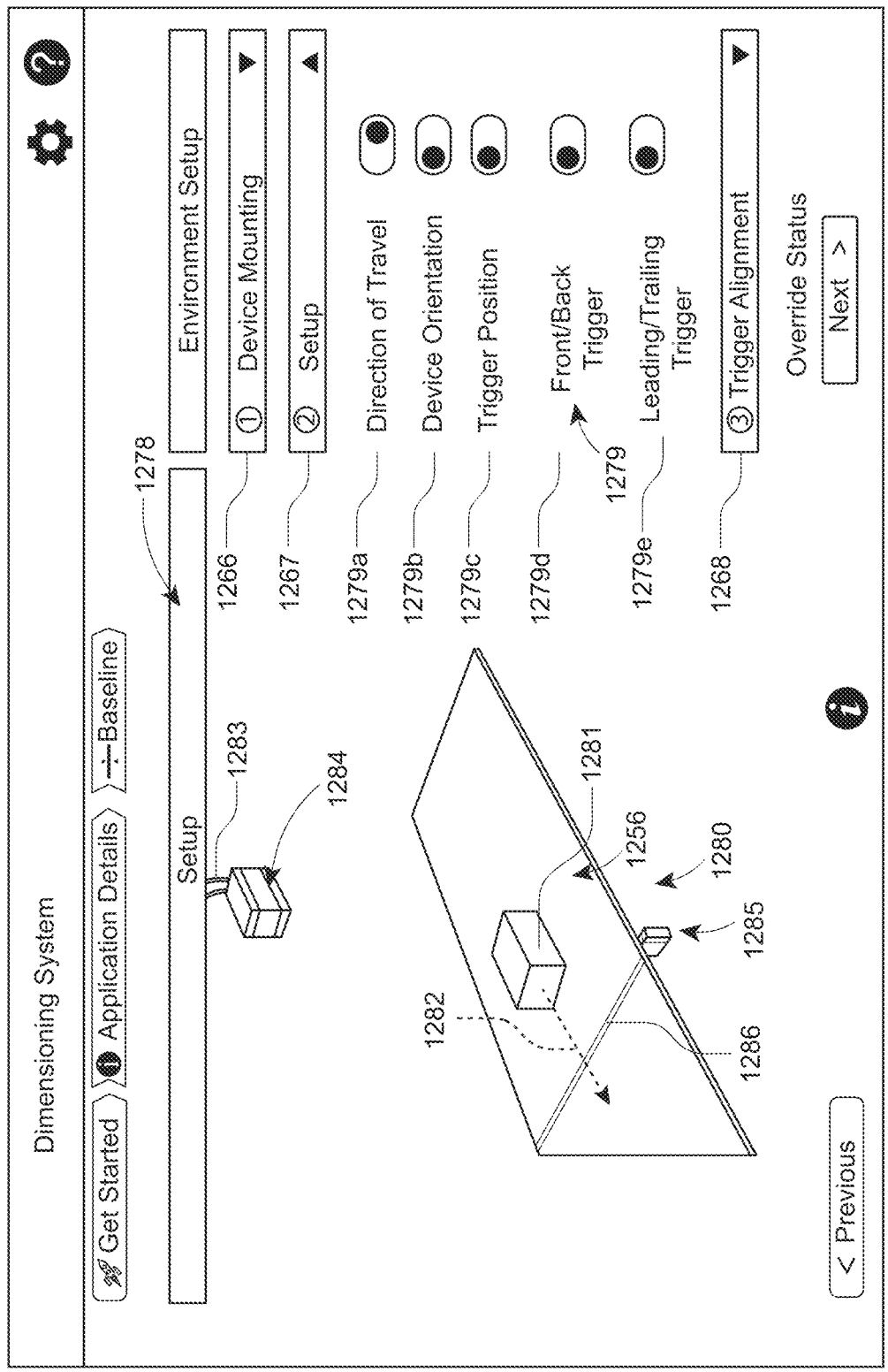
FIG. 12E is a diagram of an exemplary display screen of the GUI of FIG. 9, showing the baseline settings screen of FIG. 12A, and the selection of desired conveyor movement direction by the user in view of actual motion direction in the environment.
Figure 12F:
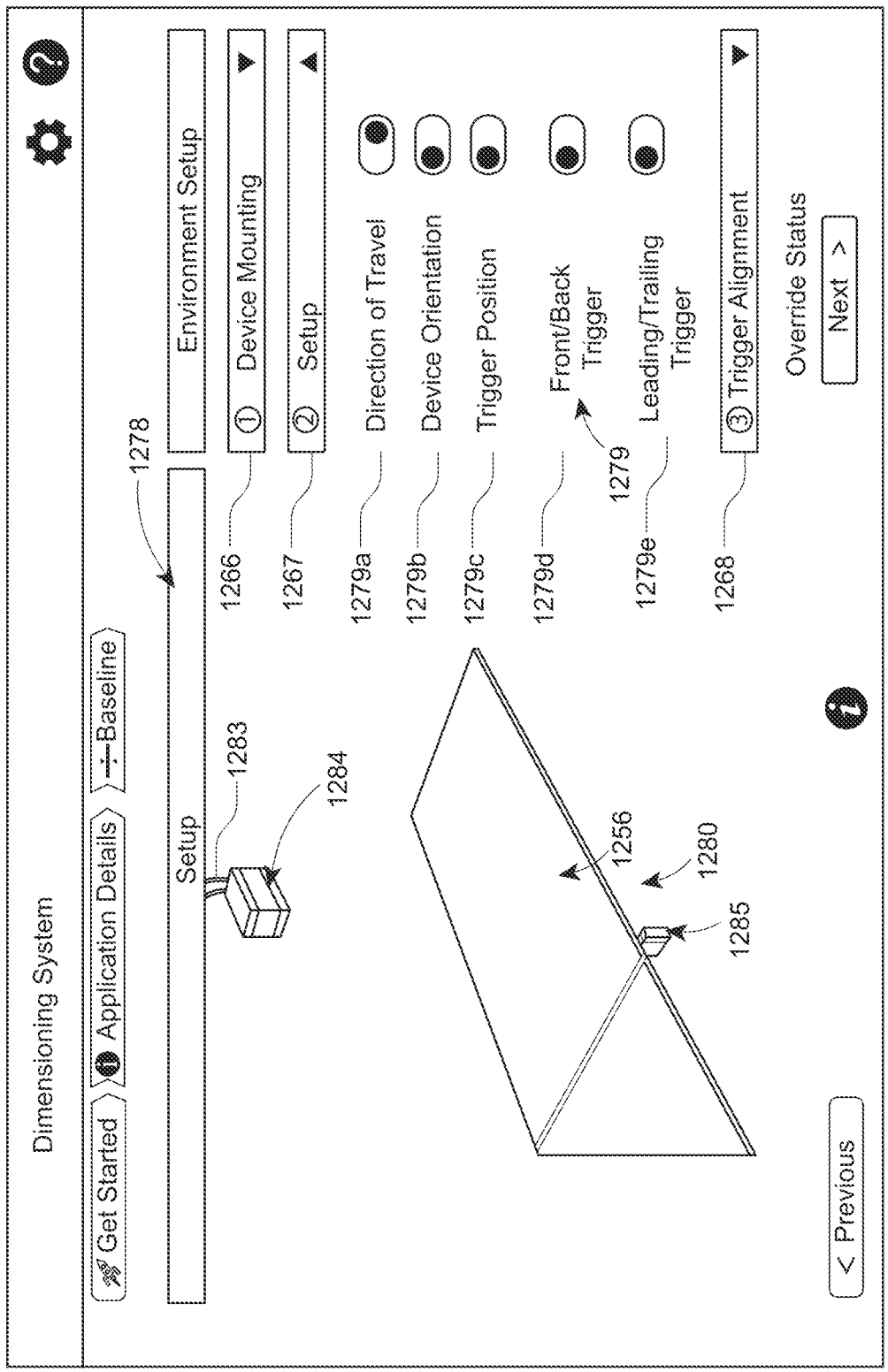
FIG. 12F is a diagram of an exemplary display screen of the GUI of FIG. 9, showing the baseline settings screen of FIG. 12A, and the selection of desired camera orientation by the user in view of actual camera orientation in the environment.

As shown in FIGS. 12E and 12F, a representation of a photoeye detector 1285 and the associated trigger line 1286 is provided with respect to the conveyor. The trigger position toggle switch 1279c is set to locate the detector 1285 to the left, downstream of the depicted direction of travel. In some arrangements, it may desirable to provide a trigger after an object has entered the scene. Conversely, in FIG. 12G, the trigger position toggle 1279c has been switched, and the detector 1285 is shown upstream of the scene, and hence the passage of an object 1281 into the scene from an upstream location relative to the scene causes image acquisition.

Figure 12G:
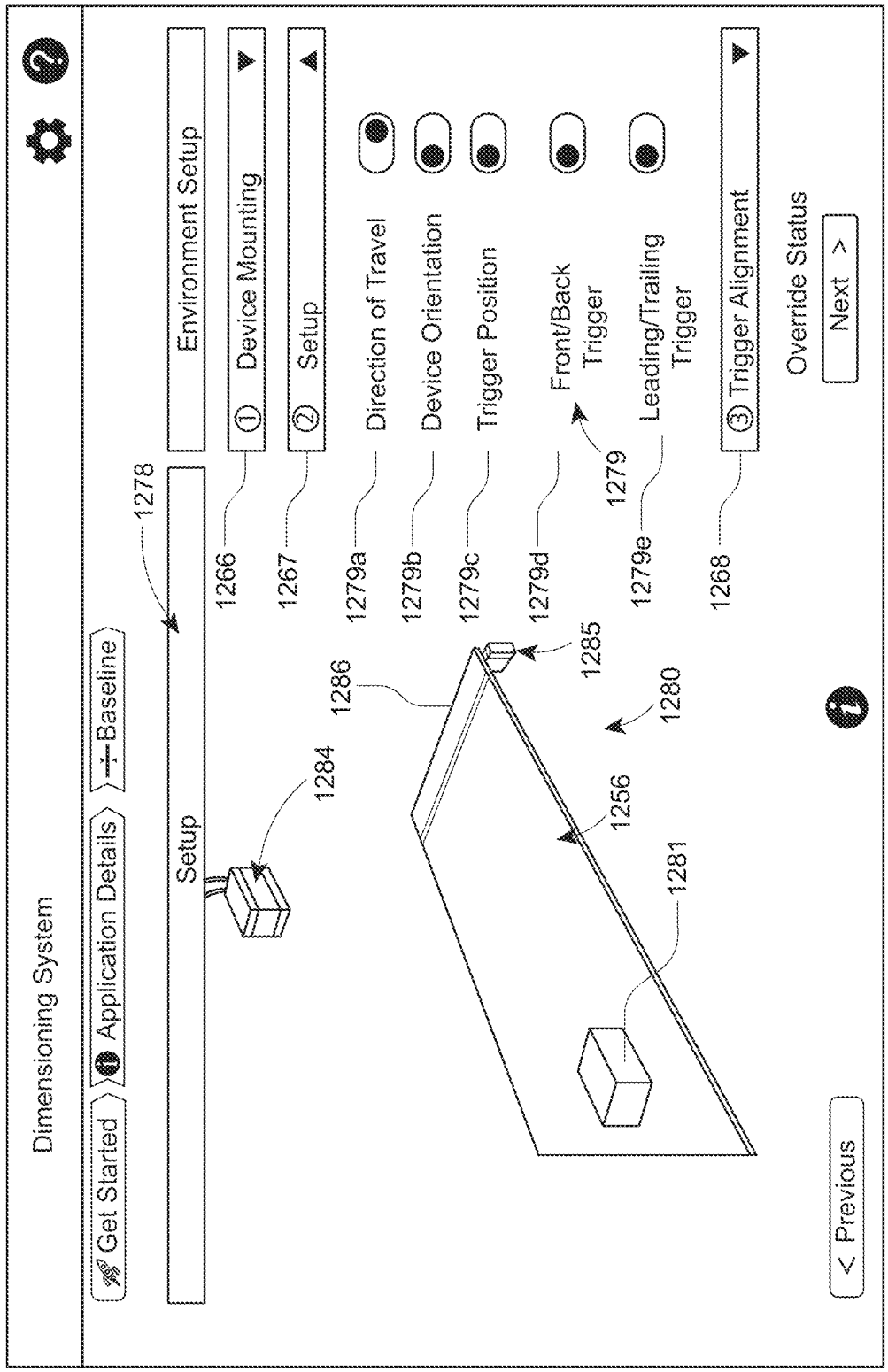
FIG. 12G is a diagram of an exemplary display screen of the GUI of FIG. 9, showing the baseline settings screen of FIG. 12F, and the selection of an opposing camera orientation by the user.

In FIGS. 12E-12G, the camera front or back trigger toggle 1279d that allows the user to set whether the trigger is located with respect to the front or rear of the camera. The toggle 1279e allows the user to specify whether the trigger occurs after the leading edge or trailing edge passes through the detector. These settings, and others (not shown), can allow the user to customize an input or output delay for data acquisition that can be desirable where the detector is located at a distance upstream of the scene or an inspection station is located somewhat downstream from the scene.

Figure 12H:
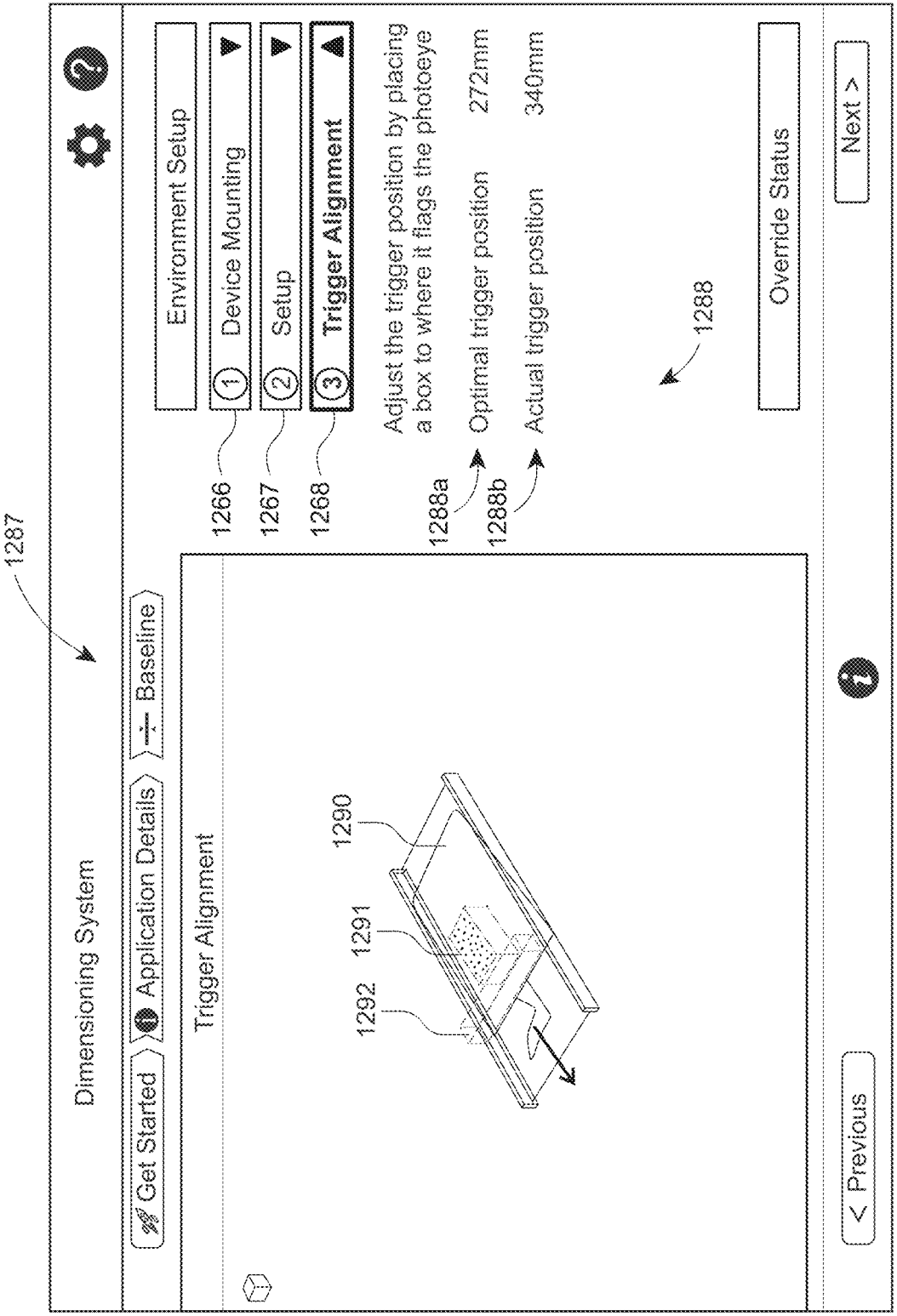
FIG. 12H is a diagram of an exemplary display screen of the GUI of FIG. 9, showing the baseline settings screen of FIG. 12A, and a point cloud image of the environment in which the optimal location for an image acquisition trigger device (e.g. a detector/photoeye) is overlaid onto the image, and wherein the user is prompted to move an exemplary object within the imaged scene to engage the optimal location.
Figure 12I:
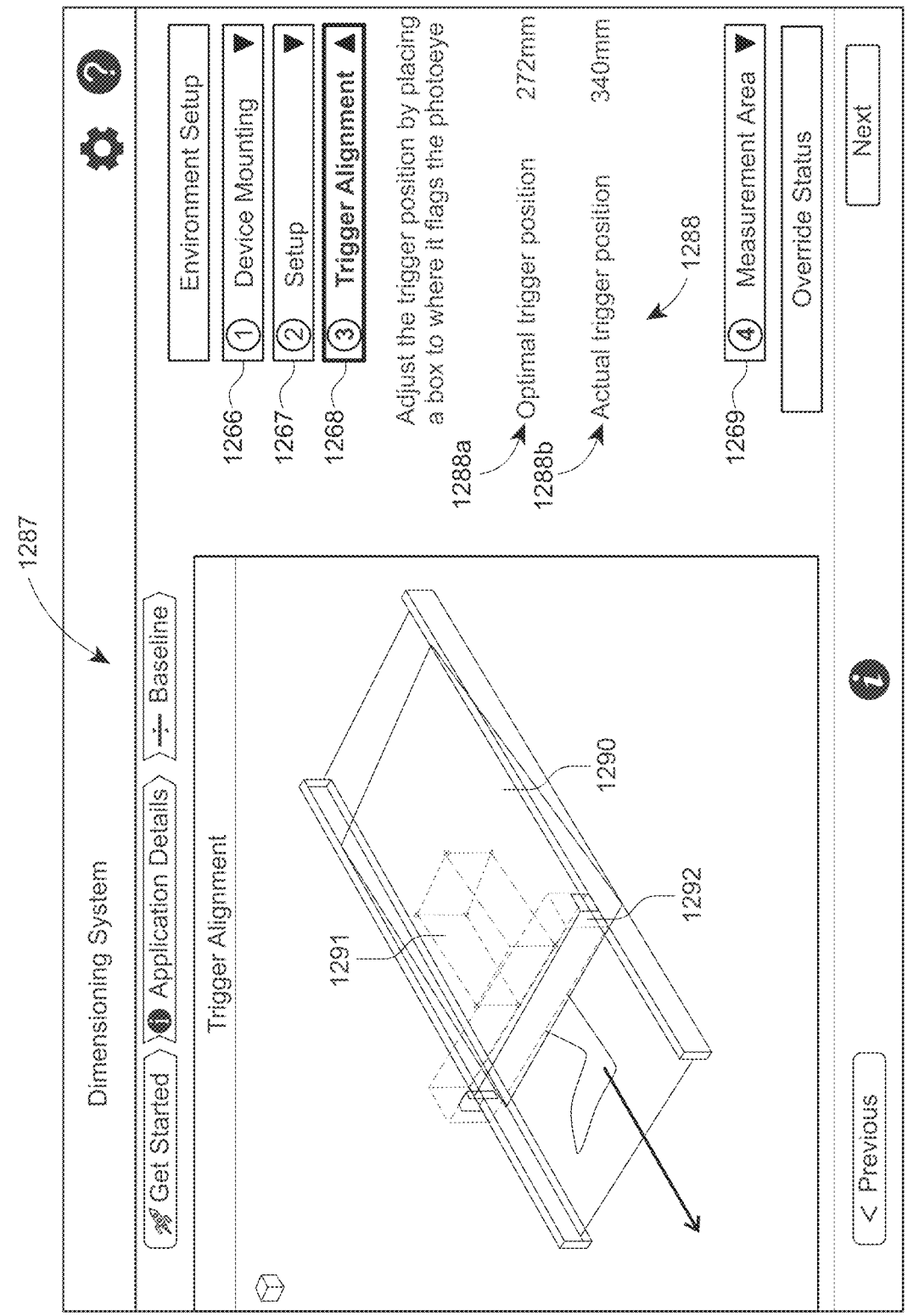
FIG. 12I is a diagram of an exemplary display screen of the GUI of FIG. 9, showing the baseline settings screen of FIG. 12H, In which the user has moved the exemplary object into the region of optimal location for a trigger device, so that the trigger device can now be moved by the user within the environment to line up with the edge of the object.

Having completed the setup procedure 1267, the user can now enter the trigger alignment procedure 1268, as shown in the GUI display 1287 of FIG. 12H. The right hand window 1288 provides readings for optimal trigger positon 1288a (as measured by the system based upon all set parameters and settings) with respect to the camera/scene center, and the actual trigger position 1288b, as set by the user during setup. The left hand widow 1289 shows a representation of the acquired 3D point cloud of the conveyor surface 1290, an exemplary object 1291, placed by the user in the scene, and the optimal location of the detector (specified by a cuboidal region 1292 centered around the detection line). In an embodiment, an indicia, such as a red-coloring for the region 1292, can be used to indicate that the object is not yet located in the proper position for detector placement, even if the object 1291 is adjacent the photoeye in the actual scene. Hence, as shown in FIG. 12I, when the object 1291 is guided into the desired/optimal trigger position along the conveyor 1290, the cuboidal region 1292 will indicate that this is the best location for actual detector placement by issuing an alert (e.g. changing to green). The user is thus, prompted to move the detector to where the edge of the object resides. Note that this can be the object leading or trailing edge, depending upon the above-described setting of toggle switch 1279e. It should be clear that the GUI display 1287 provides a very straightforward and intuitive way to set a trigger/ detector position that is free of excessive trial and error and optimizes the setting to the actual environmental conditions and camera parameters.

Figure 12J:
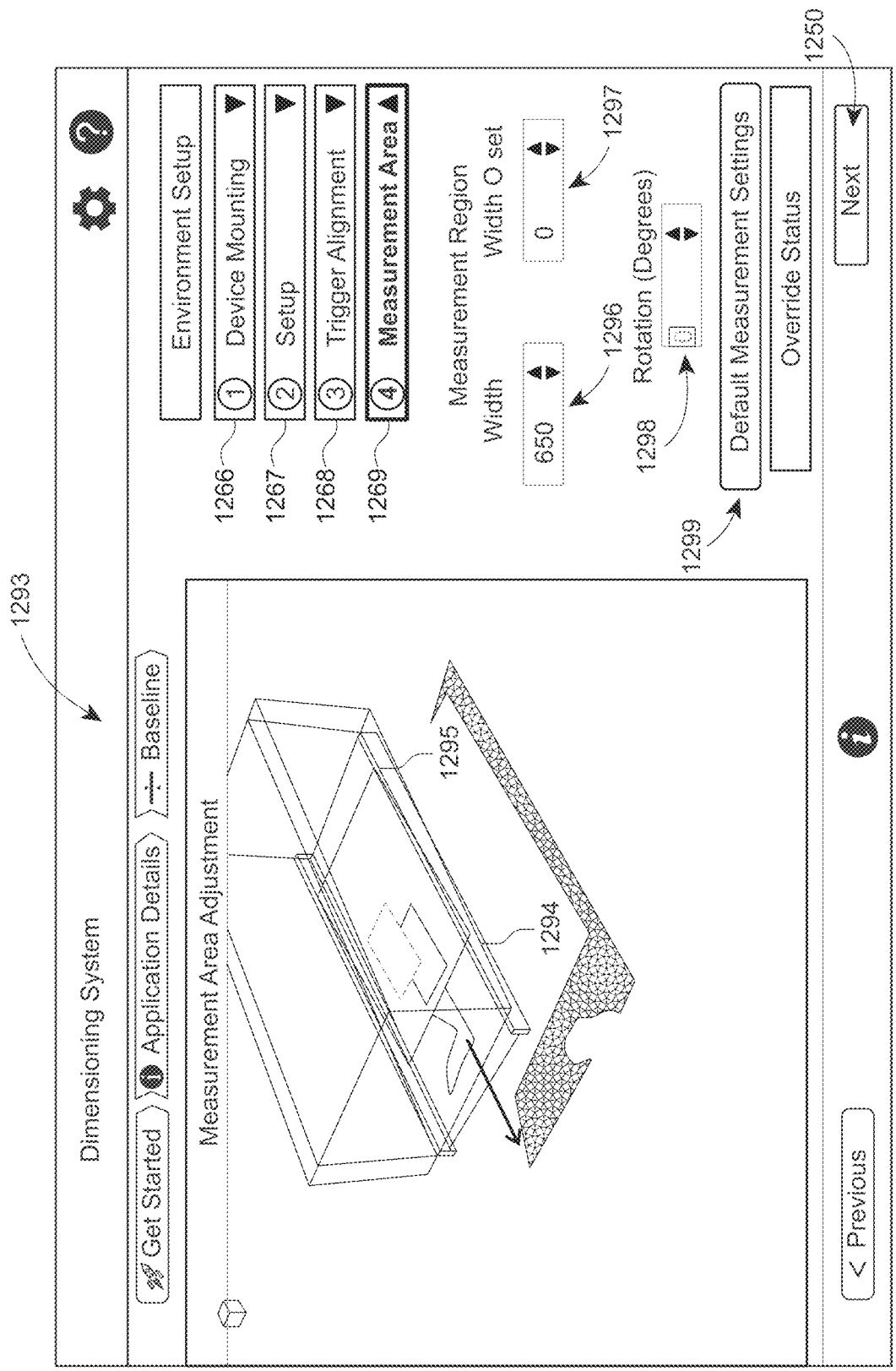
FIG. 12J is a diagram of an exemplary display screen of the GUI of FIG. 9, showing the baseline settings screen of FIG. 12A, in which the measurement area (volume space) used by the 3D camera assembly, as determined by the system, can be adjusted by the user based upon a 3D point cloud of the environment and overlaid volume space boundaries.

The display 1293 of FIG. 12J shows the measurement area procedure 1269, which is entered after the user completes the trigger alignment procedure 1268, described above. This procedure allows the camera to filter out items that occur outside the desired 3D volume space. That volume space is generally bounded for width by the edges of the conveyor surface. This width is set automatically based upon the boundaries of the elevated area typically occupied by a conveyor. System has knowledge from the application details procedure as to the specified width of the conveyor, and so, it searches for side edges with a falling off of height within this distance. That width can be represented by the outer box 1294. As there can be various obstructions or other items related to the conveyor, the procedure 1269 allows the width to be customized by providing a modified width 1296 and offset 1297 that redraws the volume space as indicated by box 1295. The space can be rotates using setting 1298, and the default width settings can be reset using button 1299.

Note that the various automated procedures carried out by the system can be made employing the above-described vision system processes operating on cuboidal objects via statistical analysis, and/or by other techniques known to those of skill. Once adjustment of measurement area and other environmental parameters is concluded, the user can click the next button 1250 and move to the optimize stage and associated screen(s) 1300, shown in FIG. 13.

Figure 13:
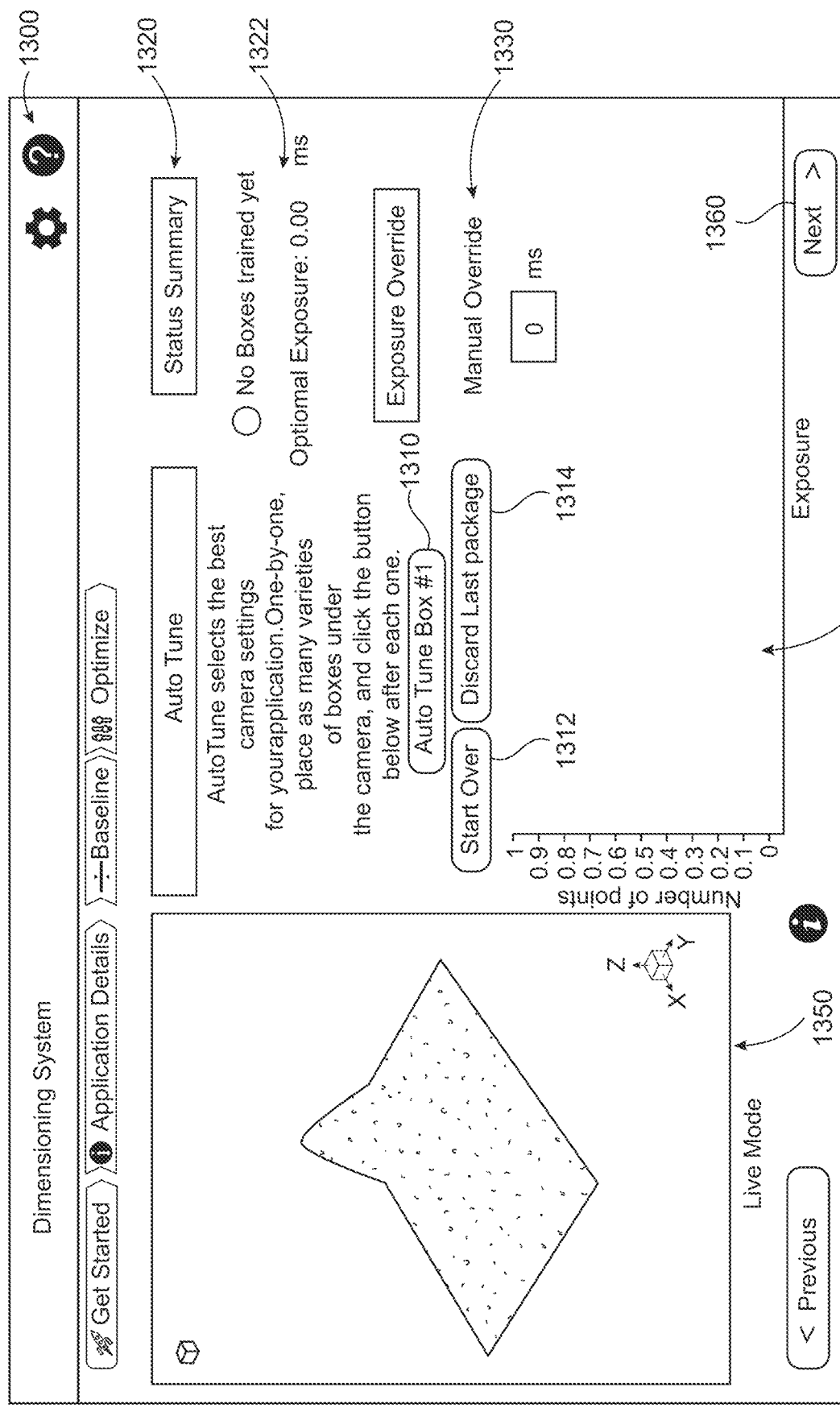
FIG. 13 is a diagram of an exemplary display screen of the GUI of FIG. 9 showing an optimization screen, with and initial interface for an AutoTune function, used to select optimal camera settings.
Figure 13A:
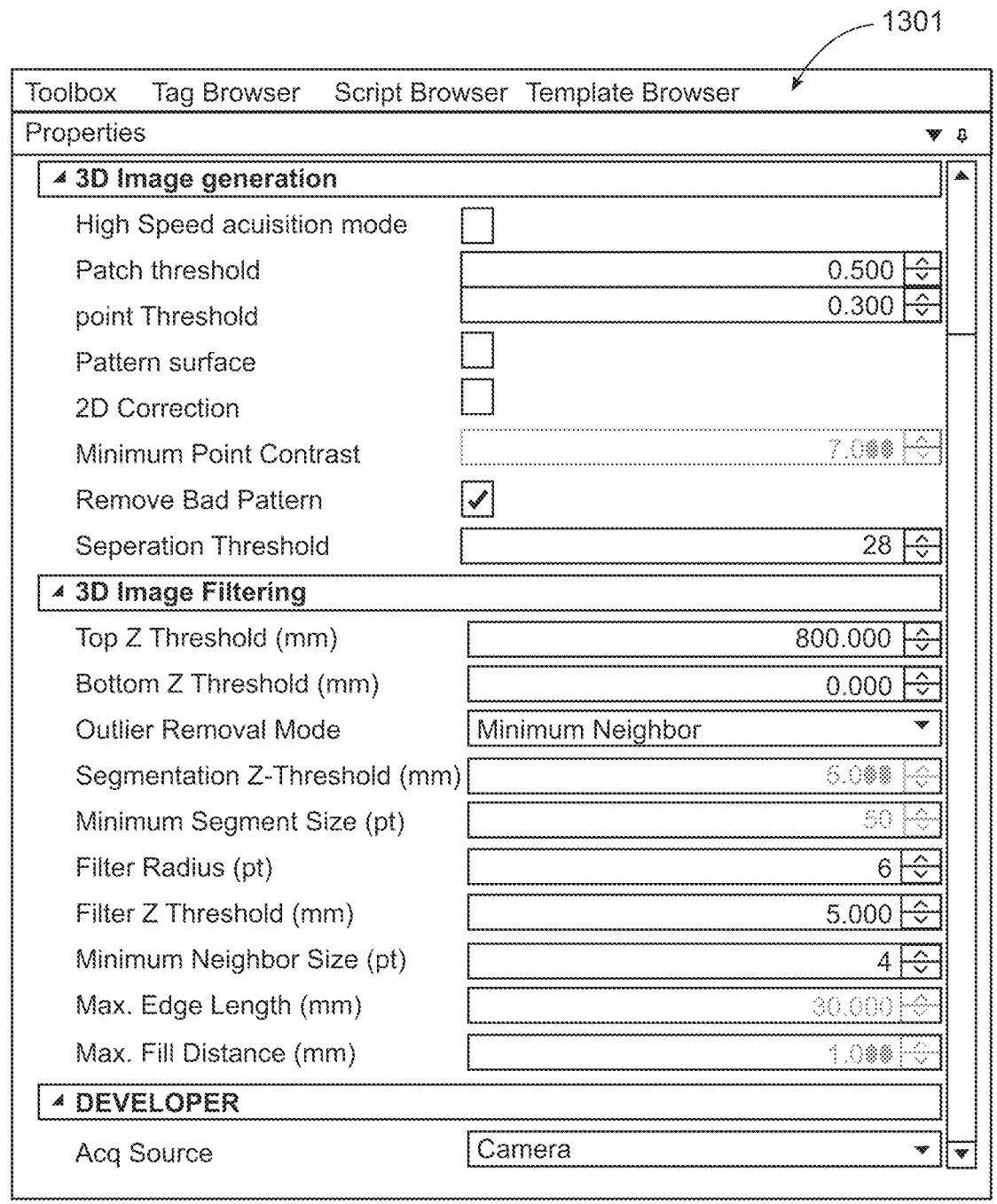
FIG. 13A shows a screen listing non-limiting examples of various (optional) 3D vision system acquisition and filtering parameters that can be set using the AutoTune function activated in the AutoTune function screen of FIG. 13, in addition to exposure time and voxel size (described below)

The optimize screen carries out an AutoTune function as shown generally in GUI display screen 1300 (FIG. 13). The AutoTune function uses automated procedures to select optimized 3D camera settings/parameters based upon the previously entered settings and baseline measurement(s) (See FIGS. 10-12I). The settings and acquisition parameters of the 3D camera that are optimized by AutoTune can vary based upon system programming and/or user preferences. One particular acquisition parameter that is optimized is camera exposure time. However, a variety of other acquisition (those used by the camera and vision system) parameters can be optimized. FIG. 13A depicts a selection window 1301 with a list of properties, by way of non-limiting example. Among all these parameters, although each has impact on the final point cloud generated by the sensor, they do not equally affect performance, and changing certain parameters can affect the acquired point cloud quality more than changing others. However, exposure is typically has most direct and significant impact on the point cloud quality. As shown, such secondary parameters can include (but are not limited to) patch threshold, point threshold, minimum point contrast bad pattern removal separation threshold, top Z (height) threshold, bottom Z threshold, outlier removal mode (see connected component analysis above), segmentation Z threshold, minimum segment size, filter Z threshold, minimum neighbor size, maximum edge length, and maximum fill distance. These parameters should be familiar to those of skill in the art.

Figure 13B:
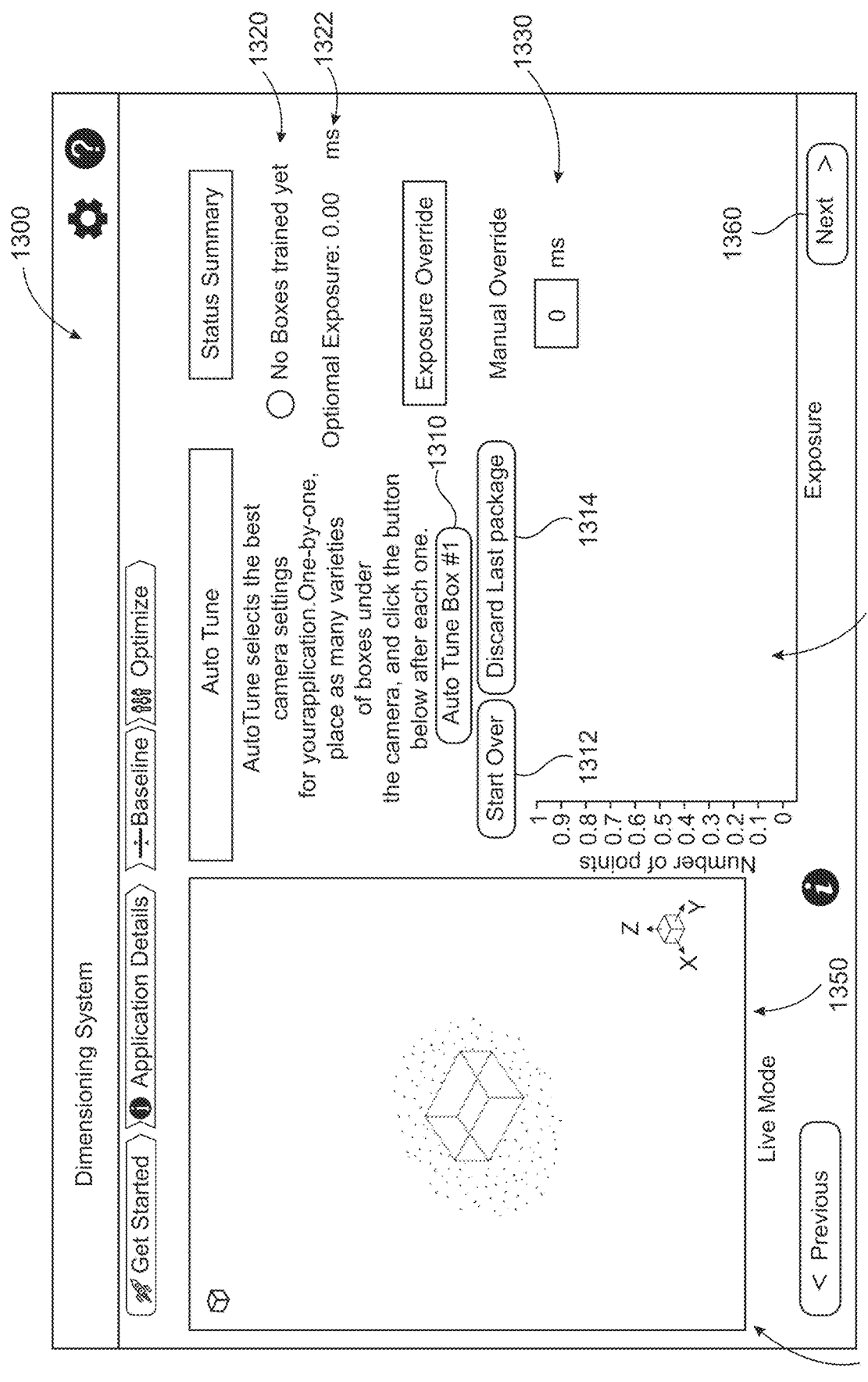
FIG. 13B is a diagram of an exemplary display screen of the GUI of FIG. 9, showing the AutoTune function screen of FIG. 13 after the user places a first exemplary object (Box #1) in the imaged scene and activates the function, showing AutoTune in progress in association with a representation of a 3D point cloud of the object.

In operation, the AutoTune GUI screen 1300 prompts the user to conduct a test run, typically operating the conveyor at the specified speed and directing cuboidal objects having a plurality of sizes, shapes and/or bulginess (characteristics), one-by-one along the conveyor. As each object is placed, the user clicks the AutoTune button 1310. Buttons 1312 and 1314, respectively, allow the user to start the process over or discard data for a given test object. The objects can vary widely in characteristics within the overall min/max range(s) specified by the user during the initial Application Details phase (screen 1000 in FIG. 10). Likewise, objects are spaced apart on the conveyor at least a distance of the specified minimum gap and/or directed a single units through the vision system. A status box 1320 shows the number of boxes tested and the current setting for optimal exposure 1322 of the camera assembly. The system applies various computations describe above to determine optimal exposure, and otherwise applies incremental exposure settings until a stable signal is obtained. This is used as the system setting unless the user applies an override in box 1330. During the tuning of the first object (Box #1), the buttons are disabled, and a status bar 1332 showing the progress of the tuning is displayed under the live point cloud window 1350, as shown in FIG. 13B. Tuning typically focuses on blobs of points to determine the quality of the parameters (exposure, etc.).

Figure 13C:
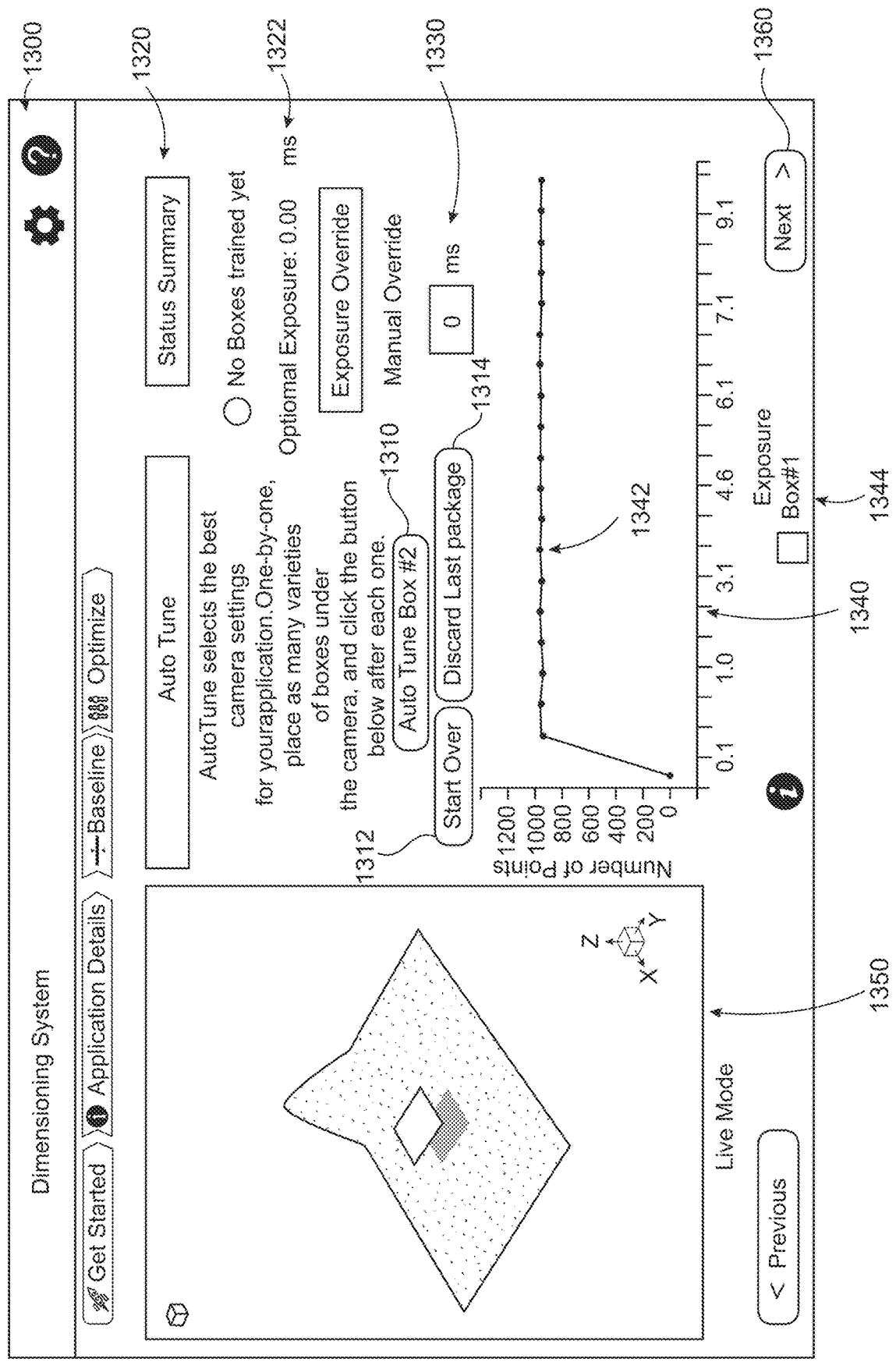
FIG. 13C is a diagram of an exemplary display screen of the GUI of FIG. 9, showing the AutoTune function screen of FIG. 13 after completion of the function on a first exemplary object (Box #1), and prompting the user to place a second exemplary object (Box #2) in the imaged scene, so as to carry out AutoTune and further refine the results thereof.
Figure 13D:
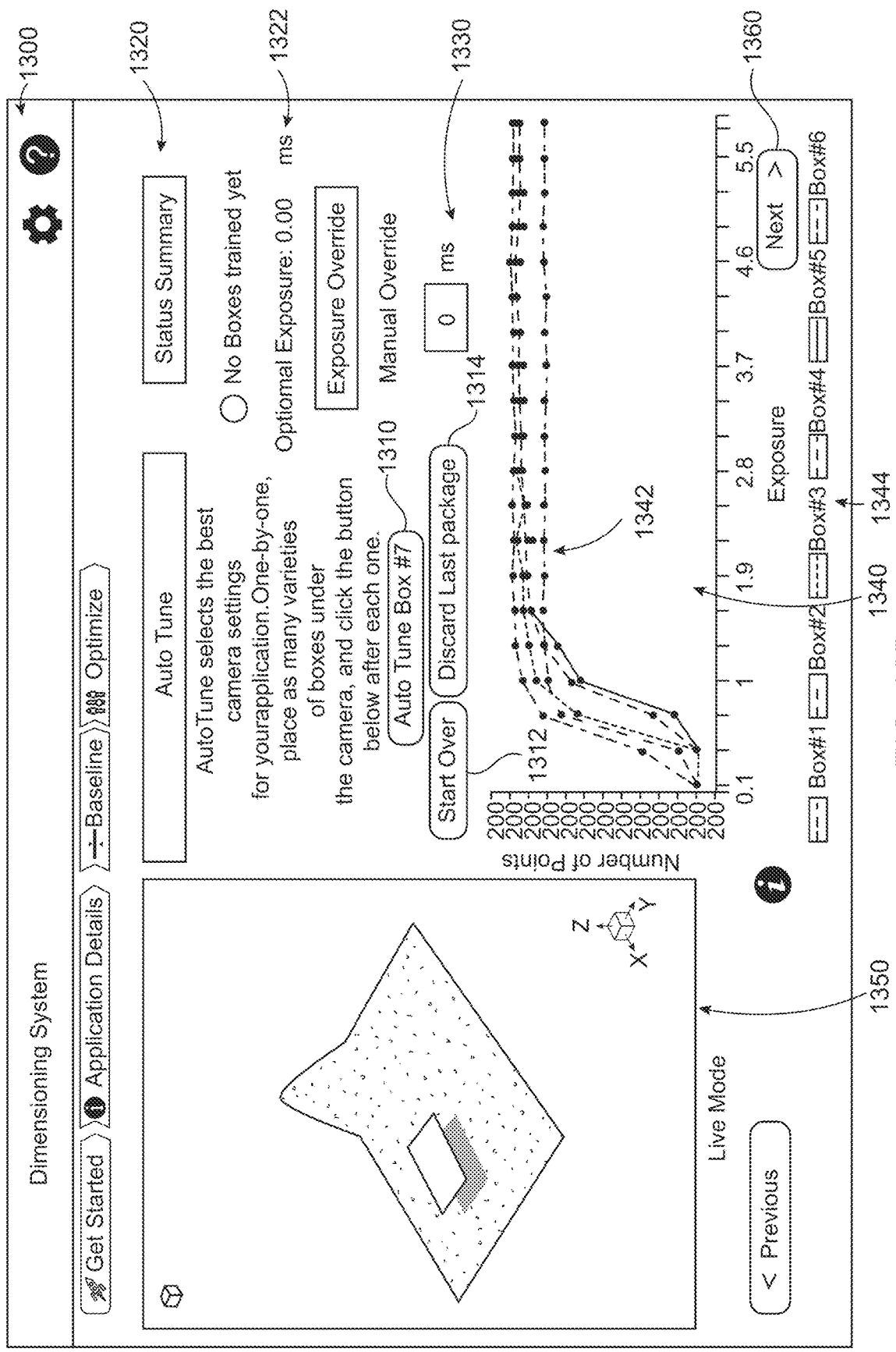
FIG. 13D is a diagram of an exemplary display screen of the GUI of FIG. 9, showing the AutoTune function screen of FIG. 13 after completion of the function on (e.g.) six exemplary objects, at which time the user can analyze further objects (e.g. Box #7) or move on to a next step in the overall procedure, if desired.

After the first object (Box #1) is tuned, the display screen 1300 reenables the buttons as shown in FIG. 13C, and the point cloud displayed in the window 1350 is the point cloud obtained using the tuned optimal exposure for this object. This exposure is shown in block 1322, in milliseconds, and the status summary block 1320 lists the total number of objects (boxes) trained so far. The AutoTune button 1310 prompts the user to tune on the next object (Box #2). Notably, each exemplary object is graphed for exposure time versus number of acquired 3D points in the box 1340. The flat part 1342 of the graph(s) shows where exposure time is sufficient to generate a stable image acquisition. The individual curves of the graph 1340 each depict one of a plurality of exemplary objects imaged by the system. The curves 1342 in this example are color-coded in accordance with a key 1344. Other coding indicia can be employed in alternate examples of the graph, or it can be omitted in various examples. As shown in FIG. 13D, the screen 1300 depicts six (6) trained boxes (block 1310), and the optimal exposure (block 1322) has increased from the original value listed for Box #1. A series of graph curves 1342 are depicted for respective trained boxes. Note that plateau/range finding algorithm used to generate data in this procedure can be invalid in some cases. Where it is invalid, the procedure selects the tuned exposure using maximum points. After training a desired number of objects, an optimal exposure value (in milliseconds) is saved for subsequent runtime operations, and the user can opt to click the Next button 1360 and move to the communications procedure, described in detail below with reference to screen 1400.

In applying the AutoTune procedure, the user obtains an overall optimal exposure. Note that the final selected optimal exposure is calculated as the average of the two procedures/techniques: exposure with maximum points procedure, and exposure using ⅓ of the plateau region procedure, while each procedure is also an average of the optimal computational procedures over all the objects/boxes provided by the user. If the user is not satisfied with this value, he/she can also overwrite this value with a different 3D exposure using the override input block 1330. Having described the user interface associated with the AutoTune procedure, a more detailed description of the underlying computational procedures and techniques is now described.

A. Overall Optimal Exposure for Multiple Objects/Boxes

Figure 13E:
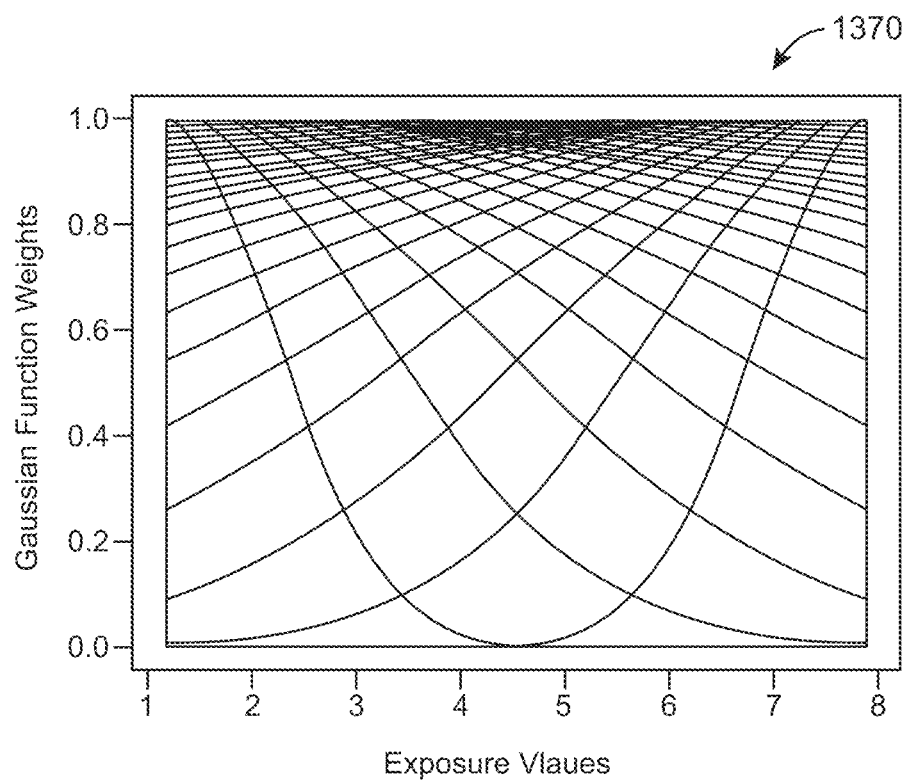
FIG. 13E is a graph of an exemplary Gaussian function that can be used as part of the exposure determination procedure in the AutoTune function of FIG. 13.

Each object/box can produce a different optimal exposure, and it is desirable to derive a trade-off that provides the global/overall optimal exposure(s). Some candidate computational procedures/techniques include: averaging all objects (assume every object is approximately equal in shape/size), maximum exposure of all objects (trying to capture the darkest object), and minimum exposure of all objects (trying to capture the most reflective/lightest object). A more flexible procedure/technique, however, is to tie together these procedures with a mathematical representation. In this exemplary arrangement, a well-known Gaussian function is employed to aggregate all computational procedures. The Gaussian function is defined below:

$$g(x, \mu, \sigma) = e^{\frac{-(x-\mu)^2}{2\sigma^2}}$$

where x is the exposure values for various objects/boxes, μ is the center point, defined as a function of the biasing setting (0-100). If biasing is smaller than 50 (biasing toward lighter object or smaller exposure values), μ is minimum of the exposures. If biasing is equal or larger than 50 (biasing toward darker object or larger exposure values), μ is maximum of the exposures. σ is the variance of the Gaussian function, defined as biasing+0.01 if biasing is smaller than 50, and 100—biasing+0.01 if biasing is equal or larger than 50. FIG. 13E is a graph 1370 that visualizes the Gaussian functions relating to the exposure values, where the minimum and maximum of the exposures are 1.2 and 7.8, respectively. By way of example, where the individual optimal exposure for each object is [1.2, 5.0, 7.8], then selecting the biasing coefficient to be 100 (fully biased toward the dark objects), then the center point for the function is maximum of the exposures, or 7.8, and the membership function is the right-most curve, where weights are zeros for any value except the maximum. Hence, the overall exposure value would equal approximately 7.8. If a biasing coefficient of 99 is selected, then the weights are the second right curve, which has weights gradually decreasing from 7.8 to 4.5, and wherein all exposures below 4.5 are ignored. Selecting a biasing coefficient of 50 means that all exposures are averaged. Selecting 0 as the biasing coefficient, conversely, provides weights along the left-most curve, which ignores all values except the minimum exposure (1.4).

B. AutoTune Blob Tool Parameter

Besides simplification of the acquisition of the point cloud by automatically determining the 3D exposure, there are other (secondary) tool parameters that are typically difficult for the user to select. A particularly significant secondary tool parameter is one or more of the blob tool parameter(s), more specifically, voxel size (also termed "voxelSize"). This parameter is roughly determined by the working distance of the object to the image sensor, and can also be determined by the object/box type, color and/or material. To perform AutoTune on this parameter, the exemplary arrangement employs two datasets to evaluate the correlation between the voxelSize and the blob tool performance, i.e., measurement error.

sensor with a plurality of differing working distances, in which the working distance is defined as the distance from the camera assembly (e.g. camera face or image sensor plane) to the surface of the exemplary box. The relationship between the voxelSize vs blob bounding box volume, histogram frequency, and measurement error can be graphed and/or analyzed for the experimental arrangement. It is observed, for small voxelSize, the vision system blob tool cannot typically detect any blobs, and the measurement error is 1 or 100%. As the voxelSize increases, there is a turning point where the blob can be detected, and the blob bounding box volume approaches its steady state. The measurement error, on the other hand, reaches its minimum. As the voxelSize further increases, the measurement error and blob bounding box volume fluctuate around their steady state. In general, histogram frequency can be used as a measurement for such a turning point. The maximum of the histogram frequency normally indicates the turning point for the blob detection. It is also observed that there are some fluctuations around the turning point. This, if the turning point voxelSize is selected as the voxelSize for blob detection, sensitivity for the dimension measurement would be high, which is generally not preferred. As a trade-off the voxelSize that generates the maximum of the histogram frequency, plus an offset (e.g. an offset of 1 in this example), as the optimal voxelSize used in the exemplary arrangement of the system.

The relationship between the optimal voxelSize and working distance within the experimental data set can also be analyzed. Notably, if a robust correlation is determined, then it may be unnecessary to tune voxelSize for every box, and a fixed relationship can be employed to determine the optimal voxelSize for a median box size given a fixed working distance. This relationship is, in turn, determined by the system installation.

Figure 13F:
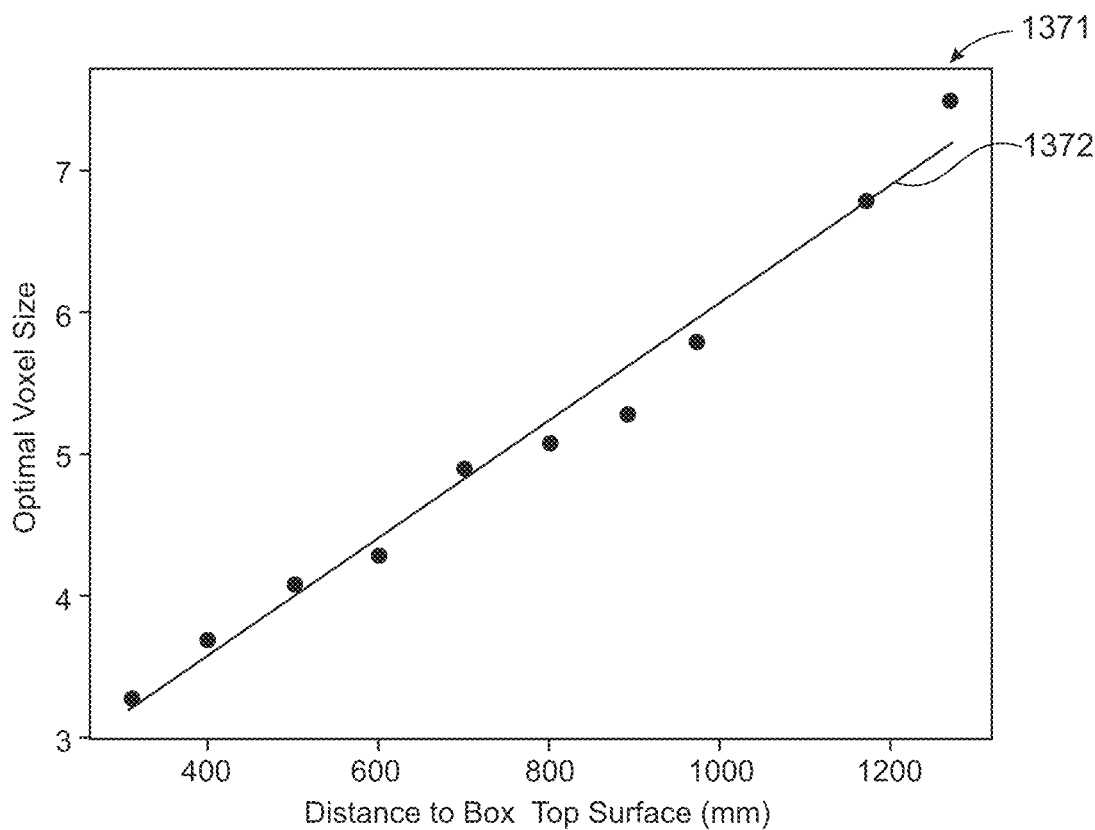
FIG. 13F is a graph of a scatter plot in association with voxel size determination procedure, within a range of working distances between the camera assembly and the object as part of the AutoTune function of FIG. 13.

The table below shows the data, and FIG. 13F shows a scatter plot graph. In which there is an approximate a linear correlation (superimposed line 1372) between the optimal voxelSize and working distance. Note that the "working distance" defined herein includes an exemplary 400 mm offset from the actual working distance with respect to the lens. In other words a 1270 millimeter working distance translates into 1670 millimeters (i.e. 1270+400) from the surface of the box to the lens. If the experimental box height is also added, then the "working distance" normally defined as the distance from the sensor to the conveyor belt would be roughly 1800 millimeters.

Optimal voxelSize Vs Working Distance for
Experimental Image Sets 01-10

|  | Set01 | Set02 | Set03 | Set04 | Set05 | Set06 | Set07 | Set08 | Set09 | Set10 |
| --- | --- | --- | --- | --- | --- | --- | --- | --- | --- | --- |
| Working Distance (mm) | 1270 | 1170 | 970 | 890 | 800 | 700 | 600 | 500 | 400 | 310 |
| Optimal Voxel Size | 7.5 | 6.8 | 5.8 | 5.3 | 5.1 | 4.9 | 4.3 | 4.4 (4.1) | 3.7 | 3.6 (3.3) |

1. Image Set 1: Blue Box Different Working Distance

Figure 13G:
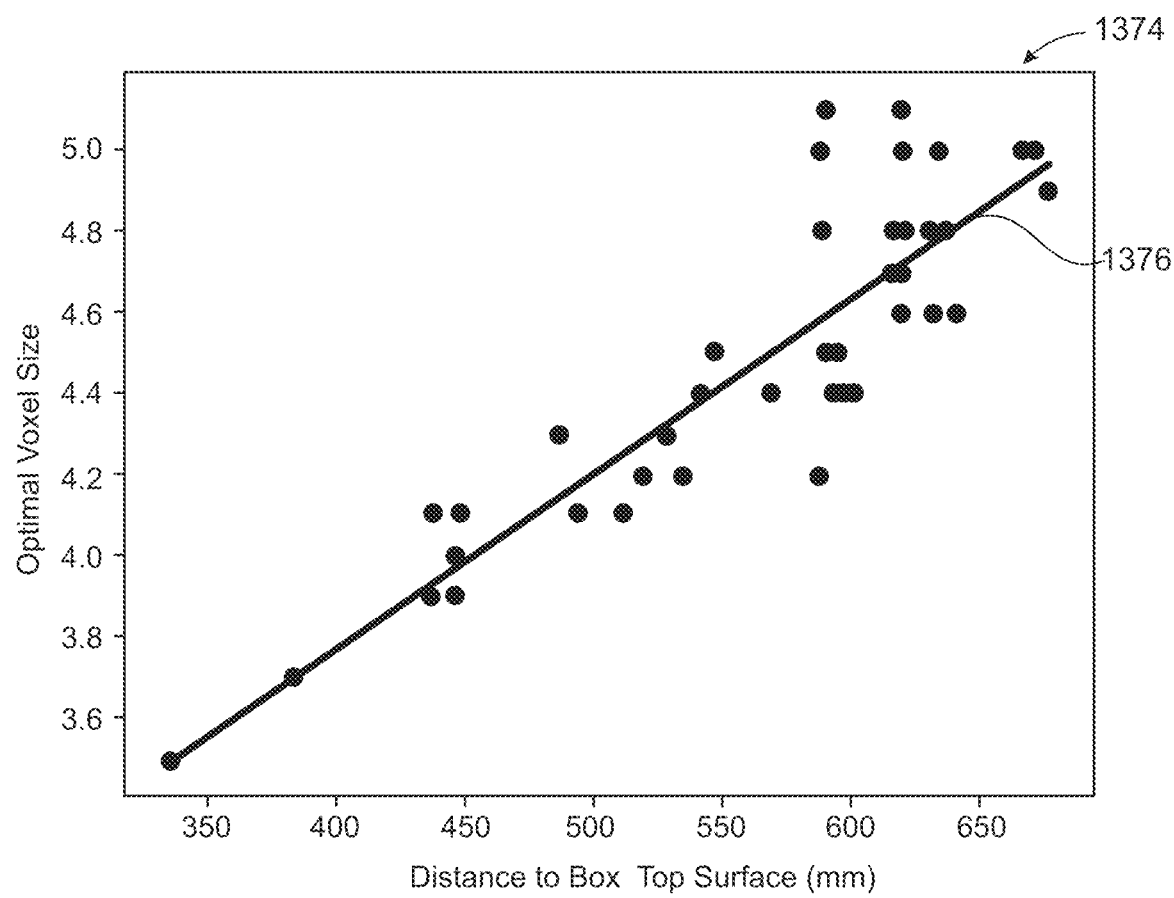
FIG. 13G is a graph of a scatter plot in association with voxel size determination procedure for a larger sample of objects and within a wider range of working distances between the camera assembly and the object, as part of the AutoTune function of FIG. 13.

By way of non-limiting example, in an experimental arrangement, a blue calibration box with known dimension (280 mm by 140 mm by 90 mm) is imaged using a 3D image 2. Image Set 2: Different Box on Conveyor Belt Another dataset is generated experimentally, which contains 56 boxes on the same conveyor. The measurement result of five (5) sample boxes is graphed and analyzed. It is determined that similar conclusions can be drawn as image set 1. The scatter plot 1374 for this dataset is shown in FIG. 13G, and a table of results is provided below.

Optimal voxelSize Vs Working Distance (Defined as 800-40-boxH=760-boxH) for Image Set 2

|  | Set01 | Set02 | Set03 | Set04 | Set05 | Set06 | Set07 | Set08 | Set09 | Set10 |
|---|---|---|---|---|---|---|---|---|---|---|
| Working Distance (mm) | 620 | 590 | 570 | 677 | 593 | 620 | 670 | 633 | 597 | 631 |
| Optimal Voxel Size | 6.5 (5.1) | 5.1 | 4.4 | 4.9 | 4.4 | 4.7 | 5 | 4.6 | 4.4 | 4.8 |
|  | Set11 | Set12 | Set13 | Setl4 | Set15 | Set16 | Set17 | Set18 | Set19 | Set20 |
| Working Distance (mm) | 591 | 590 | 667 | 620 | 634 | 620 | 547 | 519 | 620 | 594 |
| Optimal Voxel Size | 4.5 | 4.5 | 5 | 5 | 5 | 4.6 | 4.5 | 4.2 | 4.8 | 4.4 |
|  | Set21 | Set22 | Set23 | Set24 | Set25 | Set26 | Set27 | Set28 | Set29 | Set30 |
| Working Distance (mm) | 528 | 568 | 670 | 446 | 595 | 495 | 616 | 589 | 617 | 619 |
| Optimal Voxel Size | 4.3 | 4.4 | 5 | 4 | 4.5 | 4.1 | 4.8 | 4.8 | 4.7 | 4.8 |
|  | Set31 | Set32 | Set33 | Set34 | Set35 | Set36 | Set37 | Set38 | Set39 | Set40 |
| Working Distance (mm) | 671 | 437 | 588 | 641 | 595 | 594 | 511 | 588 | 487 | 383 |
| Optimal Voxel Size | 5 | 3.9 | 6.7 (5) | 4.6 | 4.4 | 4.4 | 8.8 (4.1) | 4.2 | 4.3 | 3.7 |
|  | Set41 | Set42 | Set43 | Set44 | Set45 | Set46 | Set47 | Set48 | Set49 | Set50 |
| Working Distance (mm) | 335 | 535 | 602 | 642 | 672 | 632 | 622 | 448 | 638 | 618 |
| Optimal Voxel Size | 3.5 | 4.2 | 4.4 | 4.6 | 5 | 4.6 | 4.8 | 4.1 | 4.8 | 4.7 |
|  | Set51 | Set52 | Set53 | Set54 | Set55 | Set56 |  |  |  |  |
| Working Distance (mm) | 438 | 619 | 620 | 445 | 670 | 542 |  |  |  |  |
| Optimal Voxel Size | 4.1 | 10.8 (4.7) | 4.8 | 3.9 | 5 | 4.4 |  |  |  |  |

Figure 13H:
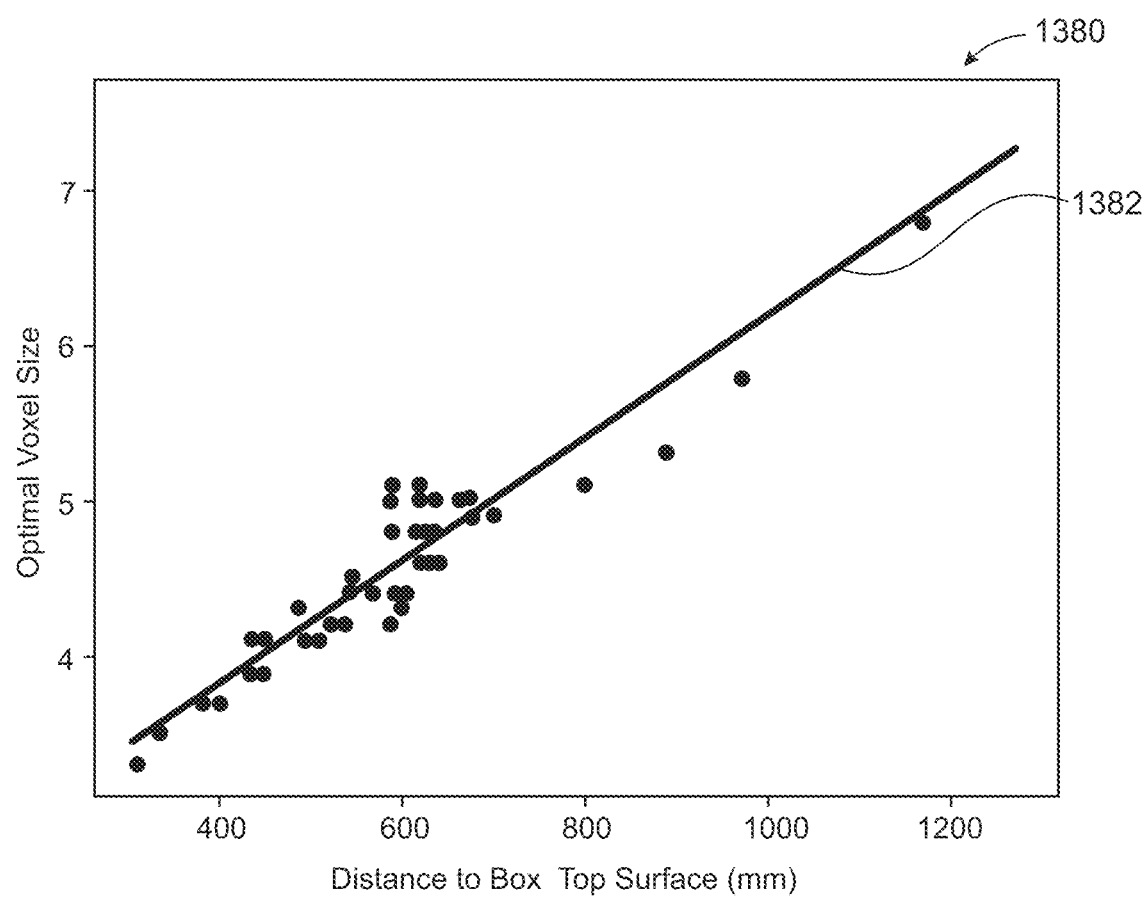
FIG. 13H is a graph of a scatter plot in association with voxel size determination procedure, in which the scatter plots of FIGS. 13F and 13G are combined to yield a linear result.

As can be observed, a rough linear (superimposed line 1376) relationship can be observed similar to image set 1 (FIG. 13F). It is, however, noted that the working distance is relatively limited (300 mm to 700 mm) compared to that in image set 1 (300 mm to 1300 mm). Hence, FIG. 13H shows the combined scatter plot. The final linear relationship (superimposed line 1382) is:

optimalVoxelSize=0.00396*WD+2.2157 optimalVoxelSize=0.00396*(WD'−400)+2.2157.

3. Effect of Box Orientation on Optimal VoxelSize

The orientation of the boxes, as well as its impact on the optimal voxelSize. Using Set30 from image set 2 is also analyzed herein, and ten (10) images are obtained. The measurement result reveal that, despite some noises in the histogram frequency, the actual turning point for all 10 orientations is relatively stable (around 3.7 to 3.8). Adding the offset of 1 to make the voxelSize more robust, the optimal voxelSize is around 4.7 to 4.8, regardless of box orientations, with minimal nose occurring, which can be addressed.

4. Effect of VoxelSize on Blob Tool Time

Figure 13I:
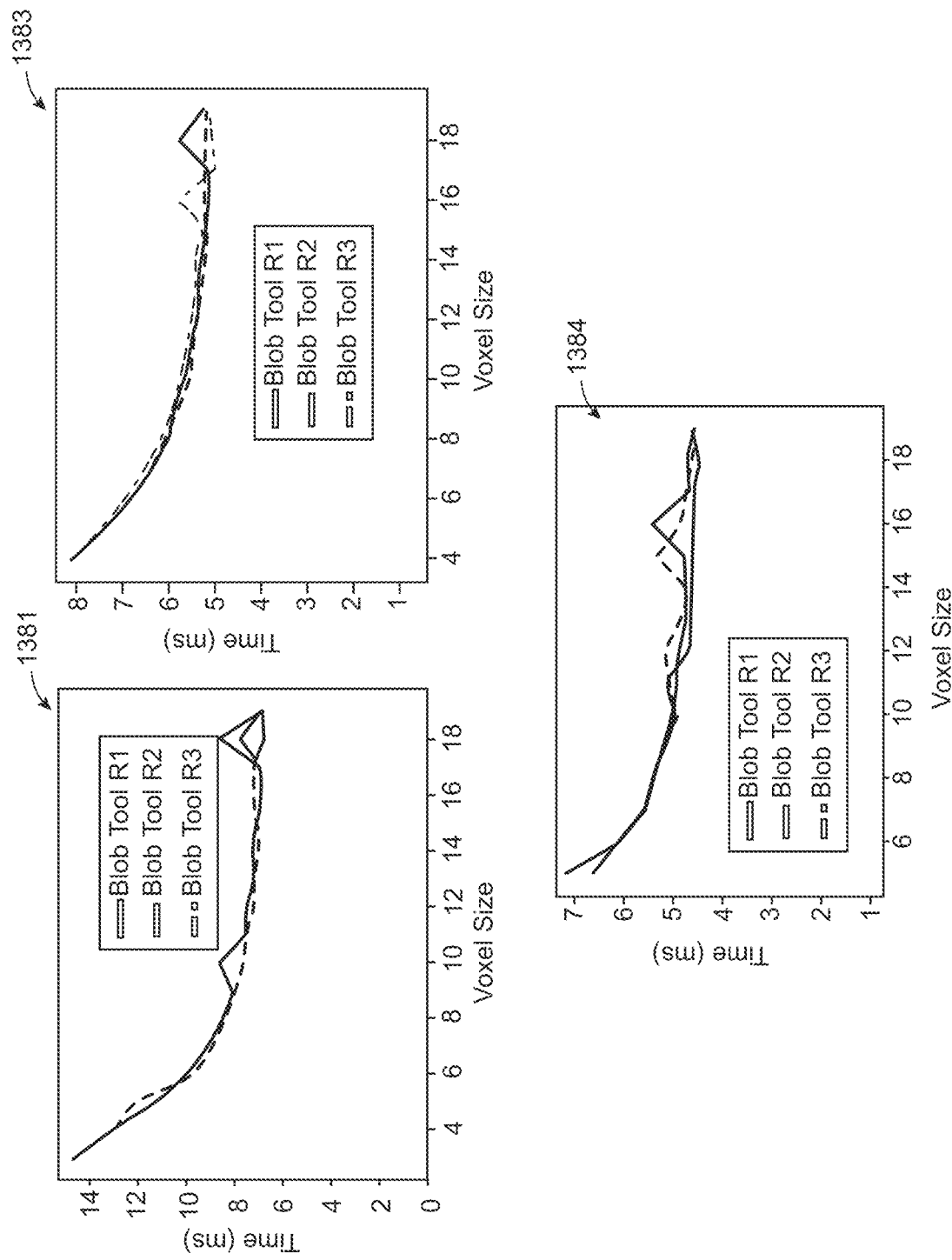
FIG. 13I is a plurality of graphs for exemplary objects from the set analyzed in accordance with the procedure of FIG. 13G, showing an effect voxel size on blob tool operating time.

Another characteristic that is analyzed is the voxelSize impact the blob tool time measurement. In an exemplary arrangement three (3) boxes with different sizes in Image Set 2 are selected, a large box (Set41: 417×411×425), a medium box (Set3: 367×206×190), and a small box (Set2: 162×153× 168). FIG. 13I shows the plots for all three boxes 1381, 1383 and 1384, respectively. As can be seen, as the blob voxel size increases, the time (in ms) for both blob tool and refine tool decreases. However, a maximum of 10 ms difference is observed, which is of minimal significance for determining the voxel size.

5. Optimal Blob Voxel Size Procedure

It is recognized that for some use cases using the histogram frequency can yield a wrong result in determining the optimal blob voxel size. Thus, a more robust procedure/technique is contemplated according to an exemplary implementation. This is described further in the diagram 1386 of FIG. 13J below. The procedure/technique first calculates the filtered blob bounding box volume. A moving average approach is used in a non-limiting example, by a window size (for example having a size value of 9). The optimal voxel size is thereby calculated as the first voxel size when the filtered blob bounding box volume reaches 90% of the maximum volume, plus an offset (e.g. offset=1). Since it requires the calculation of the filtered volume which is a non-casual value, a separate for loop is required. The final determination of the optimal value also requires another looped procedure, which can break early once the 90% of the maximum is reached.

C. Overall AutoTune Procedure

Figure 13J:
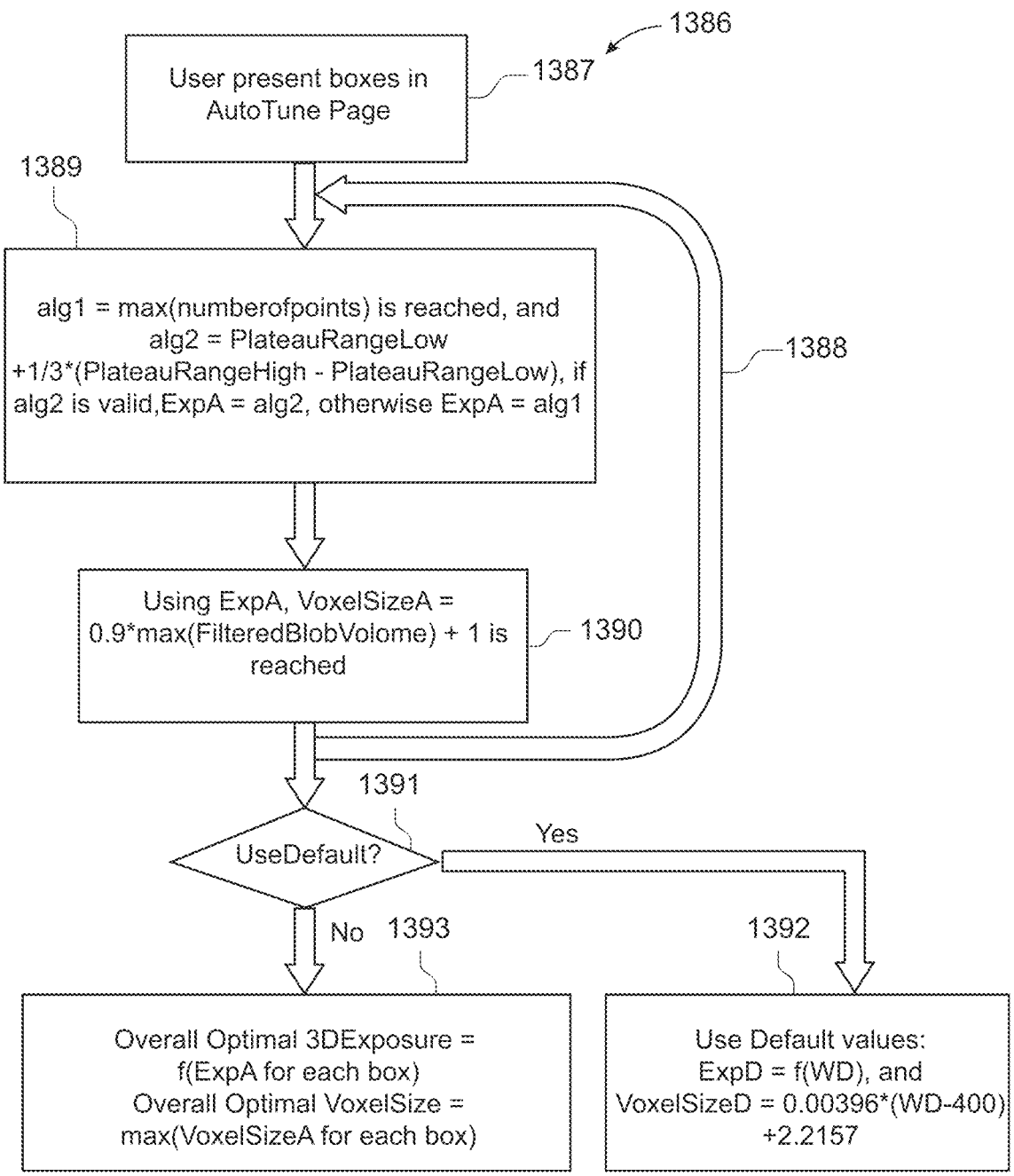
FIG. 13J is a flow diagram showing the operation of an overall procedure for carrying out the AutoTune function of FIG. 13 on exposure time and voxel size parameters.

FIG. 13J shows an overall procedure 1386 for computing optimal 3D exposure and optimal voxel size using the AutoTune GUI function described above. This begins, for example, when the user places an object (box) in the field of view and clicks "Tune this item", or similar interface term (step 1387). Then, multiple acquisitions using various 3D exposures occur (loop 1388) with respect to the object, and the number of voxel points for this item are recorded. The loop uses plateau ranges (described above) to determine optimal exposure (step 1389) and this is provided to the voxel size (filtered blob) procedure (step 1390) until 90 percent is achieved (also described above).

If the results or user determines that use of default values is preferable (decision step 1391), then these values for exposure and voxel size are set for subsequent runtime use (step 1392). Otherwise, the decision step 1391 branches to procedure step 1393, and the exposure and voxel size are set for runtime use based upon the computations of steps 1389 and 1390.

Other parameters (such as blob tool parameters including blob voxel size, blob noise threshold, and blob refinement parameters) can be optimized, using conventional or custom techniques clear to those of skill, given the point cloud acquired using the optimal 3D exposure.

The above-described process is repeated for additional objects of different cuboidal objects/boxes having differing colors, surface patterns, shapes and/or sizes as appropriate to the actual runtime environment, and the setting computed by steps 1389 and 1390 are continually updated with the computed values until one or more settings for each parameter are achieved.

Figure 14:
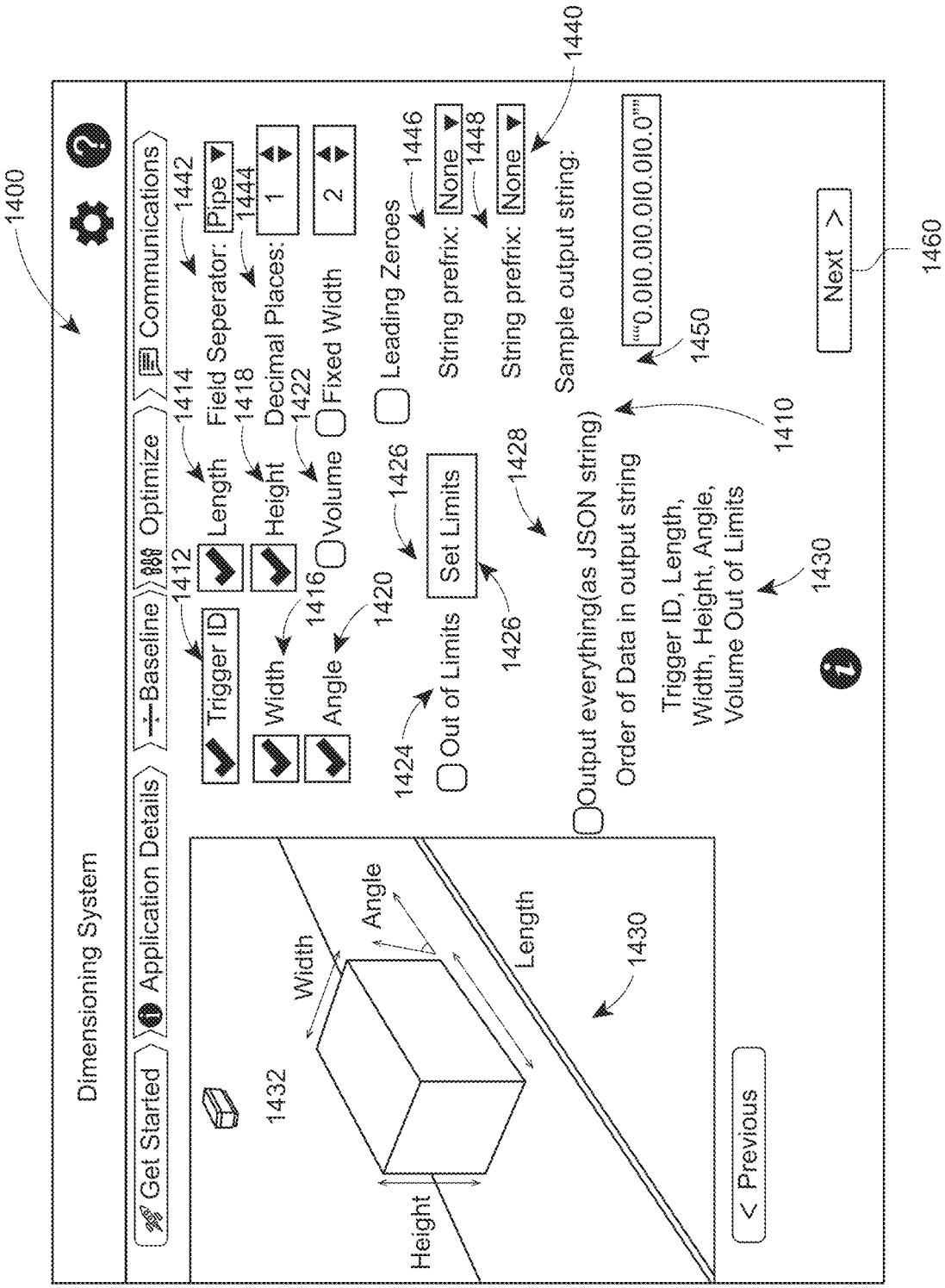
FIG. 14 is a diagram of an exemplary display screen of the GUI of FIG. 9, showing a first part of a communications screen, which provides customer-selectable parameters for data output formatting from the system.
Figure 15:
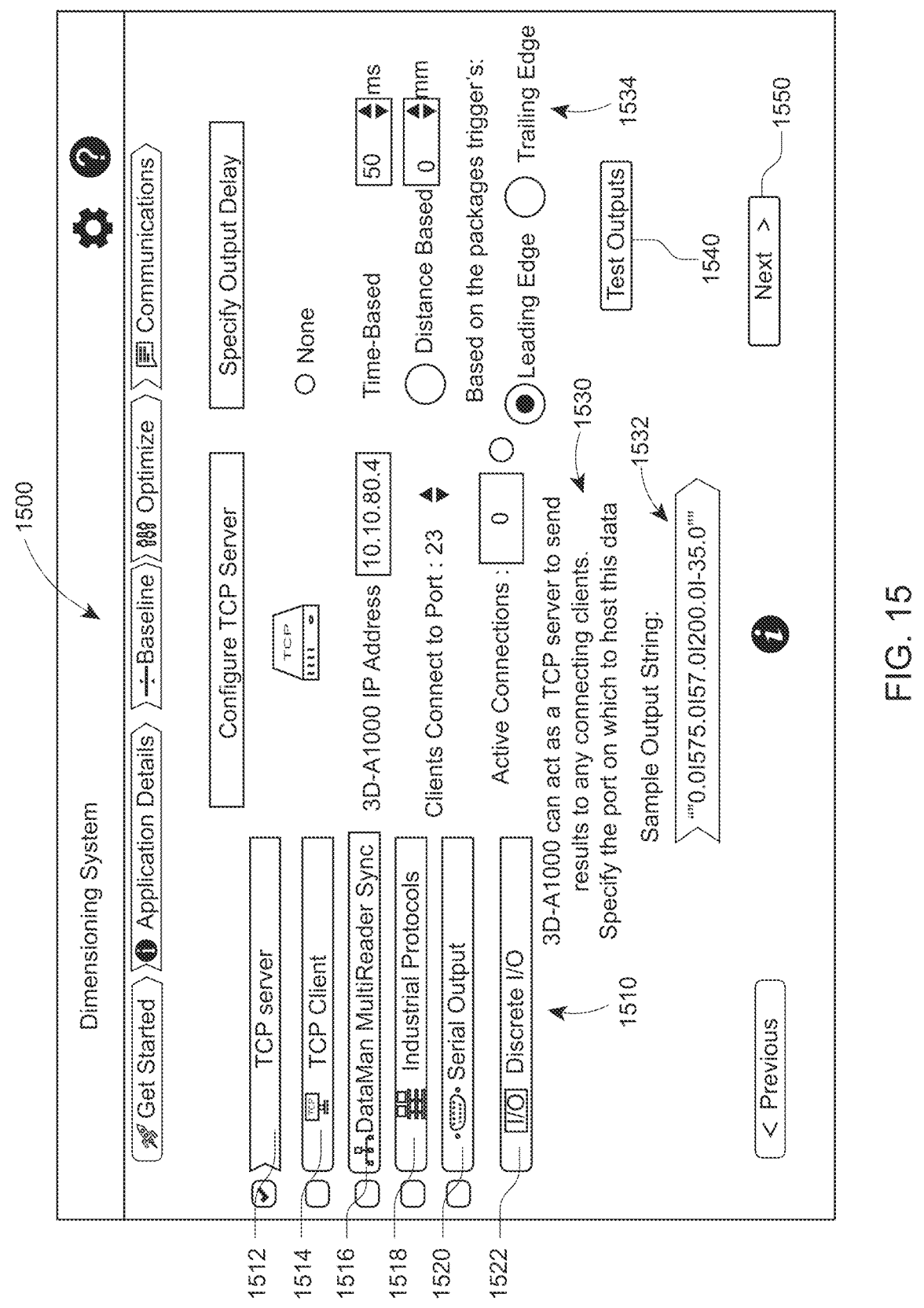
Figure 16:
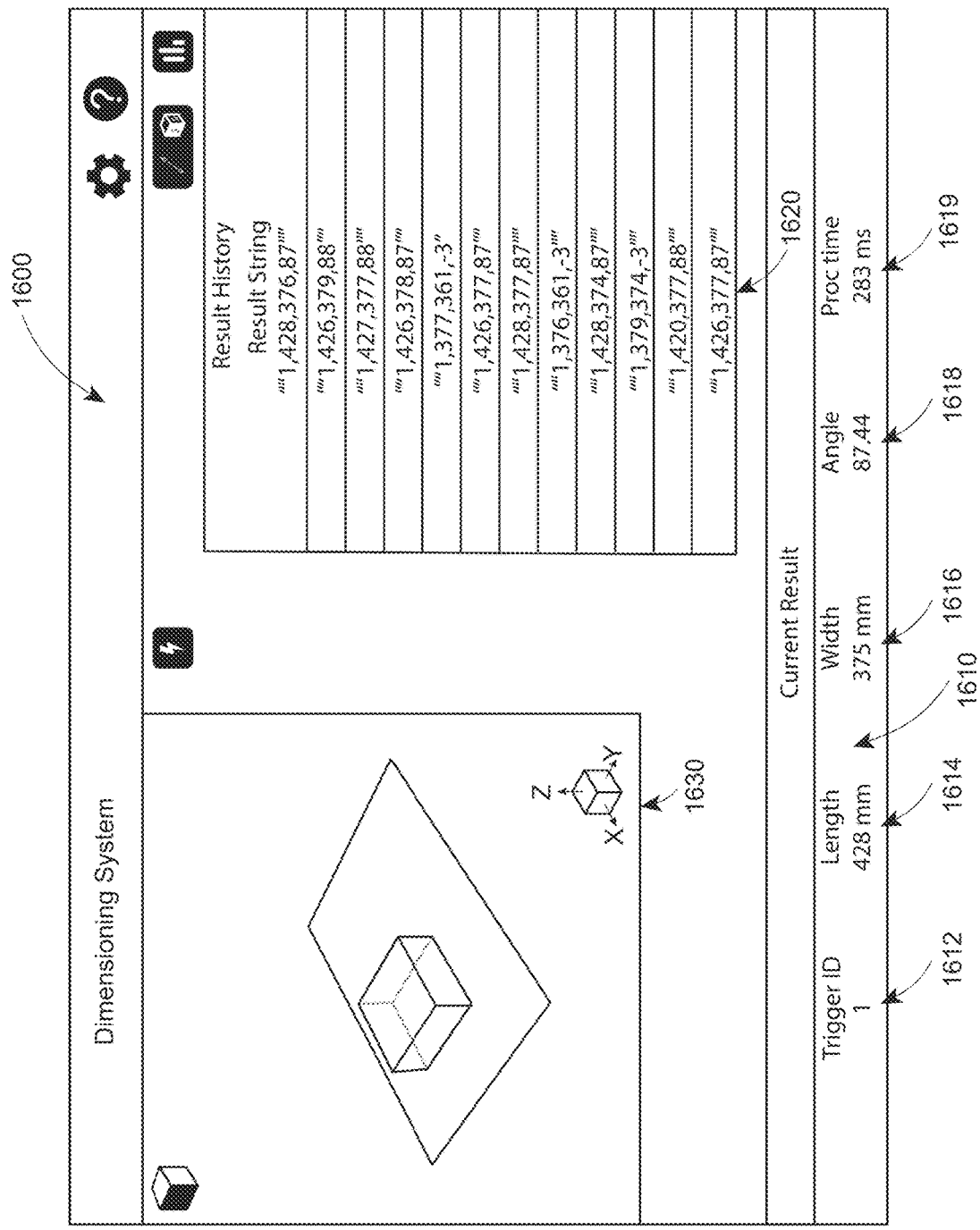
FIG. 16 is a diagram of an exemplary display screen of the GUI of FIG. 9, showing a run mode screen, in which statistics on acquired 3D images of objects are displayed during runtime operation.

After completing AutoTune, the user can enter the communications procedure. In FIG. 14, the communications display screen 1400 allows the user to adjust user-selectable parameters for data output formatting. The center window 1410 provides check boxes on reported fields (e.g. reported in a data stream sent to a utilization device or process and/or on a display screen). These fields can include trigger ID 1412, object length 1414, object width 1416, object height 1418, object angle (relative (e.g.) to direction of travel) 1420, object volume 1422 and whether the object exceeds preset limits 1424 (settable via button 1426). Another checkbox 1428 allows all the above data to be output. The order of output can be set in the window 1430. The left-hand window graphically depicts the above-parameters for the user's reference with respect to an exemplary object 1432. The right-hand window 1440 provides formatting for the output data string so that it can conform to the input requirements of the utilization device or process. Separators 1442, decimal places 1444, string prefix 1446 and string suffix 1448 can be variously set. The format of the resulting output data string is shown concurrently in window 1450. After setting the above parameters, the user can click the next button 1460, and the communications screen procedure continues in display screen 1500 of FIG. 15.

The second part of the communication screen 1500 (FIG. 15) allow the user to set up various communication protocols, network addresses and other data link functions. For example, a TCP/IP connection can be employed, or other appropriate connection. The left-hand window 1510 includes setup tabs for differing arrangements. The exemplary depiction shows tab 1512 for TCP server. Tabs are also provided to set up TCP client 1514, multi-reader synchronization (where a plurality of vision system cameras are used to image the scene) 1516, industrial protocols 1518, serial output 1520 and/or discrete I/O 1522. The depicted settings screen allows the system to act as a server and send output to any given client that accepts TCP/IP communications. The parameters are set in the center window 1530. The sample data output string is shown in window 1532. An output delay (e.g. in milliseconds, or in millimeters of conveyor travel) can be set in window 1534. Outputs can be tested by clicking the button 1540. Other communications tabs (window 1510) display settings window(s) appropriate to the particular communication modality and protocol(s), which should be generally clear to those of skill. When communications are established between the interface and the camera assembly and appropriate data outputs to the user are specified, then the system is ready to enter Run mode, which is depicted in the screen 1600 of FIG. 16.

As shown in the Run screen 1600 (FIG. 16), the output of object dimensions are shown in a current result window 1610. A plurality of trigger event (typically, coordinated with the detection of an object in the FOV) is shown in sequence in a column 1612 and is indexed with a corresponding result history data string 1620. The current result window 1610 contain dimensions (e.g. length 1614, width 1616, angle 1618 and height—not shown) for the corresponding object that is imaged by the trigger event. Optional processing time 1619 to analyze the object is also shown in the window 1610. The format of the depicted current result window 1610, and the relevant data contained therein, is set up in the communications phase (screen 1400). The acquired 3D point cloud for the current acquired object image is shown in window 1630. Other interface screens can be provided in Run mode to review and handle acquired dimension data, as well as other functions, which should be clear to those of skill.

Figure 17:
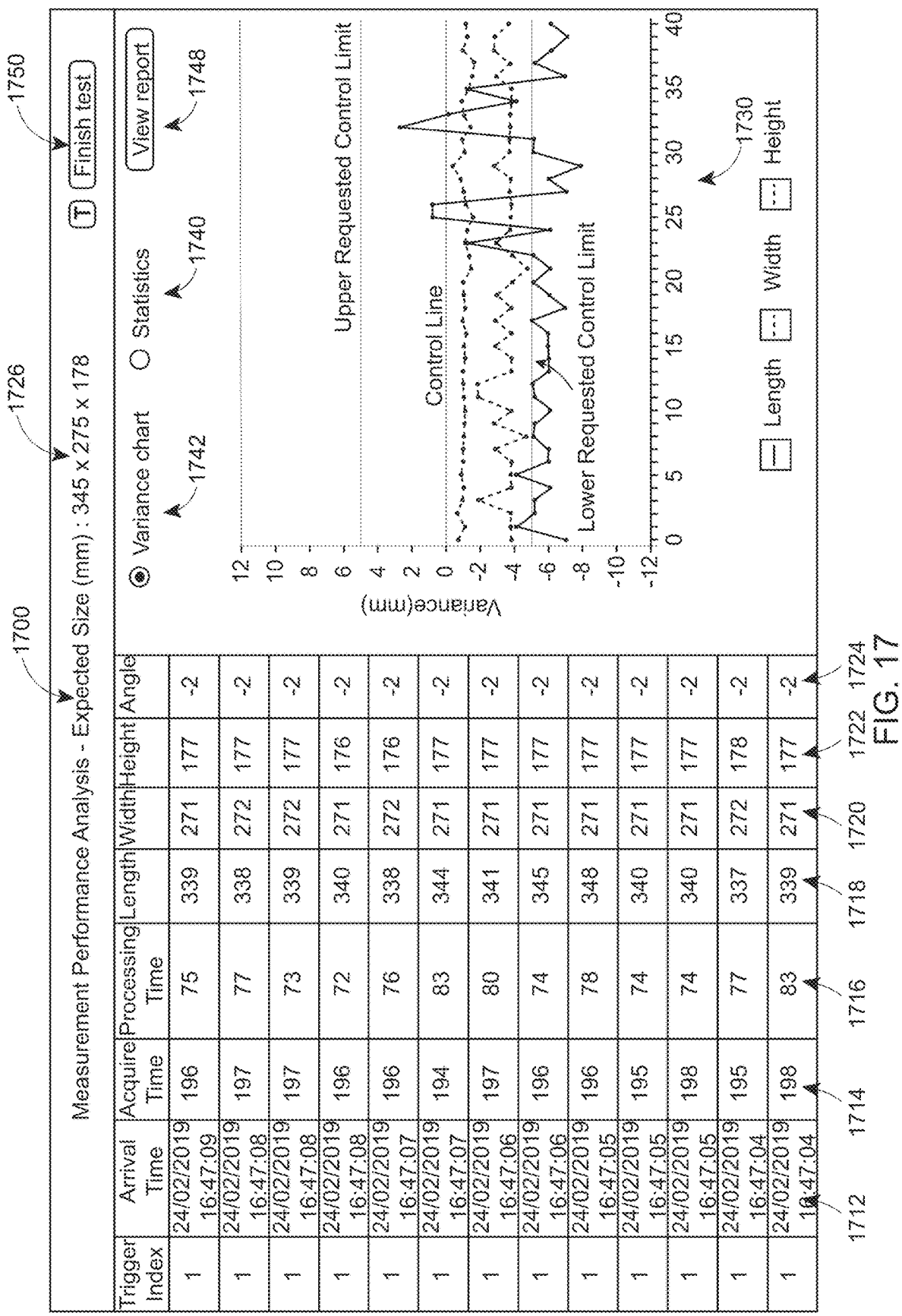
FIG. 17 is a diagram of an exemplary display screen of the GUI of FIG. 9, showing a customer acceptance test (CAT) display, which allows tracking of installation statistics to provide feedback about the reliability of the system.

An additional interface screen 1700 is shown in FIG. 17, which provides an exemplary customer acceptance test (CAT) that tracks installation statistics and provides further feedback relative to system reliability. The left-hand window 1710 displays a series of columns related to arrival time 1712 at the vision system (triggering event), image acquisition/exposure time (e.g. in milliseconds) 1714, processing time 1716 (e.g. in milliseconds), measured object length 1718 (in millimeters), measured object width 1720 (in millimeters), measured object height 1722 (in millimeters) and measured object angle relative to the direction of travel/conveyor centerline 1724 (in degrees). The depicted statistics can be compared to the expected size, as shown in the header 1726. The right-hand window 1730 shows color-coded (or another indicia) graphs of variance in length 1734, width 1736 and height 1738 between objects/acquisition events. Individual statistics can be displayed via button 1740. The variance chart 1742 is currently selected. A detailed report can be accessed via button 1748 and the performance test can be exited via button 1750.

V. Conclusion

The above described system, method and interface provides an effective, robust and user-friendly arrangement for dimensioning cuboidal objects, such as packages, moving along a conveyor. The arrangement accommodates bulginess and other minor imperfections in such objects and generates accurate dimension results in a relatively rapid manner, using existing 3D camera equipment.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for setting up a vision system to analyze and determine dimensions of cuboidal objects passing on a moving surface through a scene imaged by a 3D camera assembly with an image sensor, the system comprising:
    a user interface process that drives a user interface with a plurality of interface screens for setup and runtime operation of the system, at least one of the interface screens providing a setup display for determining optimal distance between the image sensor and the conveyor surface based upon parameters of the camera assembly, speed of the moving surface and width of the moving surface and a range of minimum and maximum size measurements for the object,
    wherein the at least one interface screen displays the optimal distance between the image sensor and the conveyor surface and displays an actual distance between the image sensor and the conveyor surface.

2. The system as set forth in claim 1 wherein at least one of the interface screens is a baseline display that determines a reference measurement based upon acquisition of a 3D image of the moving surface by the image sensor.

3. The system as set forth in claim 1 wherein at least one of the interface screens includes a window that displays a graphical representation of the moving surface and the 3D camera assembly and that allows the user to manipulate system settings while receiving feedback in a form of moved graphical representations or overlaid data.

4. The system as set forth in claim 3 wherein the moved graphical presentations comprise at least one of a camera assembly representation, variable-sized object representations, triggering device representations, and moving conveyor belt representations.

5. The system as set forth in claim 4 wherein the overlaid data comprise at least one of direction arrows, alignment axes, alignment indicia, color-coded status indicators, size measurements and spatial boundary lines.

6. The system as set forth in claim 5 wherein at least one of the interface screens includes a window that projects a graphical representation of an imaging device that is responsive to movement of the 3D camera assembly so as to indicate actual orientation and position of the camera for alignment and working distance setup.

7. The system as set forth in claim 6 wherein the window that projects a graphical representation of the imaging device includes actual and optimized working distance and alignment information that change in response to movement of the 3D camera in the environment.

8. The system as set forth in claim 6 wherein at least one of the interface screens includes a window that projects image data acquired by the 3D camera assembly derived from the environment, the image including at least one of the overlaid data in conjunction with the image data.

9. The system as set forth in claim 8 wherein the image data and the overlaid data are arranged to guide the user to move an exemplary object to a location in the environment that is approximately optimal for placement of the triggering device.

10. The system as set forth in claim 1 wherein at least one of the screens accesses an AutoTune process for determining optimal runtime measurements for vision system parameters based upon analysis of acquired 3D images of objects moving through the imaged scene of the 3D camera assembly on the moving surface.

11. The system as set forth in claim 10 wherein the vision system parameters comprise at least one of exposure time and voxel size.

12. The system as set forth in claim 11 wherein the exposure time is based upon a function that determines optimal exposure from stabilization of measured number of pixels for acquired images of the acquired 3D images of the objects.

13. The system as set forth in claim 12 wherein the voxel size is based upon a working distance between the 3D camera assembly and a respective surface of the objects and an optimal processing time of a blob tool.

14. A system for setting up a vision system to analyze and determine dimensions of cuboidal objects passing on a moving surface through a scene imaged by a 3D camera assembly with an image sensor, the system comprising:
- a user interface process that drives a user interface with a plurality of interface screens for setup and runtime operation of the system, at least one of the interface screens providing a setup display for determining optimal distance between the image sensor and the conveyor surface based upon parameters of the camera assembly, speed of the moving surface and width of the moving surface and a range of minimum and maximum size measurements for the object; and
- a vision system processor associated with the 3D camera assembly having,
- an identification module, associated with the vision system processor, that automatically identifies a 3D region in the 3D image that contains the cuboidal object,
- a selection module, associated with the vision system processor, that automatically selects 3D image data from the 3D image that corresponds to approximate faces or boundaries of the cuboidal object,
- an analysis module that statistically analyzes, and generates statistics for, the selected 3D image data that correspond to approximate cuboidal object faces or boundaries, and
- a refinement module, responsive to the analysis module, that chooses statistics that correspond to improved cuboidal dimensions from among cuboidal object length, width and height, the improved cuboidal dimensions being provided as dimensions for the object.

15. The system as set forth in claim 14, further comprising a convexity process that measures a degree of a convex shape along at least one surface of the object.

16. The system as set forth in claim 15 wherein the convexity process is constructed and arranged to determine a bulge in height along the at least one surface of the object.

17. The system as set forth in claim 16 wherein the refinement process includes a height from bulginess process that refines the height dimension based on a bulginess estimate for the object.

18. A system for setting up a vision system to analyze and determine dimensions of cuboidal objects passing on a moving surface through a scene imaged by a 3D camera assembly with an image sensor, the system comprising:
- a user interface process that drives a user interface with a plurality of interface screens for setup and runtime operation of the system, at least one of the interface screens providing a setup display for determining optimal distance between the image sensor and the conveyor surface based upon parameters of the camera assembly, speed of the moving surface and width of the moving surface and a range of minimum and maximum size measurements for the object; and
- a vision system processor associated with the 3D camera assembly having,
- an identification module, associated with the vision system processor, that automatically identifies a 3D region in the 3D image that contains the cuboidal object, and
- a selection module, associated with the vision system processor, that automatically selects 3D image data from the 3D image that corresponds to approximate faces or boundaries of the cuboidal object.

19. The system as set forth in claim 18, further comprising:
- an analysis module that statistically analyzes, and generates statistics for, the selected 3D image data that correspond to approximate cuboidal object faces or boundaries.

20. The system as set forth in claim 19, further comprising:
- a refinement module, responsive to the analysis module, that chooses statistics that correspond to improved cuboidal dimensions from among cuboidal object length, width and height, the improved cuboidal dimensions being provided as dimensions for the object.

21. A system for setting up a vision system to analyze and determine dimensions of cuboidal objects passing on a moving surface through a scene imaged by a 3D camera assembly with an image sensor, the system comprising:
- a user interface process that drives a user interface with a plurality of interface screens for setup and runtime operation of the system, at least one of the interface screens providing a setup display for determining optimal distance between the image sensor and the conveyor surface based upon parameters of the camera assembly, speed of the moving surface and width of the moving surface and a range of minimum and maximum size measurements for the object; and
- a vision system processor associated with the 3D camera assembly, comprising:
  - an identification module, associated with the vision system processor, that automatically identifies a 3D region in the 3D image that contains the cuboidal object,
  - a selection module, associated with the vision system processor, that automatically selects 3D image data from the 3D image that corresponds to approximate faces or boundaries of the cuboidal object,
  - an analysis module that statistically analyzes, and generates statistics for, the selected 3D image data that correspond to approximate cuboidal object faces or boundaries; and
  - a refinement module, responsive to the analysis module, that chooses statistics that correspond to improved cuboidal dimensions from among cuboidal object length, width and height, the improved cuboidal dimensions being provided as dimensions for the object.

* * * * *